US012082741B2

(12) United States Patent
West et al.

(10) Patent No.: US 12,082,741 B2
(45) Date of Patent: Sep. 10, 2024

(54) CHARCOAL GRILL, COMPONENTS, AND SYSTEM

(71) Applicant: Char-Broil, LLC, Columbus, GA (US)

(72) Inventors: Benjamin West, Boulder, CO (US); Miguel Christophy, San Francisco, CA (US); Craig Jacobson, Moraga, CA (US); Stephen Hibbs, Boulder, CO (US); Michael Chiasson, Lafayette, CO (US); Neville DeWitt Pierrat, Golden, CO (US); Jon Oxford, Albany, CA (US); Diego Horna, Boulder, CO (US); Maggie Venable, Lafayette, CO (US); Sean Meehan, Golden, CO (US); Lukas Railson, Longmont, CO (US); Michael Garver, Broomfield, CO (US); Dennis Mess, Aurora, CO (US); Rylan Miller, Frisco, CO (US); Kyle Jones, Longmont, CO (US); Jeff Wallingford, Boulder, CO (US); Jeremy Woolman, Longmont, CO (US); Tyler Edens, Broomfield, CO (US); Lindsey Smith, Denver, CO (US)

(73) Assignee: Char-Broil, LLC, Columbus, GA (US)

( * ) Notice: Subject to any disclaimer, the term of this patent is extended or adjusted under 35 U.S.C. 154(b) by 470 days.

(21) Appl. No.: 17/161,619

(22) Filed: Jan. 28, 2021

(65) Prior Publication Data

US 2021/0235928 A1 Aug. 5, 2021

Related U.S. Application Data

(60) Provisional application No. 63/072,043, filed on Aug. 28, 2020, provisional application No. 62/968,957, filed on Jan. 31, 2020.

(51) Int. Cl.
*A47J 37/07* (2006.01)

(52) U.S. Cl.
CPC ....... *A47J 37/0754* (2013.01); *A47J 37/0704* (2013.01); *A47J 37/079* (2013.01)

(58) Field of Classification Search
CPC .................. A47J 37/079; A47J 37/0704; A47J 37/0754
See application file for complete search history.

(56) References Cited

U.S. PATENT DOCUMENTS 4,953,533 A 9/1990 Witt
8,596,258 B1 12/2013 Gonzalez et al.
(Continued)

FOREIGN PATENT DOCUMENTS

WO WO2019140098 7/2019
WO WO2021155060 8/2021

OTHER PUBLICATIONS

Notice of Allowance, dated Sep. 18, 2019, for U.S. Appl. No. 15/86,378.

(Continued)

*Primary Examiner* — Alfred Basichas
(74) *Attorney, Agent, or Firm* — GableGotwals; David G. Woodral

(57) ABSTRACT

Grills and charcoal-containing fuel blocks are disclosed. A grill may include a housing at least partially defining a cooking chamber, a combustion chamber having a support surface configured to support a charcoal-containing fuel block, the combustion chamber may be fluidically and thermally connected to the cooking chamber, an igniter configured to heat a charcoal-containing fuel block positioned on the support surface, a stoke chamber positioned under and fluidically connected to the combustion chamber, stoke ducting having a first end fluidically connected to the stoke chamber and a second end fluidically connected to a (Continued)

stoke fan, the stoke fan configured to flow air from outside the housing and into the stoke chamber through the stoke ducting, cooling ducting fluidically connecting the cooking chamber to a cooling fan, and the cooling fan configured to flow air from outside the housing and into the cooking chamber through the cooling ducting.

4 Claims, 45 Drawing Sheets

(56) References Cited

U.S. PATENT DOCUMENTS

| 10,517,429 | B2 | 12/2019 | West et al. |
|---|---|---|---|
| 2003/0015188 | A1 | 1/2003 | Harbin |
| 2009/0266351 | A1 | 10/2009 | Lee |
| 2011/0132347 | A1 | 6/2011 | Kim |
| 2013/0265159 | A1 | 10/2013 | Durian |
| 2015/0282660 | A1 | 10/2015 | Sarvestani |
| 2018/0325314 | A1 | 11/2018 | Walters |
| 2019/0099041 | A1 | 4/2019 | Figueroa et al. |
| 2019/0117017 | A1 | 4/2019 | West et al. |
| 2020/0163489 | A1 | 5/2020 | West et al. |
| 2020/0221901 | A1 | 7/2020 | West et al. |

OTHER PUBLICATIONS

Non-Final Office Action dated Jul. 1, 2021, in U.S. Appl. No. 16/695,059.

International Search Report of the International Searching Authority, for International Patent Application No. PCT/US2019/013066, dated Mar. 22, 2019.

Written Opinion of the International Searching Authority, for International Patent Application No. PCT/US2019/013066, dated Mar. 22, 2019.

International Search Report and the Written Opinion of the International Searching Authority, dated May 11, 2021, for International Patent Application No. PCT/US2021/015575.

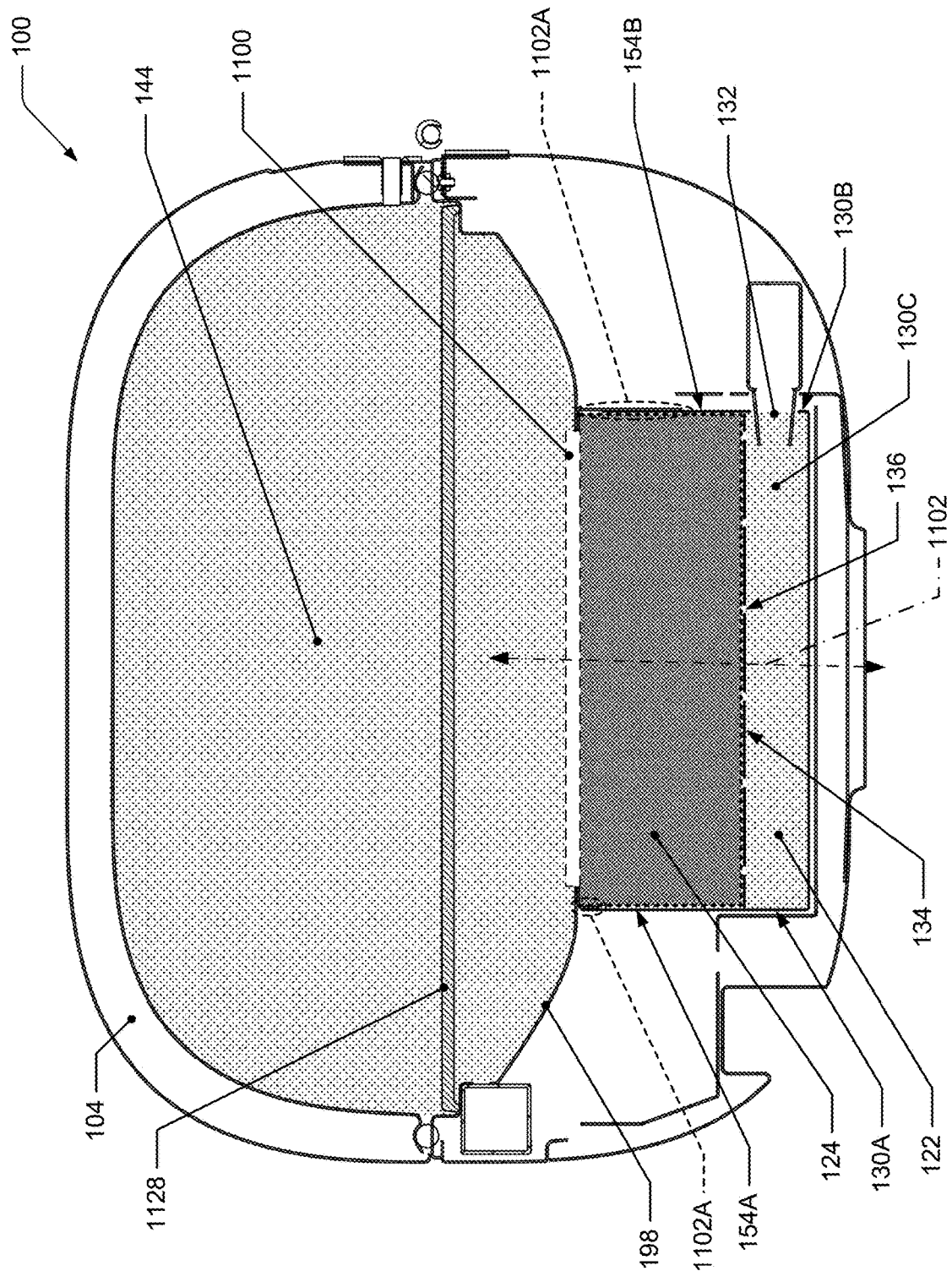

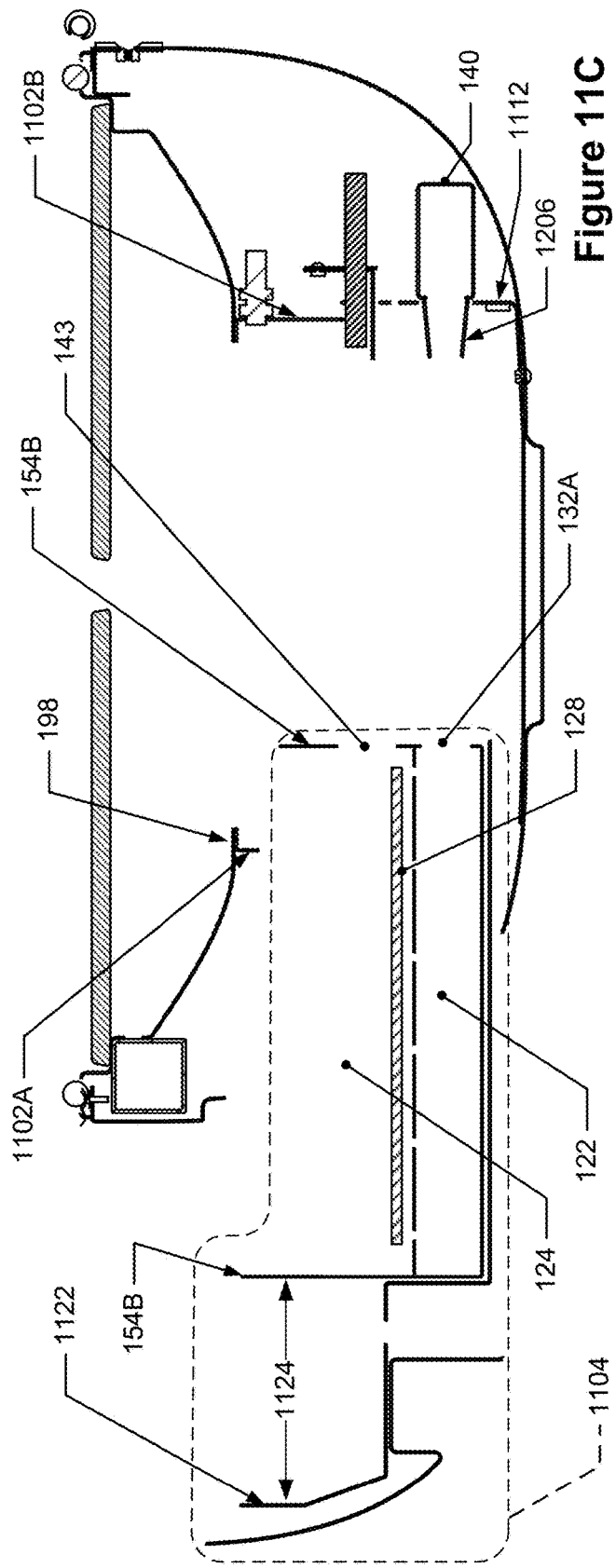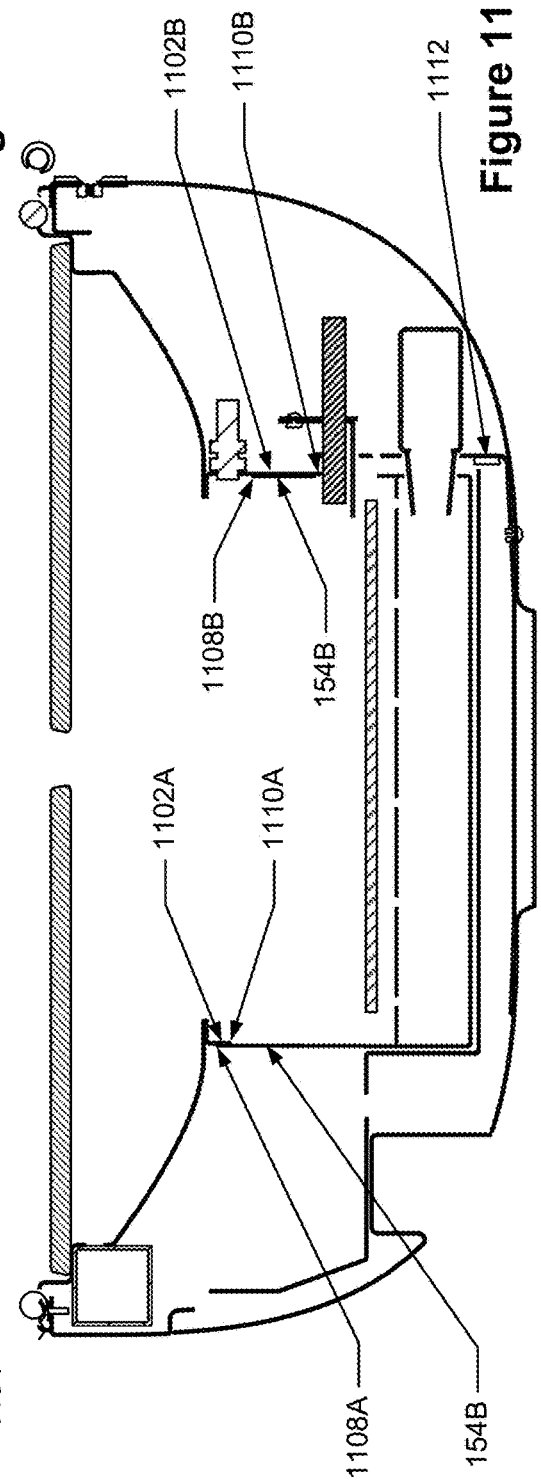

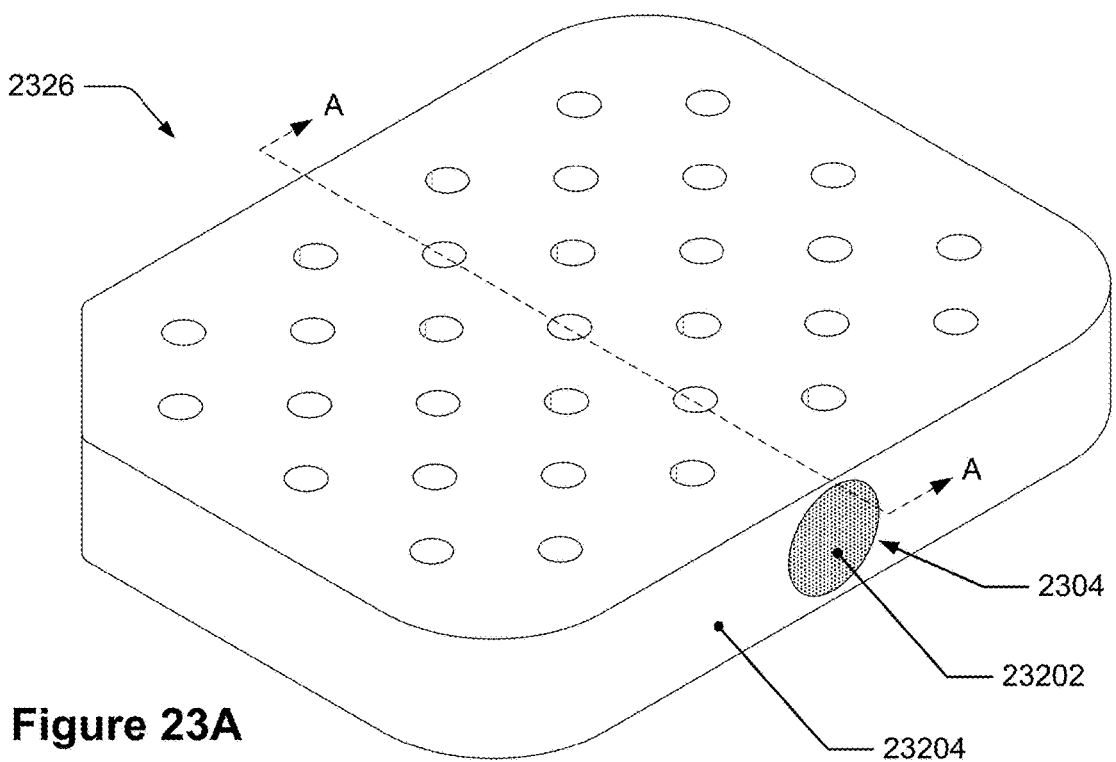
Figure 23A
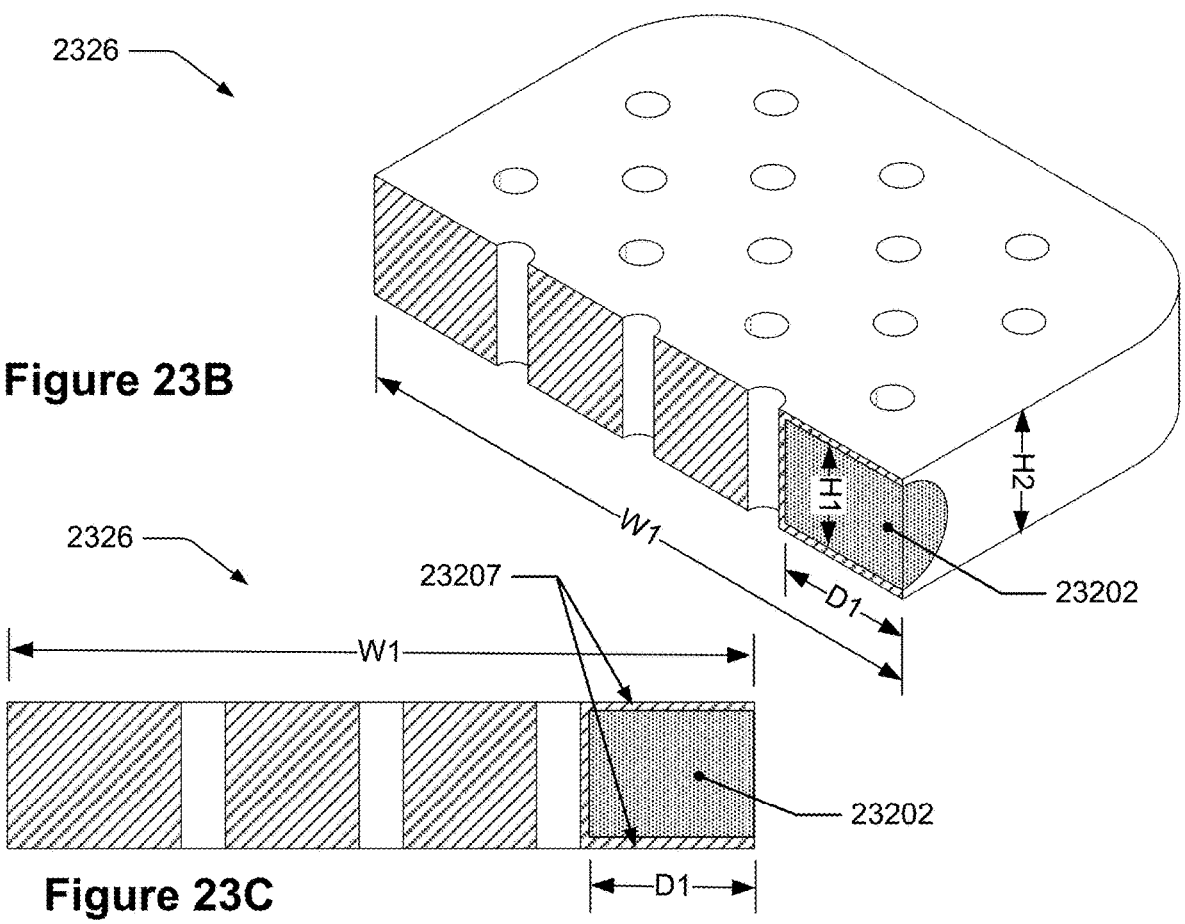
Figure 23B
Figure 23C

CHARCOAL GRILL, COMPONENTS, AND SYSTEM

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes. This application also incorporates by reference, in its entirety for all purposes, U.S. patent application Ser. No. 15/867,378, now U.S. Pat. No. 10,517,429, titled "CHARCOAL GRILL SYSTEM AND METHOD FOR MANAGING TEMPERATURE WITHIN THE SAME CHARCOAL GRILL SYSTEM," filed on Jan. 10, 2018.

BACKGROUND

Many consumer grills use charcoal as a fuel source for heating and cooking food. Charcoal is traditionally ignited using a flammable fluid, such as butane lighter fluid, a chimney that holds charcoal above tinder, such as paper or wood, or a gas-fueled flame, such as a propane igniter. The temperature of the charcoal can be adjusted and maintained by opening or closing lids or vents in the grill and by adding more charcoal. The charcoal itself can be lumps of wood or charcoal particulates formed into a shape, such as a briquette.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Details of one or more implementations of the subject matter described in this specification are set forth in the accompanying drawings and the description below. Other features, aspects, and advantages will become apparent from the description, the drawings, and the claims. The following, non-limiting implementations are considered part of the disclosure; other implementations will be evident from the entirety of this disclosure and the accompanying drawings as well.

In some embodiments, a grill may be provided. The grill may include a housing at least partially defining a cooking chamber, a combustion chamber having a support surface configured to support a charcoal-containing fuel block, in which the combustion chamber is fluidically and thermally connected to the cooking chamber, an igniter configured to heat a charcoal-containing fuel block positioned on the support surface, a stoke chamber positioned under and fluidically connected to the combustion chamber, stoke ducting having a first end fluidically connected to the stoke chamber and a second end fluidically connected to a stoke fan, the stoke fan configured to flow air from outside the housing and into the stoke chamber through the stoke ducting, cooling ducting fluidically connecting the cooking chamber to a cooling fan, and the cooling fan configured to flow air from outside the housing and into the cooking chamber through the cooling ducting.

In some embodiments, the grill may further include cooling ports that fluidically connect the cooling ducting to the cooking chamber.

In some such embodiments, the housing may further include a lid that includes vents, and the cooling ports and vents may be positioned on opposite side of the housing from each other.

In some such embodiments, the grill may further include cooking grates positioned within the cooking chamber, and the cooling ports are positioned such that the cooling ports are vertically interposed between the cooking grates and the combustion chamber when viewed along a first horizontal axis.

In some embodiments, the grill may further include a heat spreader, and the heat spreader may include a first angled surface offset from a second angled surface, both angled surfaces having one or more through-holes in a center region of each angled surface, the heat spready may be positioned within the housing, and between the cooking grates and the combustion chamber, and the heat spready may be configured to distribute heat generated by a fuel block in the combustion chamber.

In some such embodiments, the heat spreader may further include first supports that span between the first and second angled surfaces, and second supports that extend from the second surface and are configured to interface with aligning features of the grill.

In some further such embodiments, the grill may further include a drip tray that includes the aligning surfaces.

In some embodiments, the stoke chamber may further include a top that includes a first plurality of through-holes that fluidically connect the stoke chamber to the combustion chamber.

In some embodiments, the support surface may further include a second plurality of through-holes that fluidically connect, at least in part, the stoke chamber to a charcoal-containing fuel block when the charcoal-containing fuel block is positioned on the support surface.

In some such embodiments, the support surface may be nonplanar.

In some such embodiments, the combustion chamber may further include a plurality of support surfaces and a plurality of grooves located horizontally between, and vertically offset from, the plurality of support surfaces, and the plurality of support surfaces may be configured to contact and support the charcoal-containing fuel block positioned within the combustion chamber.

In some further such embodiments, the plurality of support surfaces may each have an arcuate cross-section along an axis.

In some embodiments, the support surface may be a part of a fuel pan that is configured to be removable from the housing, and the charcoal-containing fuel block may be configured to be inserted into the combustion chamber by inserting the charcoal-containing fuel block into the fuel pan.

In some such embodiments, the fuel pan may further include aligning surfaces configured to align a charcoal-containing fuel block inserted into the combustion chamber.

In some further such embodiments, the aligning surfaces may be further configured to create a gap between side walls of the fuel pan and sides of the charcoal-containing fuel block inserted into the fuel pan.

In some such embodiments, the fuel pan may include cast iron and a porcelain enameled coating.

In some such embodiments, the fuel pan may further include an aligning feature.

In some such embodiments, the combustion chamber may be configured with a thermal break between side walls of the fuel pan and side walls of the combustion chamber.

In some embodiments, the igniter may be positioned inside the housing and configured to extend into the combustion chamber.

In some embodiments, the igniter may be positioned inside the housing and configured to contact a charcoal-containing fuel block when the charcoal-containing fuel block is positioned within the combustion chamber on the support surface.

In some embodiments, the igniter may be configured to translate along a horizontal axis and is spring-biased to move towards the combustion chamber.

In some embodiments, the igniter may be configured to ignite a charcoal-containing fuel block when the charcoal-containing fuel block is positioned within the combustion chamber on the support surface.

In some embodiments, the igniter may include a heating element.

In some embodiments, the igniter may include silicon nitride.

In some embodiments, the igniter may be configured to generate heat greater than 400° C.

In some embodiments, the housing may further include a drawer that is movable into and out of a kettle of the housing between a closed position and an open position, and the stoke chamber and the combustion chamber may be a part of the drawer.

In some such embodiments, the combustion chamber may further include a first side wall and a second side wall, the housing may further include a first seal surface and a second seal surface, and when the drawer is in the closed position, the first side wall may be configured to be proximate to the first seal surface and the second side wall is configured to engage with and contact the second seal surface.

In some embodiments, the grill may further include a removable section within the housing, the removable section may be configured to be removable from the housing without requiring removal of the combustion chamber, igniter, stoke chamber, stoke ducting, or cooling ducting, the stoke fan and the cooling fan may be positioned within the removable section, and the removable section may be removable from the exterior of the housing.

In some embodiments, the grill may further include a control dial configured to generate one or more signals, and the control dial may include a rotatable ring and a rotatable dial.

In some such embodiments, the grill may further include a controller having one or more processors and one or more non-transitory memory devices, and configured to receive signals from the control dial.

In some such embodiments, the control dial may further include a magnet in the rotatable ring, two hall effect sensors, and a rotary encoder configured to detect rotation of the rotatable dial.

In some such embodiments, the control dial may further include a plurality of LEDs configured to illuminate in a plurality of colors.

In some embodiments, the grill may further include a temperature sensor positioned in the cooking chamber, and a controller having one or more processors and one or more non-transitory memory devices, the one or more non-transitory memory devices storing instructions to cause, in response to receiving an ignite command, the igniter to generate heat and ignite a charcoal-containing fuel block positioned in the combustion chamber, and cause, in response to receiving an ignite command, the igniter to generate heat and ignite a charcoal-containing fuel block positioned in the combustion chamber, the stoke fan to run at a first speed.

In some such embodiments, the one or more non-transitory memory devices may further store instructions to receive a set temperature for the cooking chamber, determine whether the temperature in the cooking chamber is within a first threshold from the set temperature, and adjust, in response to determining that the temperature in the cooking chamber is within a threshold of the set temperature, the stoke fan to a second speed different than the first speed.

In some such embodiments, the one or more non-transitory memory devices may further store instructions to receive a set temperature for the cooking chamber, determine whether the temperature in the cooking chamber is within a first threshold from the set temperature, and cause, in response to determining that the temperature in the cooking chamber is within a threshold of the set temperature, the stoke fan to remain at the first speed.

In some such embodiments, the one or more non-transitory memory devices may further store instructions to receive a set temperature for the cooking chamber, determine whether the temperature in the cooking chamber is within a first threshold from the set temperature, and adjust, in response to determining that the temperature in the cooking chamber is above the first threshold, the cooling fan to a third speed.

In some further such embodiments, the one or more non-transitory memory devices may further stores instructions to cause, in response to determining that the temperature in the cooking chamber is above the first threshold, the stoke fan to be at a zero speed.

In some further such embodiments, the one or more non-transitory memory devices may further store instructions to cause, in response to determining that the temperature in the cooking chamber is above the first threshold, the stoke fan to be at an idle speed or a fourth speed.

In some such embodiments, the one or more non-transitory memory devices may further store instructions to receive a set temperature for the cooking chamber, determine whether the temperature in the cooking chamber is within a first threshold from the set temperature, and adjust, in response to determining that the temperature in the cooking chamber is below the first threshold, the stoke fan to a fourth speed.

In some further such embodiments, the one or more non-transitory memory devices may further store instructions to cause, in response to determining that the temperature in the cooking chamber is above the first threshold, the cooling fan to be at a zero speed.

In some further such embodiments, the one or more non-transitory memory devices may further store instructions to cause, in response to determining that the temperature in the cooking chamber is above the first threshold, the cooling fan to be at an idle speed or a fourth speed.

In some such embodiments, the grill may further include a second temperature sensor positioned within the combustion chamber, and the one or more non-transitory memory devices may further store instructions to turn off the igniter, determine, based on data from the second temperature sensor, whether the charcoal-containing fuel block has successfully ignited, and turn on the igniter after determining, based on data from the second temperature sensor, that the charcoal-containing fuel block did not successfully ignite.

In some embodiments, a charcoal-containing fuel block may be provided. The charcoal-containing fuel block may include a charcoal layer, a flavor layer, and a shape, when viewed along a center axis extending through and perpendicular to the charcoal layer and the flavor layer, that includes an aligning cut spanning between first side and a second side that are adjacent to each other.

In some embodiments, the shape may be generally rectangular.

In some embodiments, the aligning cut may be a chamfer.

In some such embodiments, the chamfer may be offset from the first side by a first angle and offset from the second side by a second angle that is the same as the first angle.

In some such embodiments, the chamfer may be offset from the first side by a first angle and offset from the second side by a second angle that is different than the first angle.

In some embodiments, the aligning cut may have a curved surface.

In some embodiments, the shape may further include three corners with a radius.

In some embodiments, the charcoal-containing fuel block may further include an ignition layer.

In some embodiments, the charcoal-containing fuel block may further include an ignition coating around the charcoal layer and the flavor layer.

In some embodiments, the charcoal-containing fuel block may further include a coating around the charcoal layer and the flavor layer, and the coating may include a sodium nitrate or a potassium nitrate.

In some embodiments, the charcoal-containing fuel block may be for cooking.

In some embodiments, a charcoal-containing fuel block may be provided. The charcoal-containing fuel block may include a charcoal layer; and an internal ignition section that extends into the charcoal layer, is configured to have a higher combustion rate than the charcoal layer, and includes at least carbonaceous material and an oxidant.

In some embodiments, the internal ignition section may have a substantially circular cross-sectional area along its length.

In some embodiments, the internal ignition section may have a substantially rectangular cross-sectional area along its length.

In some embodiments, the internal ignition section may have a cross-sectional area along its length selected from a list consisting of rectangular, square, elliptical, obround, and having shaped corners, such as angled, chamfered, or rounded corners.

In some embodiments, the internal ignition section may extend through only a part of a width of the charcoal-containing fuel block.

In some embodiments, the internal ignition section may form a part of the external surface of the charcoal-containing fuel block.

In some embodiments, the charcoal layer may be impregnated with a second oxidant/accelerant.

In some such embodiments, the second oxidant/accelerant may include an ethyl group.

In some such embodiments, the second oxidant/accelerant may include ethanol.

In some embodiments, the carbonaceous material may be charcoal powder and the oxidant may be potassium nitrate.

In some embodiments, the internal ignition section may further include a binder.

In some such embodiments, the internal ignition section may further include a plasticizer.

In some such embodiments, the binder may include guar gum.

In some embodiments, the charcoal-containing fuel block may further include a coating around the charcoal layer, and the coating may include a sodium nitrate or a potassium nitrate.

In some embodiments, the charcoal-containing fuel block may be configured for use in cooking.

In some embodiments, a heat spreader for use in a grill may be provided. The heat spreader may include a first surface having a center region with one or more through-holes that extend through the first surface, a first side region, and a second side region at a first obtuse angle from the first side region, and a second surface having a center region with one or more through-holes that extend through the second surface, a first side region, and a second side region at a second obtuse angle from the second side region, and the second surface is offset from the first surface.

In some embodiments, the first obtuse angle may be substantially the same as the second obtuse angle.

In some embodiments, the first side region and the second side region of the first surface may each have a first width, and the first side region and the second side region of the second surface may each have a second width larger than the first width.

In some embodiments, the first surface may have two or more through-holes, and the second surface may have two or more through-holes.

In some embodiments, the first side region of the first surface may be offset from and substantially parallel to the first side region of the second surface, and the second side region of the first surface may be offset from and substantially parallel to the second side region of the second surface.

In some such embodiments, the first side region of the first surface may be offset from the first side region of the second surface by a first distance along a center axis of the first surface, and the second side region of the first surface may be offset from the second side region of the second surface by the first distance along the center axis of the first surface.

In some embodiments, the heat spreader may further include a plurality of supports, and one or more supports may span between the second end of the first side region of the first surface and the first side region of the second surface, and one or more supports may span between the second end of the second side region of the first surface and the second side region of the second surface.

In some such embodiments, the plurality of supports may be a part of the first surface.

In some further such embodiments, the plurality of supports may be affixed to the second surface.

In some embodiments, the heat spreader may further include a plurality of structural supports, and one or more structural supports may span along at least a part of one or more of the second end, the first side, and the second side of the first side region of the first surface, one or more structural supports may span along at least a part of one or more of the second end, the first side, and the second side of the second side region of the first surface, one or more structural supports may span along at least a part of one or more of the second end, the first side, and the second side of the first side region of the second surface, and one or more structural supports may span along at least a part of one or more of the second end, the first side, and the second side of the second side region of the second surface.

In some such embodiments, the structural supports that span along the first surface may extend away from the first surface and are oriented at a non-parallel angle to the first surface, and the structural supports that span along the second surface may extend away from the second surface and are oriented at a non-parallel angle to the second surface.

In some embodiments, a heat spreader for use in a grill may be provided. The heat spreader may include a first surface having a center region with one or more through-holes that extend through the first surface, and a second surface having a center region with one or more through-holes that extend through the second surface. The second surface and the first surface may be planar, and the second surface may be offset from the first surface.

In some embodiments, a heat spreader for use in a grill may be provided. The heat spreader may include a first surface having a center region with one or more through-holes that extend through the first surface, a first side region, and a second side region at a nonparallel angle from the first side region, and a second surface having a center region with one or more through-holes that extend through the second surface. The second surface may be planar, and the second surface may be offset from the first surface.

In some embodiments, the nonparallel angle may be an obtuse angle.

In some embodiments, the nonparallel angle may be a reflex angle.

In some embodiments, a heat spreader for use in a grill may be provided. The heat spreader may include a first surface having a center region with one or more through-holes that extend through the first surface, and a second surface having a center region with one or more through-holes that extend through the second surface, a first side region, and a second side region at a nonparallel angle from the first side region. The first surface may be planar, and the second surface is offset from the first surface.

In some embodiments, the nonparallel angle may be an obtuse angle.

In some embodiments, the nonparallel angle may be a reflex angle.

BRIEF DESCRIPTION OF THE DRAWINGS

FIG. 3B depicts a first cross-sectional side view slice of the grill without a charcoal-containing fuel block.

FIG. 11C depicts a cross-sectional side view of the grill and drawer of FIG. 11A.

FIG. 11D depicts a cross-sectional side view of drawer in a closed position.

FIG. 23A depicts an off-angle view of an example fuel block.

FIG. 23B depicts a cross-sectional off-angle view of the example fuel block of FIG. 23A.

FIG. 23C depicts a cross-sectional side view of the example fuel block of FIG. 23A.

DETAILED DESCRIPTION

Figure 1A:
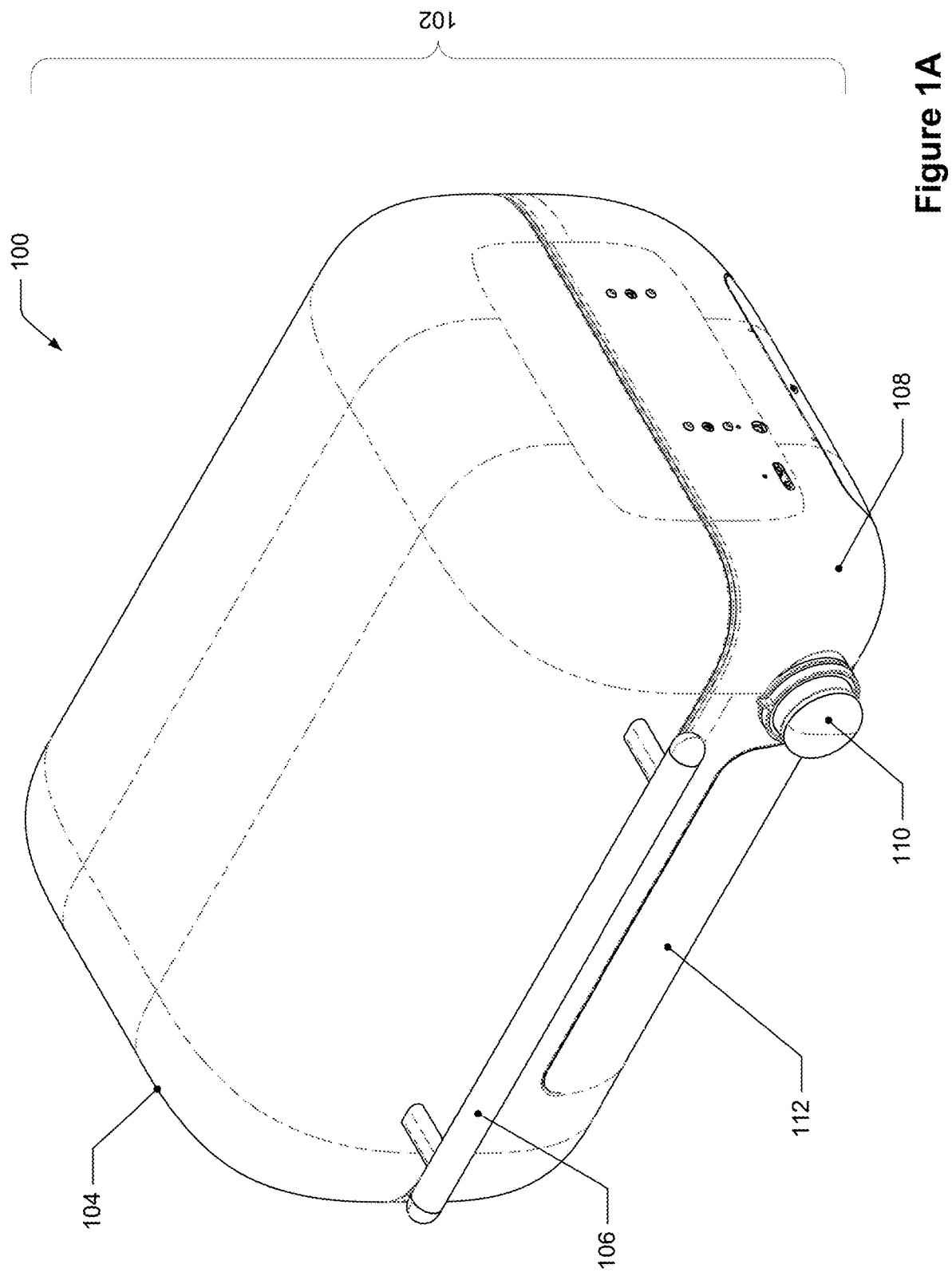
FIG. 1A depicts an isometric view of an example grill in a closed state.

In the following description, numerous specific details are set forth to provide a thorough understanding of the presented embodiments. Embodiments disclosed herein may be practiced without some or all of these specific details. In other instances, well-known process operations have not been described in detail to not unnecessarily obscure the disclosed embodiments. Further, while the disclosed embodiments will be described in conjunction with specific embodiments, it will be understood that the specific embodiments are not intended to limit the disclosed embodiments.

For the purposes of this disclosure, the term "fluidically connected" is used with respect to volumes, plenums, holes, etc., that may be connected with one another in order to form a fluidic connection, similar to how the term "electrically connected" is used with respect to components that are connected together to form an electric connection. The term "fluidically interposed." if used, may be used to refer to a component, volume, plenum, or hole that is fluidically connected with at least two other components, volumes, plenums, or holes such that fluid flowing from one of those other components, volumes, plenums, or holes to the other or another of those components, volumes, plenums, or holes would first flow through the "fluidically interposed" component before reaching that other or another of those components, volumes, plenums, or holes. For example, if a pump is fluidically interposed between a reservoir and an outlet, fluid that flowed from the reservoir to the outlet would first flow through the pump before reaching the outlet.

It is to be understood that the use of relative terms such as "above," "on top." "below." "underneath," etc. are to be understood to refer to spatial relationships of components with respect to the orientations of those components during normal use of a showerhead or with respect to the orientation of the drawings on the page. In normal use, showerheads are typically oriented so as to distribute gases downwards towards a substrate during substrate processing operations.

Introduction and Context

Described herein are novel charcoal grills, components, and systems. Traditional grills generally fall into two categories, gas and charcoal. Gas grills use a combustible gas sources, such as propane or natural gas, to heat the grill and cook the food on the grill. Gas grills tend to have quick ignition and heating times, but they do not inherently include charcoal or wood flavoring; this flavoring can be added separately. Charcoal or wood grills use a solid fuel source, such as wood, charcoal, or a combination thereof to heat the grill and cook food on the grill. These fuel sources naturally add flavoring lacking in gas grills, but require long ignition and heating times, such as at least 10, 15, 20, or 30 minutes. In some instances, the ignition process can adversely affect flavoring, such as by using lighter fluid which can reduce ignition time but may create a chemical or gasoline flavoring. It is often difficult to control the temperature of charcoal and wood fuel. To increase the temperature, there are limited options, such as opening one or more vents underneath the fuel; additionally, adding more charcoal or wood to already ignited fuel to increase the temperature initially reduces the temperature as heat is diverted to ignite this added fuel and heat it up. To lower the temperature, there are again limited options which may include, for example, manually closing a lid or one or more vents to reduce the air flow and potentially extinguish some of the fuel (although this may, in some cases, initially increase the temperature somewhat, e.g., if the lid is closed, by trapping heat within the grill). The temperature may be adjusted through trial and error with various configurations of the open and closed vents, but this process makes it very difficult for a user to accurately control temperature.

The solid fuel sources used in traditional charcoal or wood grills are generally inconvenient, difficult to control, dirty, and difficult to remove from the grill and dispose of. A continuing problem of conventional charcoal briquettes or lumps is that they are messy and difficult to gauge the proper amount for a given cooking session. This results in waste. Food flavor is often improved by adding additional flavor enhancing materials such as wood chips, separate from the solid fuel source, which is inconvenient (e.g., requiring soaking wood chips in water for a period of time before placing on the grill).

Provided herein are charcoal grills, components, and systems that have numerous advantages over traditional gas and charcoal grills. For instance, the novel grill apparatuses and techniques described herein are able to quickly ignite a charcoal-containing fuel source, also referred to herein as a "charcoal fuel block" or "fuel block", and precisely control the grill temperature through the use of intelligent air or ventilation control within the grill. As described in more detail below, in some embodiments, the grill may include a cooking chamber and a combustion chamber; the combustion chamber is configured to hold a charcoal-containing fuel source above, and in a location in fluidic connection with, a stoke chamber that is fluidically connected to a stoke fan, e.g., via one or more ducts. To ignite the charcoal-containing fuel source, an igniter in contact with the charcoal-containing fuel source ignites an ignition layer of the charcoal-containing fuel source, after which the stoke fan blows air into the stoke box which then flows vertically therefrom into the combustion chamber and stokes the combustion of the charcoal-containing fuel source. Once the charcoal-containing fuel source is ignited, the stoke fan may increase the air flow to the charcoal-containing fuel source to increase the combustion rate of the fuel source and raise the temperature in the grill. The grill also may include vents as well as a cooling fan fluidically connected to the cooking chamber which may be used to lower the temperature in the cooking chamber and maintain, in conjunction with the stoke fan in some instances, the temperature in the cooking chamber at a desired temperature. As used herein, the term "stoke" refers to activity designed to promote the combustion of the charcoal-containing fuel block, such as by the addition of air or gaseous fuel, and not the addition of solid fuel.

The charcoal-containing fuel source may be configured for use with the grills and systems described herein. This charcoal-containing fuel source may have a specific shape or shapes that enable it to fit within the grill and be contacted by the igniter, as well as enable air to flow through the charcoal-containing fuel source. The charcoal-containing fuel source may also have various compositions and arrangements of charcoal constituents, ignition-assisting constituents, and flavor constituents. This may include discrete layers within the charcoal-containing fuel source, such as an ignition layer on the bottom of the charcoal-containing fuel source that is configured to burn at a faster rate, and in some instances a higher heat, than a charcoal layer.

The charcoal-containing fuel source also may include a fuel structure and composition that is easy to handle and results in a minimum amount of dust or debris on your hands, can be ignited easily with a minimum amount of smoke, heat the cooking surface to the desired temperature in a consistent, controlled, rapid fashion, release flavorful compounds to the food at the appropriate time, and result in a combusted structure that is easy to clean up and dispose of. charcoal-containing fuel source may have, in some embodiments, a natural composition that uses nontoxic materials and is made in low cost processes.

The charcoal-containing fuel sources discussed herein do not refer to traditional charcoal briquettes or lump charcoal, both of which generally consist of discrete pieces that are often initially added to a grill as a pile or in a column (such as in a chimney) for ignition, and are then spread into a more widely distributed layer after they have ignited for the purposes of cooking. In contrast, the charcoal-containing fuel sources discussed herein are typically much larger than a traditional charcoal briquette, are engineered to interface with a particular receptacle of a grill having a stoke fan system, and typically have discrete sections or zones of material with different compositions, e.g., a charcoal layer or layers and an ignition layer (which may be a single, generally planar layer or may be a coating that extends around the exterior of the charcoal-containing fuel source).

Example Grill and Grill Components

FIG. 1A depicts an isometric view of an example grill in a closed state. As seen in FIG. 1A, the grill 100 includes a housing 102 forming the exterior surface and structure of the grill, with a lid 104 having a handle 106 and a lower portion, referred to herein as a kettle 108. The kettle 108 includes a control dial 110 that may be used to provide input to a controller that controls aspects of the grill 100, such as "on," "off," "ignite," and internal temperature settings. The kettle 108 also includes a port 112 for inserting the charcoal-containing fuel source into the kettle 108, which may be a drawer in some embodiments. As described in more detail below, the kettle 108 includes internal features for supporting, igniting, stoking, and cooling a charcoal-containing fuel source, as well as for actively and passively maintaining the temperature within the grill.

Figure 1B:
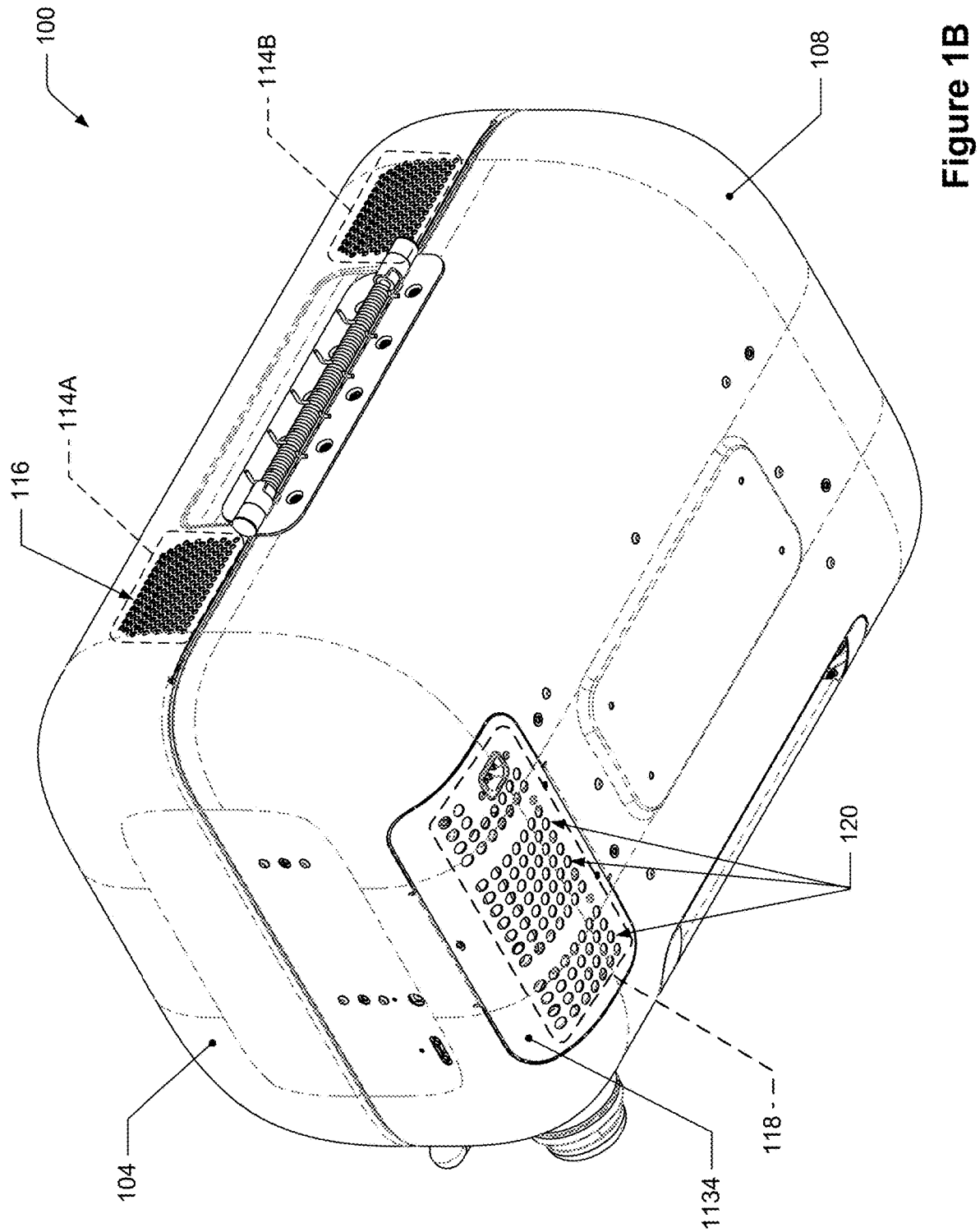
FIG. 1B depicts an off-angle view of the example grill of FIG. 1A.

FIG. 1B depicts an off-angle view of the example grill of FIG. 1A. The lid may include one or more vents, and as seen in FIG. 1B, the illustrated lid 104 includes two vents 114A and 114B, contained within the dashed rectangles, that each include a plurality of holes 116 that extend through the lid and into the inside of the grill 100 such that an internal portion of the grill 100 is fluidically connected via the holes 116 to the environment outside the grill 100. This allows fluid, e.g., liquid and air, as well as heat to flow from inside the grill 100 to the outside of the grill. As discussed in more detail below, the depicted kettle 108 includes an air intake 118 that includes a plurality of second holes 120 that similarly allows fluid, e.g., air, to flow from outside the grill 100 to the inside of the kettle 108.

In some embodiments, the lid 104 may have a double-wall construction such that it contains an exterior wall, seen in FIGS. 1A and 1B, and an internal wall that is inside the grill 100. Insulation may be positioned between the double walls of the lid 104, such as one or more layers of aluminum or an aluminum alloy (reflective insulation), fiber-reinforced plastic, e.g., a thermoset polymer matrix such as epoxy, polyester resin, or vinylester, or a thermoplastic, fiberglass, or a ceramic. Insulation may also be positioned around the edge of the lid 104, such as braided fiberglass cord gasket insulation, where the lid 104 contacts the kettle 108 in order to retain heat inside the grill 100 at this junction between the lid 104 and kettle 108. This lid configuration may advantageously retain heat inside the grill 100 and assist in precisely and accurately controlling the temperature inside the grill. In some instances, the external surface of the lid 104 may be configured to remain at or below a temperature safe to human contact, such as 100° F. or 111° F., while the internal temperature of the grill is at a temperature of at least 200° F., 300° F., 500° F., and 900° F., for instance.

Figure 2:
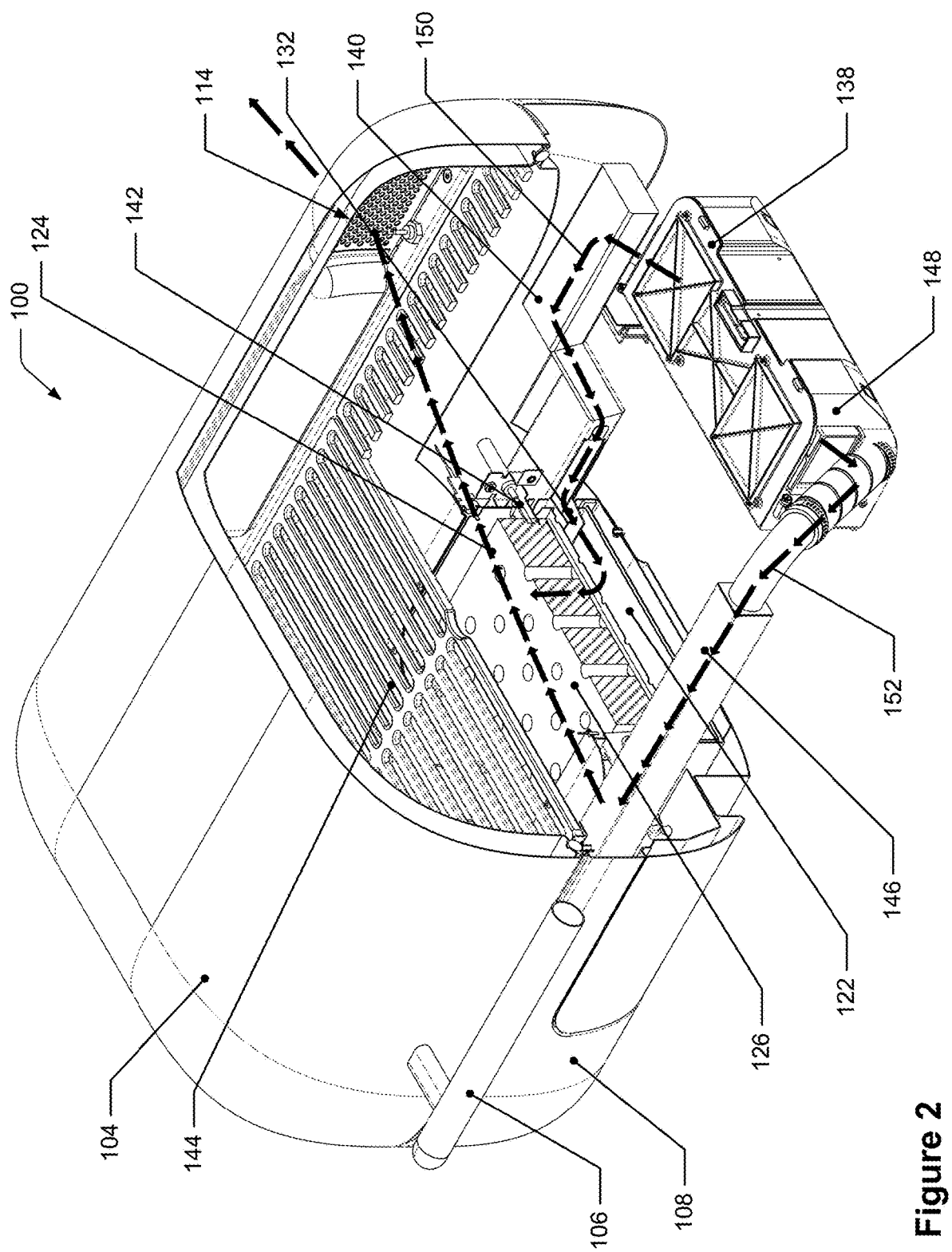
FIG. 2 depicts a partial cross-sectional off-angle view of the grill of FIG. 1.

A general overview of some internal features of the grill will now be discussed. FIG. 2 depicts a partial cross-sectional off-angle view of the grill of FIG. 1. Features for supporting, igniting, and stoking a charcoal-containing fuel block as well as features for controlling heat transfer and air movement through sections of the grill 100 can be seen in FIG. 2. These features include a combustion chamber 124 where the charcoal-containing fuel block 126 is positioned, an igniter 142 configured to extend into the combustion chamber 124 and ignite the charcoal-containing fuel block 126, a stoke chamber 122 underneath and fluidically connected to the combustion chamber 124 for flowing stoke air into the combustion chamber 124 and stoking the ignition and combustion of the charcoal-containing fuel block 126, and a stoke fan 138 configured to flow stoke air through stoke ducting 140 through the stoke chamber air inlet 132. As discussed in more detail below, the configuration and utilization of these elements, along with the configuration of the charcoal-containing fuel block 126, enables fast ignition and temperature management of the charcoal-containing fuel block 126 and the grill.

The kettle 108 also includes a one or more cooling ports (not depicted) fluidically connected to the cooking chamber 144 of the grill 100 and fluidically connected to cooling ducting 146 and a cooling fan 148. These cooling elements are configured to blow cooling air into the cooking chamber and cause heat and air to exit the cooking chamber through the vents 114. In some embodiments, like that in FIG. 2, the one or more cooling ports may be positioned on the opposite side of the grill from the lid vents 114 in order to flow cool air across the length and/or width of the cooking chamber. Example stoke air 150 and cooling air 152 flow paths are depicted in FIG. 2.

Figure 3A:
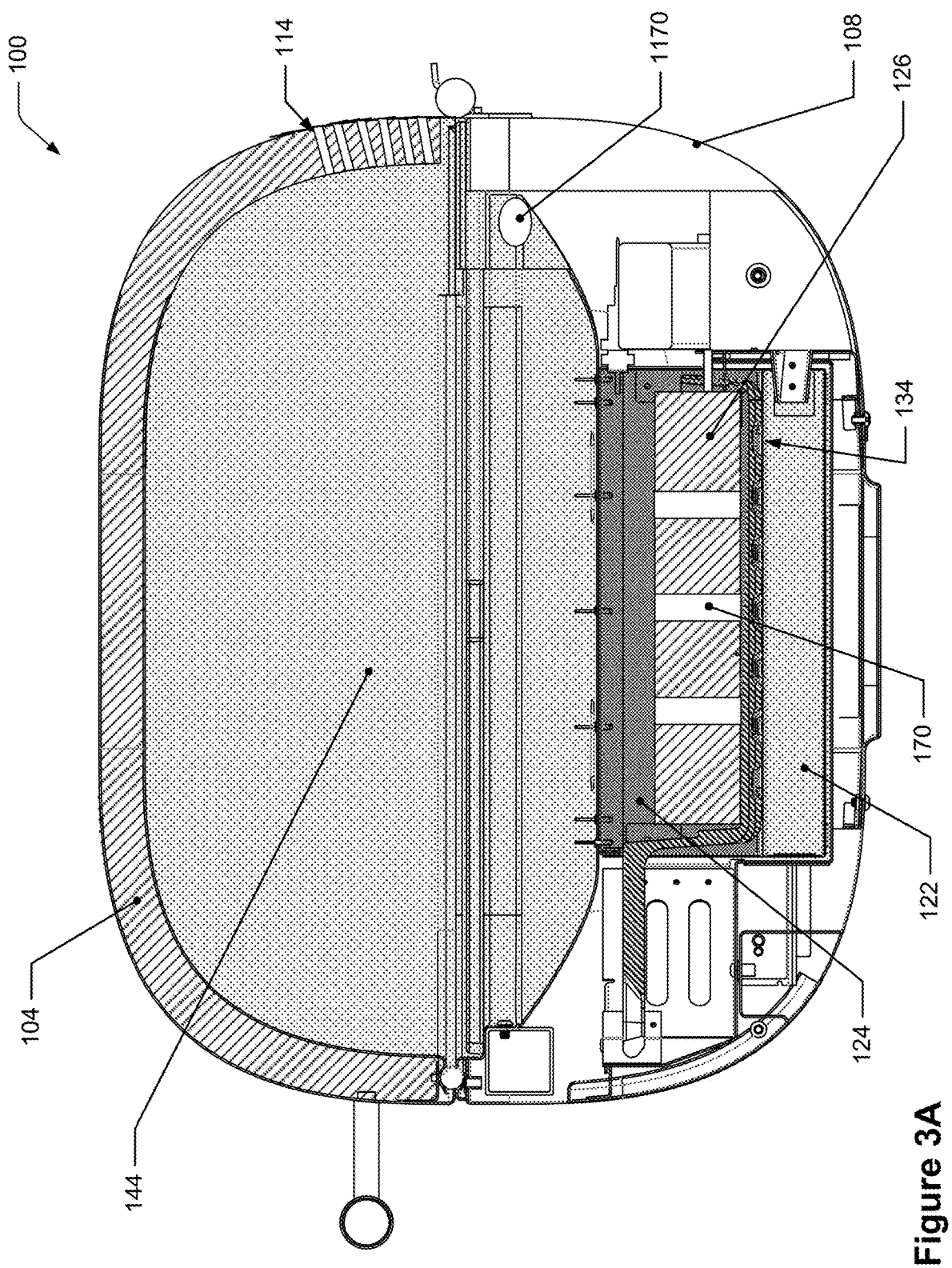
FIG. 3A depicts a cross-sectional side view of the grill of FIGS. 1A and 2.
Figure 3C:
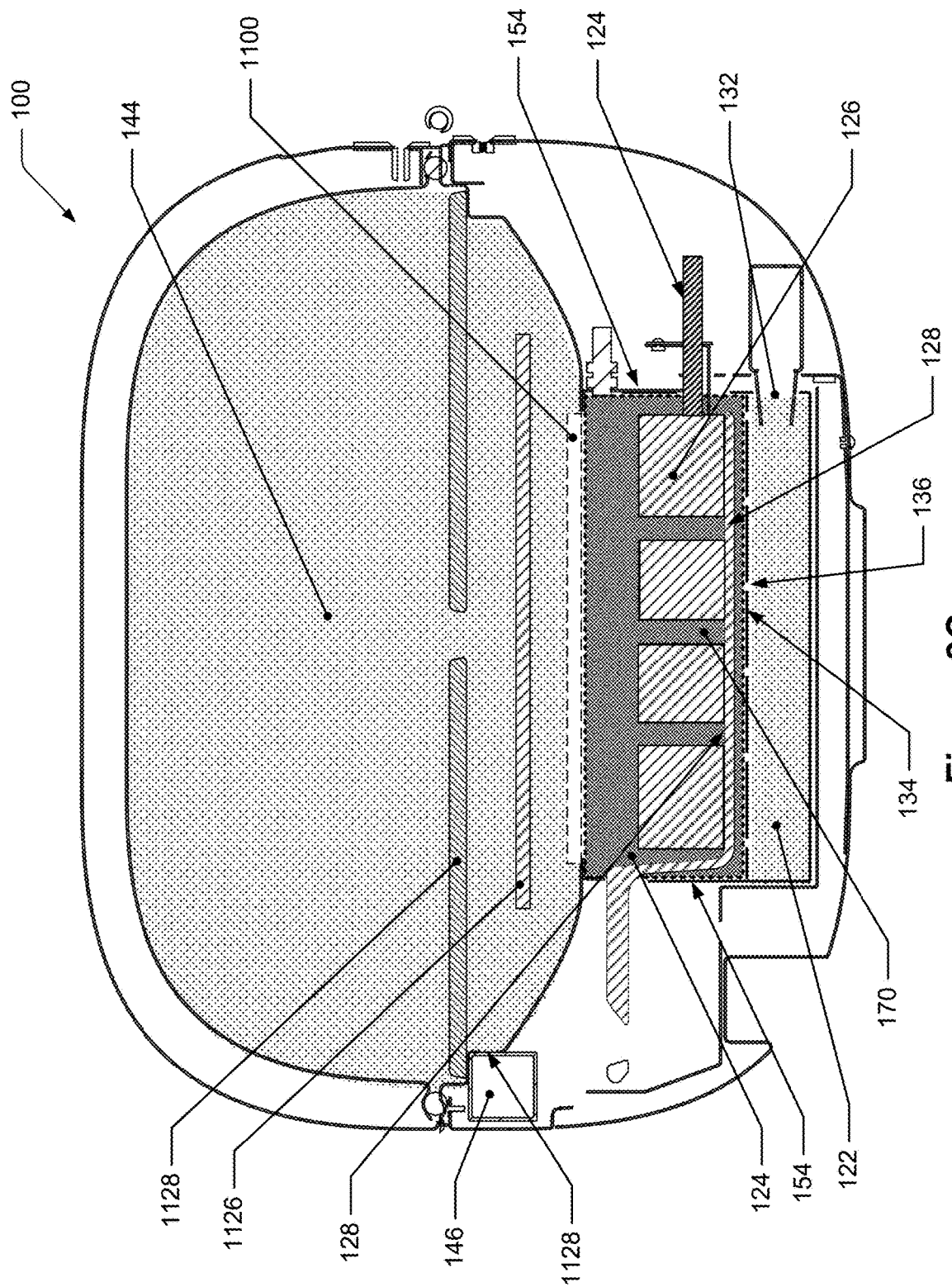
FIG. 3C depicts a second cross-sectional side view slice of the grill with the charcoal-containing fuel block.

Additional details of the grill's internal features will now be discussed. FIG. 3A depicts a cross-sectional side view of the grill of FIGS. 1A and 2, FIG. 3B depicts a first cross-sectional side view slice of the grill without the charcoal-containing fuel block, and FIG. 3C depicts a second cross-sectional side view slice of the grill with the charcoal-containing fuel block. As seen in FIGS. 3A through 3C, the lid 104 and the kettle 108 form the exterior structure of the grill 100 and partially bound the cooking chamber 144

(shown with light shading) of the grill 100. In FIG. 3A, a temperature sensor 1170, discussed in more detail below, is also positioned within the cooking chamber 144 and represented by an ellipse. In FIG. 3A and more clearly in FIG. 3B, the stoke chamber 122 is positioned underneath and in fluidic connection with the combustion chamber 124. In FIGS. 3B and 3C, a cooking grate 1127 is also seen positioned within the cooking chamber 144. As illustrated in FIGS. 3A and 3C, the charcoal-containing fuel block 126 (not shown in FIG. 3B for illustration purposes) may be positioned within the combustion chamber 124 and on one or more support surfaces 128 of the combustion chamber 124, which in some embodiments are surfaces of the fuel pan 178.

The configuration of these features allows for fast ignition of the charcoal-containing fuel block 126 as well as for controlling the temperature within the grill. The stoke chamber 122 is configured to receive and enable stoke air to flow into the combustion chamber 124 for numerous advantageous reasons. For example, flowing stoke air into the combustion chamber 124 during the ignition of the charcoal-containing fuel block 126 can accelerate and assist with this ignition. Similarly, adding stoke air to an ignited and combusting charcoal-containing fuel block 126 can assist in causing the charcoal-containing fuel block 126 to burn at a faster combustion rate and at a higher temperature.

The stoke chamber 122, sometimes referred to herein as a "stoke box," has one or more side walls, a bottom, and a top that at least partially define a plenum volume within the stoke chamber 122. In FIG. 3B, the stoke chamber 122 includes four side walls, with two side walls 130A and 130B perpendicular to the page and two side walls 130C parallel to the page (only one of which is shown in the Figure). In some embodiments, the angle between any two adjacent side walls of the stoke chamber 122 may be exactly 90° or substantially 90°, such as within about ±10°, because these adjacent side walls may not be exactly perpendicular due to manufacturing and construction imprecision or tolerances. In some embodiments, the stoke chamber 122 may have a different shape, such as a trapezoid, a cylinder forming a single circumferential side wall, a triangle with three side walls, or a hexagon with five side walls, for instance.

Figure 4:
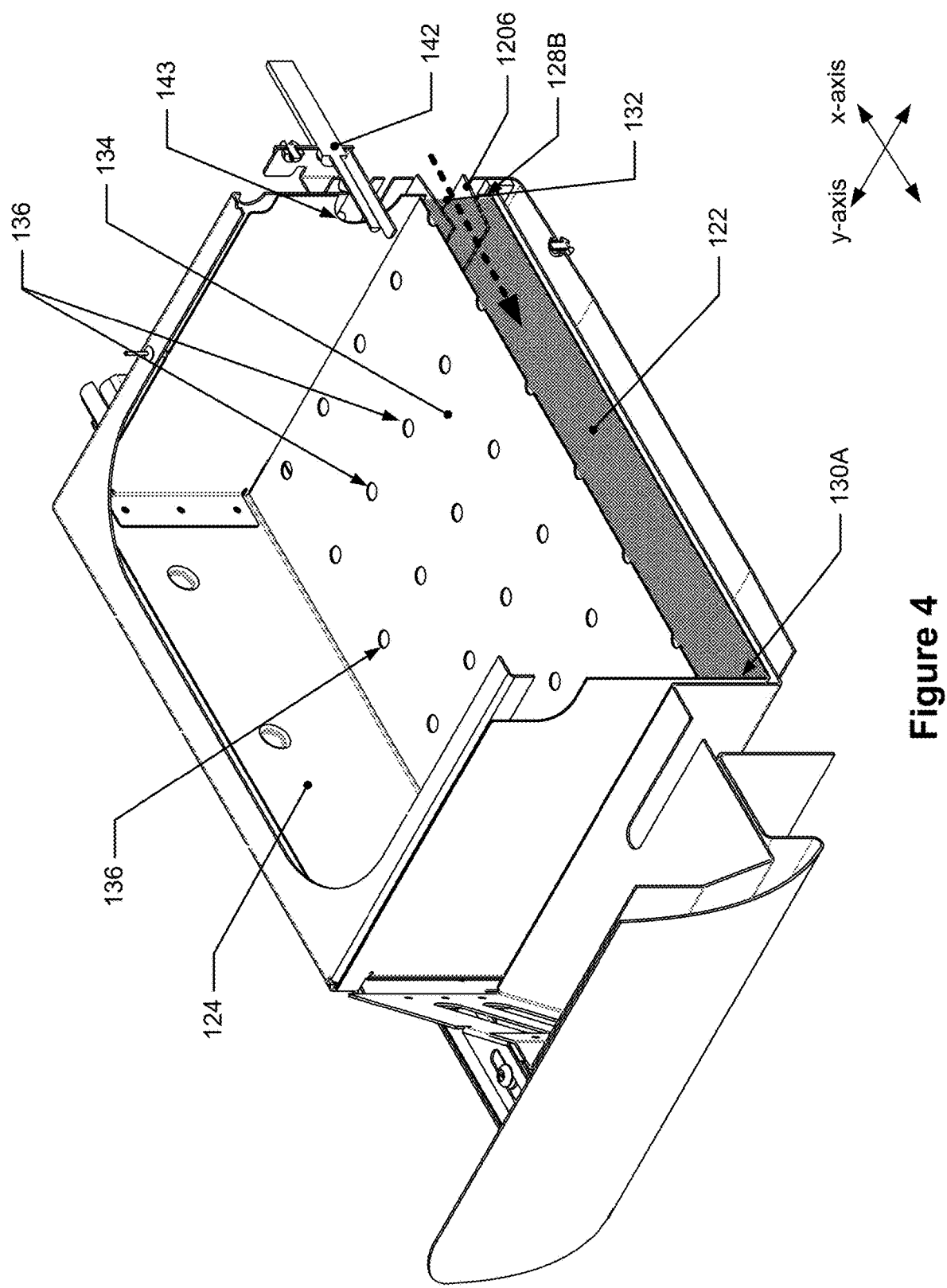
FIG. 4 depicts an off-angle cross-sectional view of the combustion chamber and stoke chamber of FIGS. 3A through 3C.

FIG. 4 depicts an off-angle cross-sectional view of the combustion chamber and stoke chamber of FIGS. 3A through 3C. As can be seen, the stoke chamber 122 top 134 includes a plurality of through-holes 136 that form the fluidic connection between the stoke chamber 122 and the combustion chamber 124. Stoke air flows from within the stoke chamber 122 through the plurality of through-holes 136 and into the combustion chamber 124. The stoke chamber 122 also includes the air inlet 132 (also identified in FIGS. 3B and 3C) that extends through one of the side walls, such as 130B. As discussed in more detail below, the stoke fan 138 (shown in FIG. 2) within the kettle 108 is configured to flow air through the stoke ducting 140 (also shown in FIG. 2) into the stoke chamber 122 as indicated by the dotted arrow in FIG. 4. In some embodiments, as can be seen, the air inlet 132 is a port or hole in the sidewall of the stoke chamber 122 through which a nozzle 1206 of the stoke ducting may extend through and into the stoke chamber 122.

The stoke chamber 122 is configured to build-up air pressure and evenly distribute stoke air to the combustion chamber 124. This configuration includes the stoke chamber 122 side walls 130 forming sealed side surfaces, except for the air inlet 132, to partially contain stoke air flowed into the stoke chamber 122. This configuration also includes the top 134 of the stoke chamber 122 having the plurality of through-holes distributed throughout the top 134 which restricts air flow between the stoke chamber 122 and the combustion chamber 124. Together, the top 134 and the side walls partially contain the stoke air which enables air pressure to build up inside the stoke chamber 122 which in turn results in a more even distribution of air flow through the top 134 via the plurality of through-holes and into the combustion chamber 134. This assists with delivering even air flow to the charcoal-containing fuel block 126 which enables even combustion and temperature control of the charcoal-containing fuel block 126.

The top 134 of the stoke chamber 122 may be configured in various ways to restrict and control the air flow between the stoke chamber 122 and the combustion chamber 124. This may include the diameter and distribution pattern of the plurality of through-holes, as well as the overall shape of the top 134. In some embodiments, the top 134 may be a planar (or substantially planar, e.g., within ±10% of flat due to manufacturing or construction inaccuracies) surface. The diameter of each through-hole may range between about 1 mm and 20 mm, and they may be spaced apart by about 2 mm to 30 mm, in some instances. Additionally, the through-holes may be distributed over the majority of the total surface area of the top 134, such as distributed over at least 60%, 75%, 85%, 90% or 95% thereof, for example.

Figure 5:
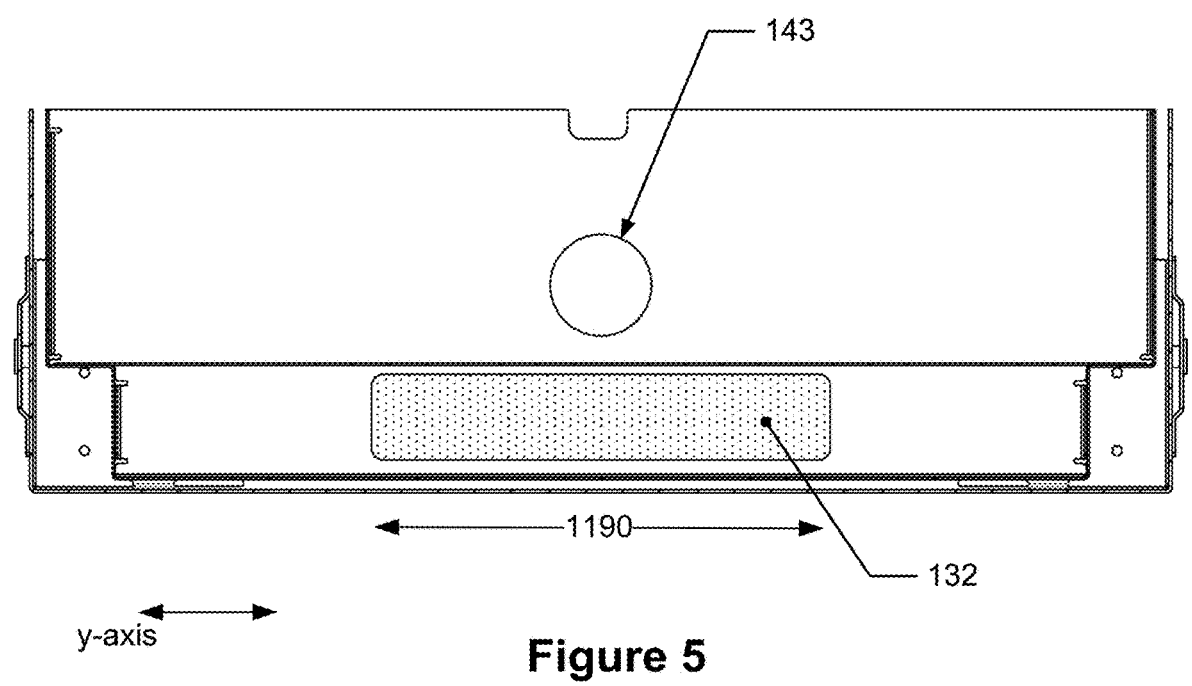
FIG. 5 depicts a cross-sectional back view of the stoke chamber of FIGS. 3A through 3C.

The configuration of the air inlet may also contribute to building up pressure within the stoke chamber and evenly distributing stoke air to the combustion chamber. FIG. 5 depicts a cross-sectional back view of the stoke chamber of FIGS. 3A through 3C. Here, the air inlet 132 is seen and its cross-sectional area is shaped with a generally rectangular cross-sectional area with rounded corners, although other shapes are possible as well. In some embodiments, air distributed along a particular length of the stoke chamber 122, such as the length 1190 as opposed to a single circular inlet, further contributes to more evenly distributing stoke air within the stoke chamber 122 and more evenly distributing stoke air to the combustion chamber 124. In some embodiments, the air inlet of the stoke chamber may have more than one fluidic port into the stoke chamber, such as a plurality of holes, or one or more ports in additional walls of the stoke chamber, such as an air inlet in at least two side walls. These additional configurations may, in some instances, provide for different air flow within the stoke chamber that may be advantageous for some charcoal-containing fuel sources.

The bottom of the stoke chamber 122 may, in some instances, have a plurality of through-holes that may allow additional air to flow into the stoke chamber 122. In some such embodiments, these through-holes may be fluidically connected to the ambient air outside the grill or to air within the kettle. This may allow for additional stoking and combustion of the charcoal-containing fuel source. In some other instances, the bottom of the stoke chamber 122 may not have any holes and instead may provide a seal with the one or more side walls. This may be advantageous for accurately controlling air flow into the stoke chamber 122 and therefore accurately controlling the temperature of the charcoal-containing fuel source.

Aspects of the combustion chamber 124 will now be discussed. As seen in FIGS. 3A and 3C, for instance, the combustion chamber 124 is configured to support, contain, and enable the combustion of the charcoal-containing fuel source. This configuration includes combustion chamber side walls 154A/B that partially define a combustion chamber plenum volume (as represented by the shading in FIGS. 3A through 3C) and a support surface 128 for supporting the charcoal-containing fuel block. In some embodiments, such as in FIGS. 3C and 4, the bottom of the combustion chamber 124 may be the top 134 of the stoke chamber 122. In some other embodiments, the bottom of the combustion chamber 124 may be a separate element that may be in contact with or offset from the top 134 of the stoke chamber 122. The combustion chamber 124 is nevertheless fluidically connected to the stoke chamber 122, as depicted in the embodiment of FIGS. 3A through 4, via the plurality of through-holes 136 in the top 134 of the stoke chamber 122 (which is also the bottom of the combustion chamber 124).

Figure 6A:
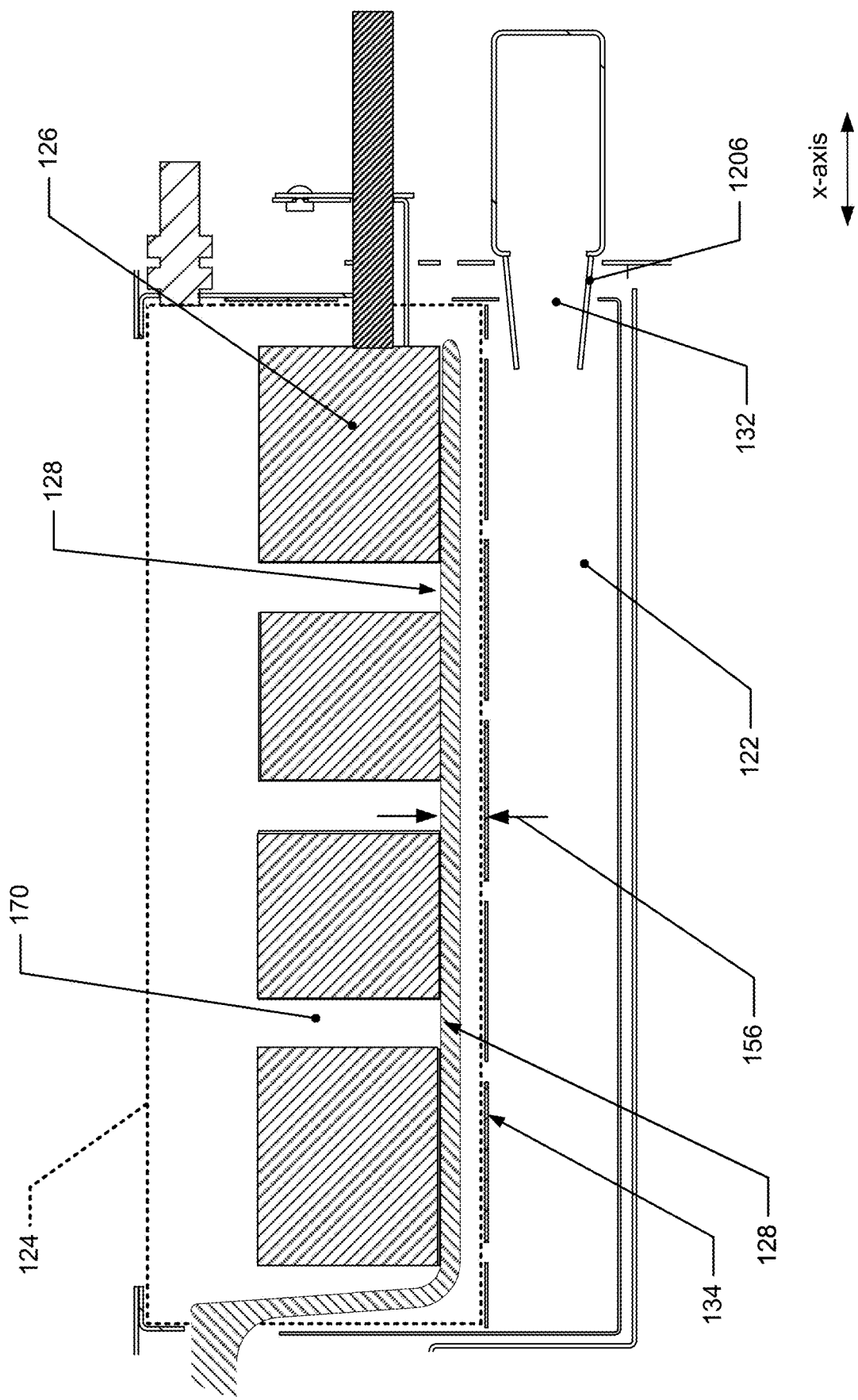
FIG. 6A depicts a first cross-sectional side view of the combustion chamber, the charcoal-containing fuel block, and the stoke box of FIG. 3A.
Figure 6B:
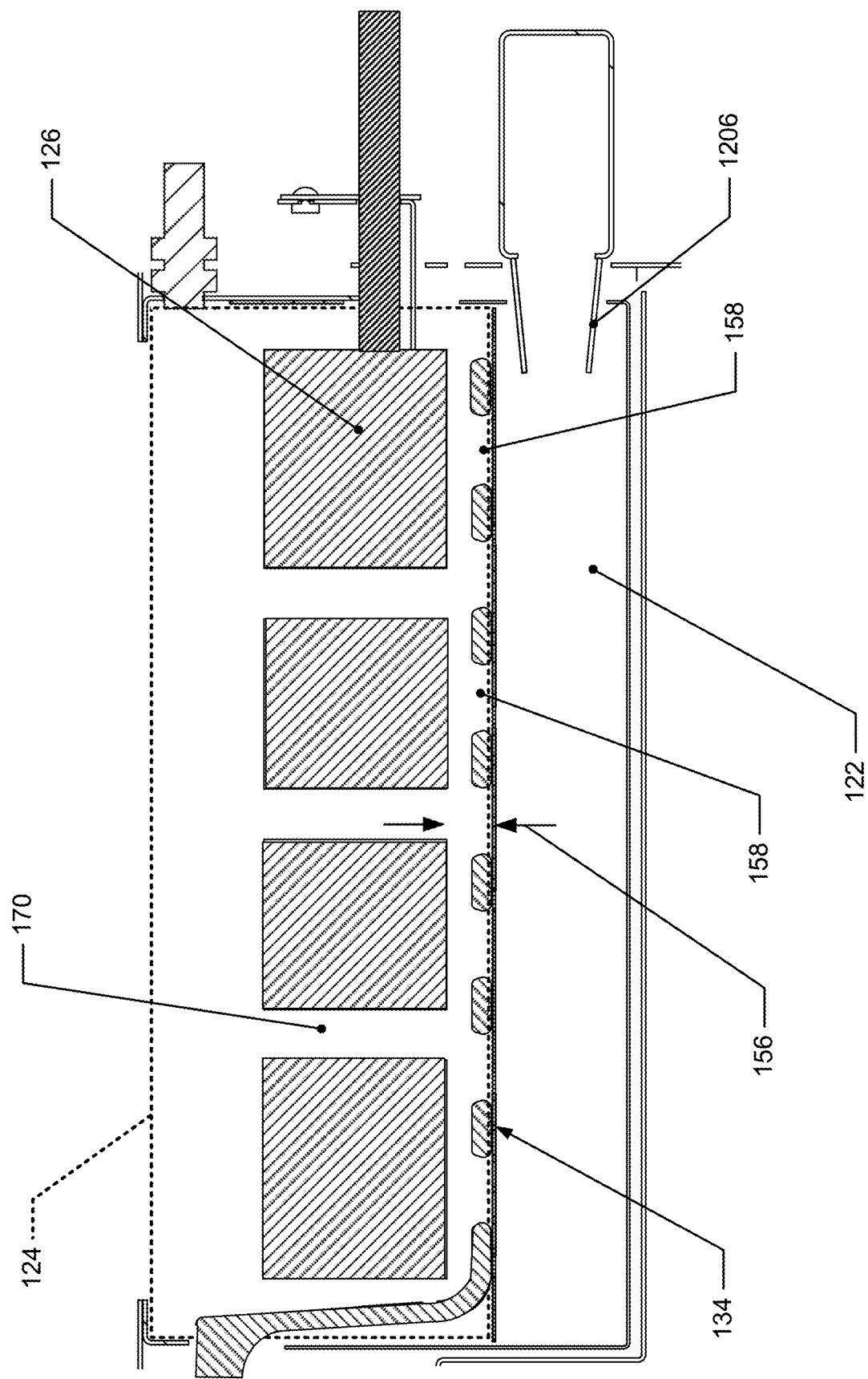
FIG. 6B depicts a second cross-sectional side view of the combustion chamber, the charcoal-containing fuel block, and the stoke box of FIG. 3A.

The combustion chamber, including the support surface, is configured to create air flow and air flow paths underneath the charcoal-containing fuel block in order to provide for more even air flow distribution to the charcoal-containing fuel block as well as to expose the bottom surfaces of the charcoal-containing fuel block to air which enables its combustion. This configuration advantageously allows for more even combustion and accurate temperature control of the charcoal-containing fuel block. FIG. 6A depicts a first cross-sectional side view of the combustion chamber, the charcoal-containing fuel block, and the stoke box of FIG. 3A; FIG. 6B depicts a second cross-sectional side view of the combustion chamber, the charcoal-containing fuel block, and the stoke box of FIG. 3A. In FIG. 6A, the top 134 of the stoke box 122 is the bottom of the combustion chamber 124. The support surface 128, discussed in more detail below is configured with a shape that supports the charcoal-containing fuel block 126 and that creates air gaps and air flow paths underneath the charcoal-containing fuel block 126 in order to provide even distribution of air to the charcoal-containing fuel block which in turn leads to even combustion and temperature control of the charcoal-containing fuel block. This support surface 128 configuration includes, in some embodiments including that shown in FIG. 6A, the support surface 128 being offset from the bottom of the combustion chamber bottom 134 by a first offset distance 156 in order to create an air gap between the bottom surface of the charcoal-containing fuel block 126 and the combustion chamber bottom 134.

As seen in FIG. 6B, the configuration of the first surface may also include a plurality of through-holes 158 that enable air to flow through the support surface 128 and to contact the charcoal-containing fuel block 126. The support surface 128 may therefore only contact p portions of the charcoal-containing fuel block at discrete, point locations, and not contact the entire bottom surface of the charcoal-containing fuel block. In some instances, the support surface 128 may be considered a compilation of individual support surfaces that are laterally offset from each other and that each contact the charcoal-containing fuel block 126 as seen in more detail in FIGS. 9A through 9D.

Figure 7:
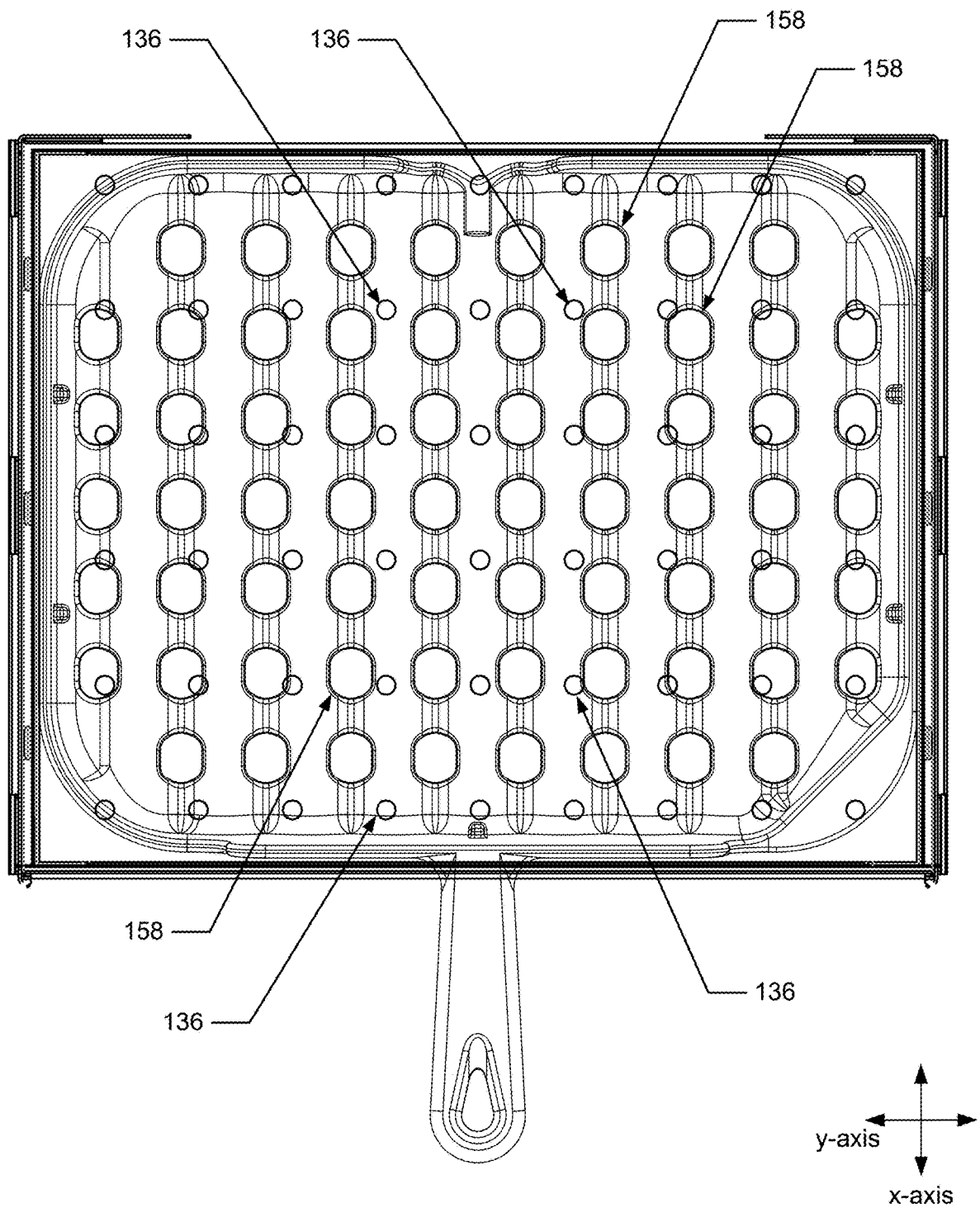
FIG. 7 depicts a top view of the support surface 128 and the combustion chamber bottom.

In some embodiments, the center axes of through-holes of the combustion chamber bottom 134 may be horizontally offset from the center axes or centroids of the through-holes 158 in the support surface 128. FIG. 7 depicts a top view of the support surface 128 and the combustion chamber bottom. Here, support surface 128 is shown transparent so that the combustion chamber 124 bottom surface 134 (which is the same as the stoke chamber 122 top surface) is visible through the support surface 128. In this embodiment, the through-holes 158 of the support surface 128 are non-circular, and instead are have a rectangular shape with rounded corners. The through-holes 136 of the combustion chamber 124 bottom 134 are also visible and have a circular shape. An axis is also shown in FIG. 7, with the x-axis running top-to-bottom in the Figure and the y-axis running side-to-side in the Figure. As can be seen, the through-holes 136 are not aligned with the through-holes 158. In some instances, as seen in FIG. 7, the center of the through-holes 136 may be offset from the through-holes 158 in both the x-direction and the y-direction. This offset between holes creates non-linear flow paths for the stoke air to flow to the charcoal-containing fuel block 126 which further aids in evenly distributing the air and controlling the temperature of the charcoal-containing fuel block 126. In some instances, aligning these through-holes so that their center axes are collinear may result in air travelling vertically through these holes and not horizontally within the combustion chamber, therefore leading to uneven air flow within the combustion chamber and uneven combustion of the charcoal-containing fuel block.

Figure 8:
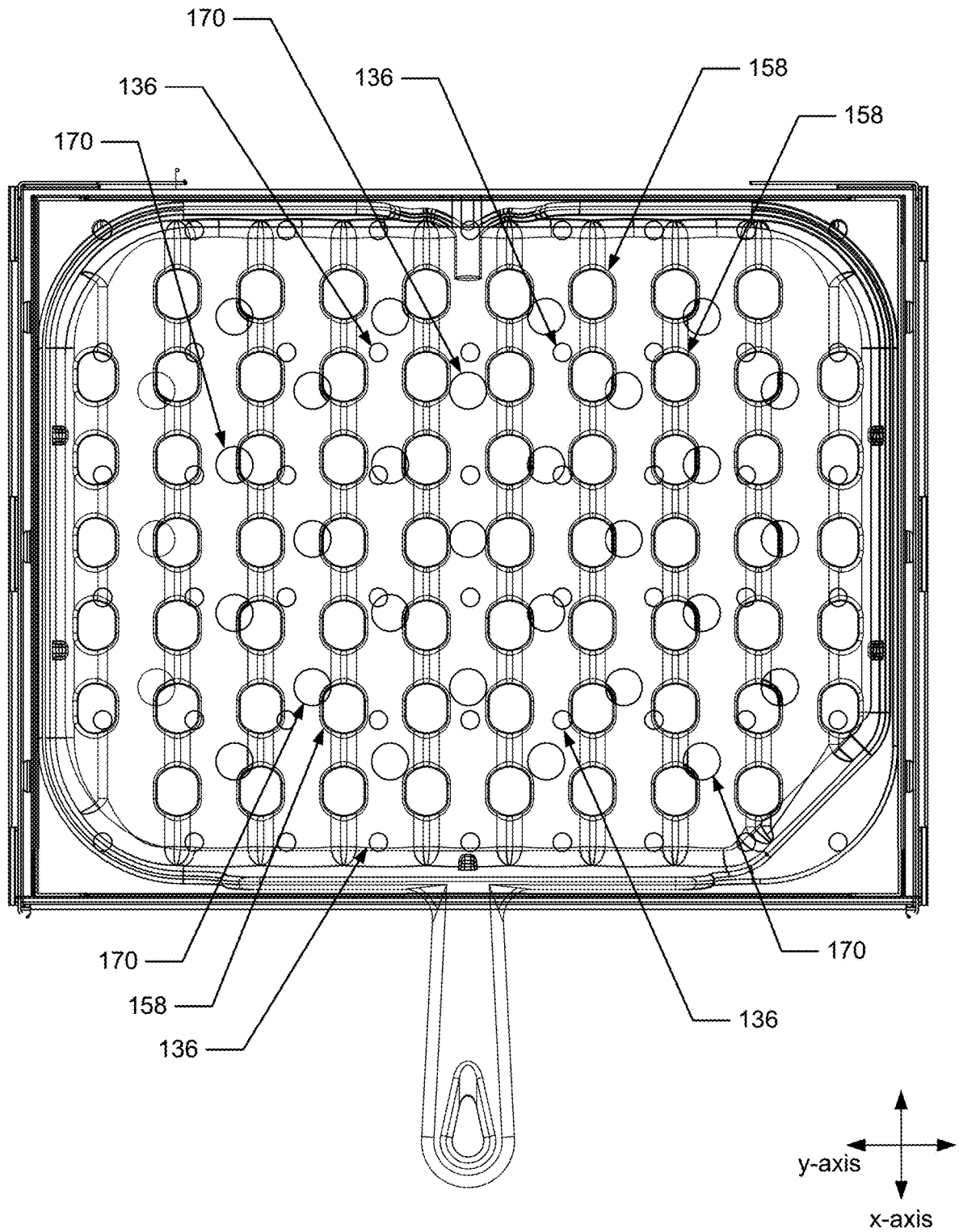
FIG. 8 depicts a top view of the support surface and the combustion chamber bottom of FIG. 7 along with a charcoal-containing fuel block.

In some embodiments, the charcoal-containing fuel block 126 may include through-holes 170 (as also identified in FIGS. 3A, 3C, 6A, and 6B) that are offset from the through-holes of the combustion chamber bottom 134 and from the through-holes 158 in the support surface 128. FIG. 8 depicts a top view of the support surface and the combustion chamber bottom of FIG. 7 along with a charcoal-containing fuel block. Here, as in FIG. 7, the support surface 128 and the charcoal-containing fuel block 126 are shown transparent so that the support surface 128 and combustion chamber 124 bottom surface 134 (which is the same as the stoke chamber 122 top surface) are visible through the charcoal-containing fuel block 126. All three sets of through-holes are visible in the Figure and as can be seen, the through-holes 158 of the support surface 128, the through-holes 136 of the combustion chamber 124 bottom 134, and the through-holes 170 of the charcoal-containing fuel block are all horizontally offset from each other such that none of them have center axes that are aligned. All these through-holes, as shown in this embodiment, are offset from the other two sets of through-holes in both the x-direction and the y-direction. For example each of the through-holes 170 of the charcoal-containing fuel block are offset from the through-holes 158 of the support surface 128 in the x- and y-directions, and are offset from the through-holes 136 of the combustion chamber 124 bottom surface 134 in the x- and y-directions.

Similar to above, this offset between through-holes again creates non-linear flow paths for the stoke air to flow to the charcoal-containing fuel block 126 which further aids in evenly distributing the air and controlling the temperature of the charcoal-containing fuel block 126. In some instances, aligning these through-holes so that their center axes are collinear may result in air travelling vertically through these holes and not horizontally within the combustion chamber, therefore leading to more uneven air flow within the combustion chamber and uneven combustion of the charcoal-containing fuel block. It will be recognized that while the above configurations may provide advantageous performance, other implementations may include instances in which such holes may be aligned in at least some cases.

The substrate support surface may, in some embodiments, be made of a plurality of surfaces including a first linear array of individual support surfaces that contact the charcoal-containing fuel block and a second linear array of second surfaces vertically offset from and spanning between adjacent individual support surfaces. In some embodiments, the second surfaces may include the support surface's plurality of through-holes. This support surface may also be a part of a removable fuel block container or support structure, referred to herein as a "fuel pan." The fuel pan is configured to receive and hold the charcoal-containing fuel block 126, and to be removeable from and replaceable into the combustion chamber. The fuel pan may also be considered a removable part of the combustion chamber itself.

Figure 9A:
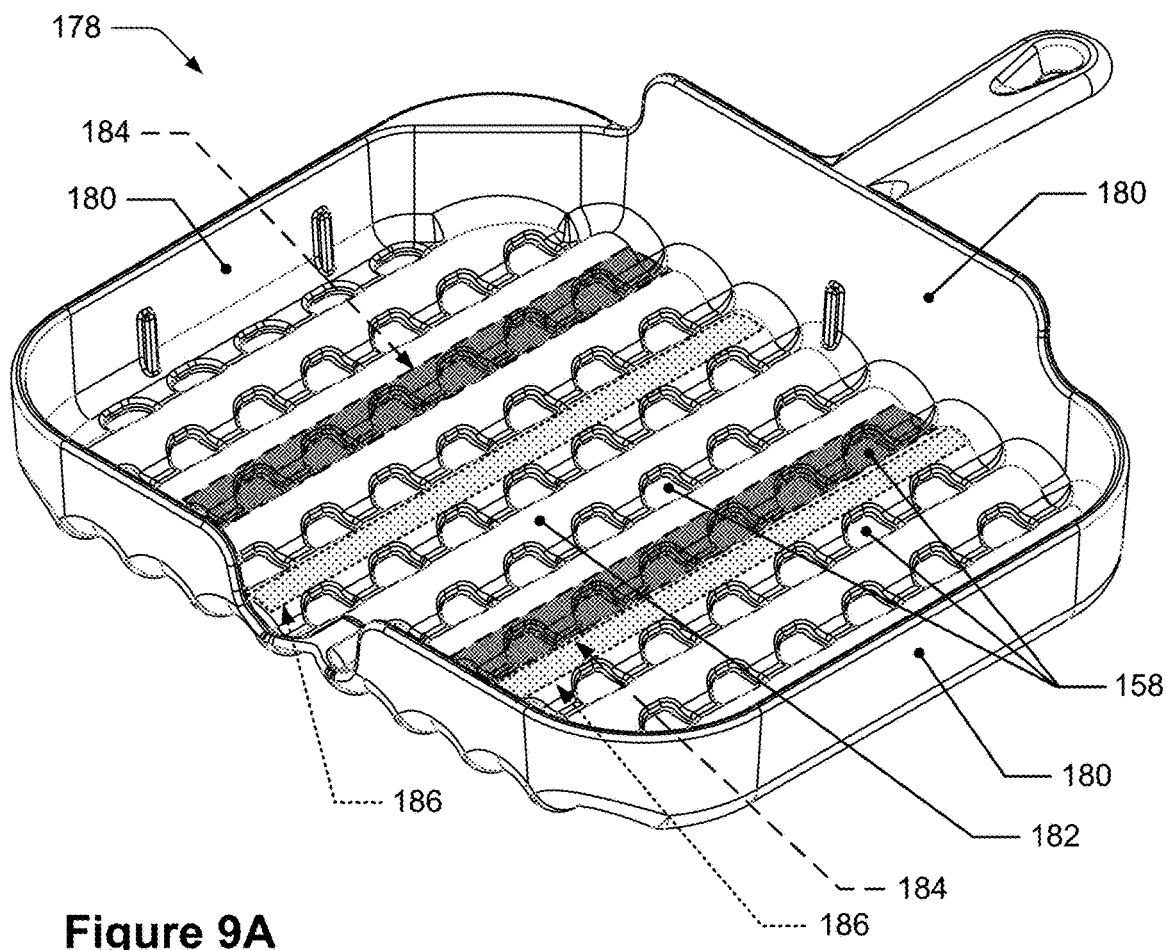
FIG. 9A depicts an isometric view of a fuel pan.
Figure 9B:
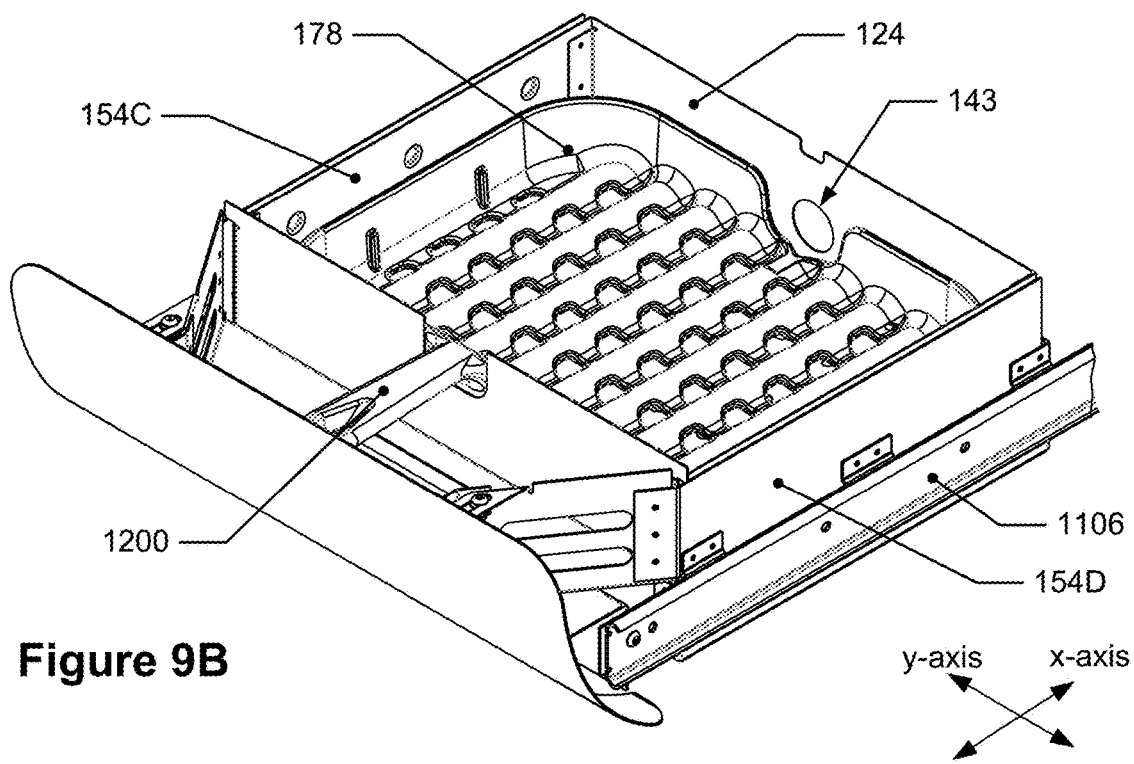
FIG. 9B depicts an isometric view of the fuel pan positioned within a combustion chamber.
Figure 9C:
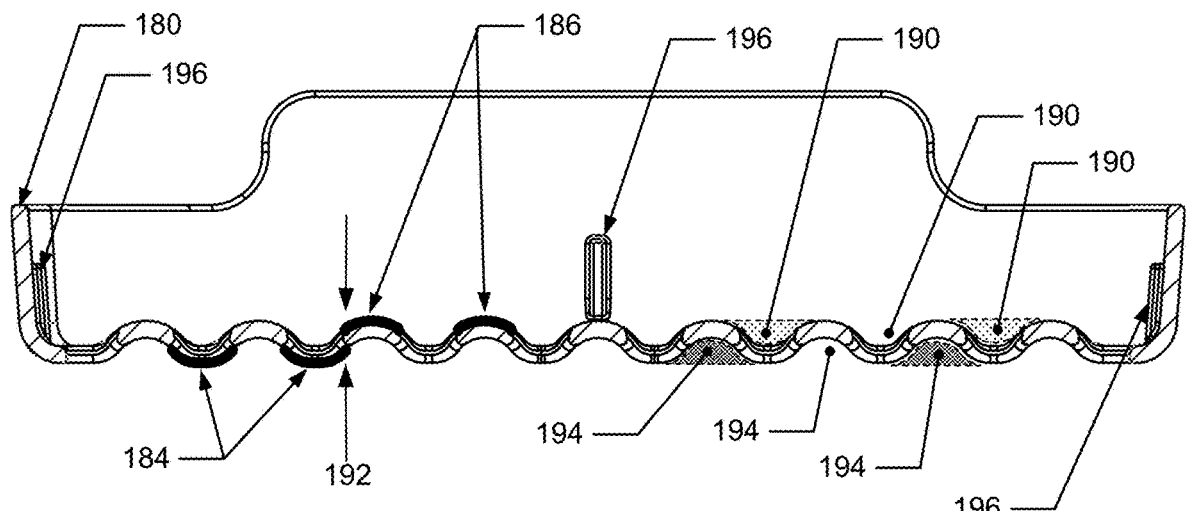
FIG. 9C depicts a cross-sectional front view of the fuel pan.
Figure 9D:
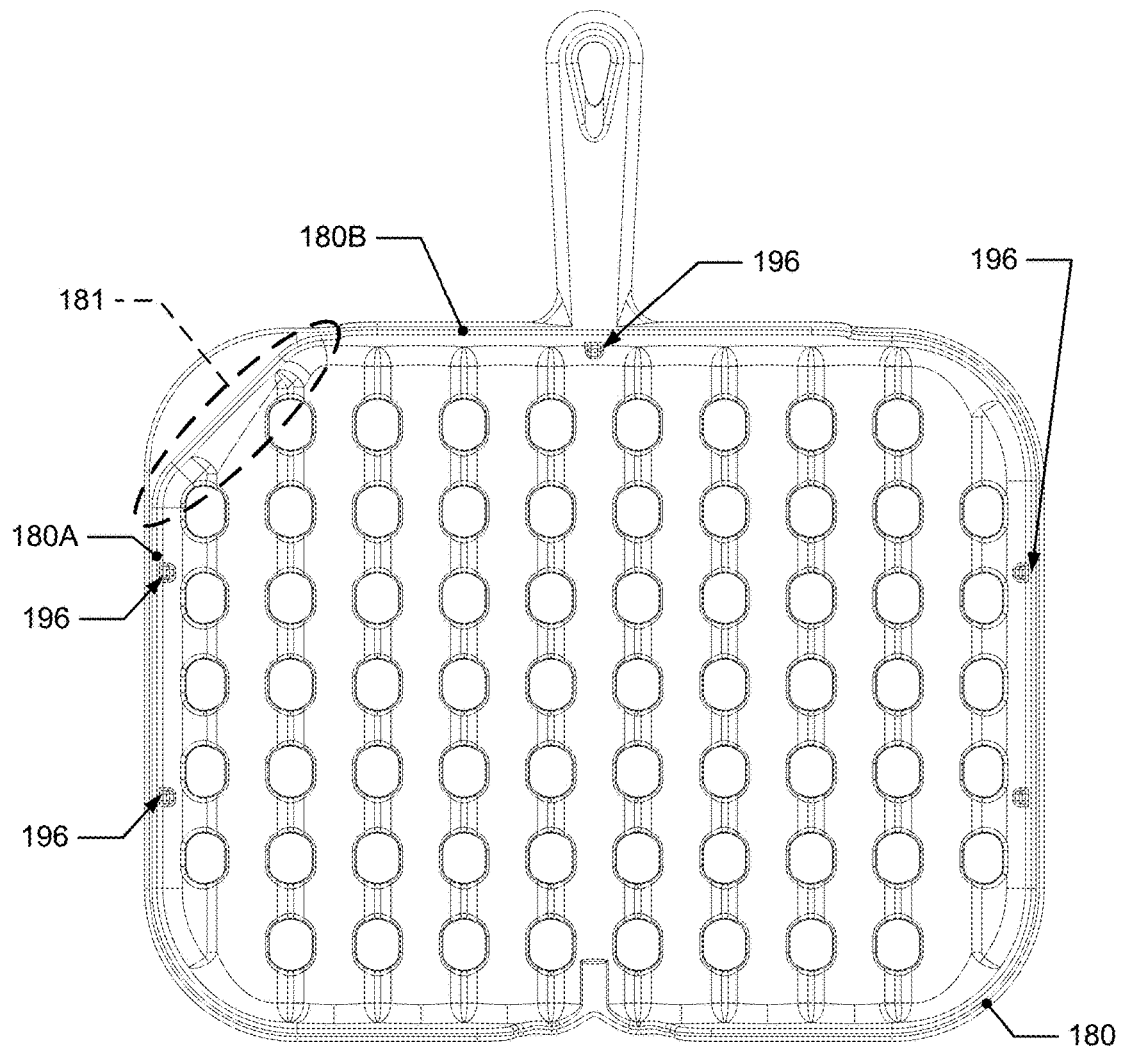
FIG. 9D depicts a top view of the fuel pan.

FIG. 9A depicts an isometric view of a fuel pan, FIG. 9B depicts an isometric view of the fuel pan positioned within a combustion chamber, FIG. 9C depicts a cross-sectional front view of the fuel pan, and FIG. 9D depicts a top view of the fuel pan. As seen in FIG. 9A, the fuel pan 178 includes side walls 180 and a nonplanar bottom surface 182 having a first array of grooves 184 that extend linearly along the x-axis (two of which are highlighted with dark shading) and are vertically offset lower than an array of semi-circular support surfaces 186 (two of which are highlighted with light shading) that extend linearly along the x-axis (alternatively, the grooves and support surfaces may extend linearly along the y-axis). These semi-circular support surfaces 186 together form the support surface 128 that supports the charcoal-containing fuel block 126. The fuel pan 178 also includes a plurality of through-holes 158 extending through the linear grooves 184 which may be considered the through-holes 158 in the support surface described above. When positioned within the combustion chamber 124, the bottom of the linear grooves 184 may rest on the bottom 134 of the combustion chamber 124.

In FIG. 9B, the fuel pan 178 includes a handle 1200 so a user can hold the fuel pan 178 in order to remove consumed fuel from the grill. Additionally, as discussed in more detail below, the combustion chamber 124 includes an igniter opening 143 through which the igniter 142 may extend into the combustion chamber 124 and contact the charcoal-containing fuel block.

As seen in the cross-sectional view of FIG. 9C, the linear grooves 184 (two of which are labeled and highlighted as heavy-weight lines) are vertically offset lower than the array of linear semi-circular support surfaces 186 (also labeled and highlighted as heavy-weight lines) by a vertical distance 192. The shape of these features together, which make up the support surface 128, may be a sinusoidal shape as illustrated. When a charcoal-containing fuel block 126 is positioned on the semi-circular support surfaces 186, the configuration of the fuel pan bottom surface 182 creates air pockets and flow paths underneath the charcoal-containing fuel block 126. First flow paths 194, two of which are highlighted with shading, are between the combustion chamber bottom 134 and the underside of the semi-circular support surfaces 186 and stoke air flows into these first flow paths 194 through the through-holes 136 in the combustion chamber bottom 134, and from these flow paths to second flow paths 190. The second flow paths 190, two of which are highlighted with shading, are between the support surface 128, which here are the linear grooves 184, and the charcoal-containing fuel block. Air flows from the first flow paths 194 to the second flow paths 190 via the through-holes 158 in the support surface 128 described above.

As discussed above, the spaces underneath the semi-circular support surfaces 186, i.e., the first flow paths 194, allow for air to flow within the combustion chamber 124 and evenly distribute within this combustion chamber. Similarly, the spaces between the support surface 128 and the charcoal-containing fuel block, i.e., the second flow paths 190, also allow air to flow within the combustion chamber 124 and evenly distribute underneath and to the charcoal-containing fuel block.

In some embodiments, like those depicted herein, the first and second flow paths may be oriented perpendicular, or substantially perpendicular (e.g., within ±1%, ±5%, ±10%, or ±20% of perpendicular), to the air inlet 132 to the stoke chamber 122. This may further provide for even air distribution and pressure build up within the stoke chamber. For example, referring back to FIG. 6A, the air inlet is oriented perpendicular to the x-axis and parallel to the y-axis, which are the same axes in FIGS. 7 and 8 and applicable to the other Figures as shown, including in FIGS. 4, 5, and 9B.

In some embodiments, the fuel pan may have a different nonplanar surface, such as a surface with pedestals or mesas for supporting the charcoal-containing fuel block. This surface may also include through-holes that extend through this surface in order to allow air to flow through the through-holes of the combustion chamber bottom 134 and to the charcoal-containing fuel block. Each of these pedestals or mesas may provide discrete, point support for the charcoal-containing fuel block such that the top surface of each pedestal or mesa together forms the support surface.

In some embodiments, the fuel pan may be made of a material or materials that can withstand high temperatures without damage, for instance, cast iron or porcelain-enameled cast iron.

The fuel pan may also include aligning surfaces configured to position the charcoal-containing fuel block in a desired position within the fuel pan. In FIGS. 9C and 9D, the aligning surfaces 196 are surfaces that extend out from the fuel pan side walls 180. By using these aligning surfaces 196, the charcoal-containing fuel block is positioned such that its through-holes, if it has them, are properly aligned within the combustion chamber to provide for evenly distributed air flow in the combustion chamber. Additionally, these aligning surfaces create a horizontal gap or offset between the fuel pan side walls 180 and the charcoal-containing fuel block to act as a thermal break between these two features and to allow air to flow between these surfaces. It is desirable to transfer the heat generated by the charcoal-containing fuel block to the cooking chamber instead of heating elements within the combustion chamber. This thermal break therefore at least partially reduces the charcoal-containing fuel block from transferring thermal energy through direct physical contact to the fuel pan side walls 180 which advantageously allows heat to transfer from the charcoal-containing fuel block vertically towards the cooking chamber.

The support surface 128 configuration may also contribute to minimizing heat transfer to the fuel pan and to facilitate vertical heat transfer. This may be accomplished by minimizing the direct physical contact between the bottom of the charcoal-containing fuel block and the fuel pan, which in turn minimizes the direct heat transfer through surface contact. As mentioned above, the configuration of the nonplanar surface shown in the fuel pan 178 of FIGS. 9A through 9D, and a fuel pan with support pedestal or mesas, may have minimal physical contact that in turn minimizes unwanted heat transfer to the fuel pan.

Figure 10A:
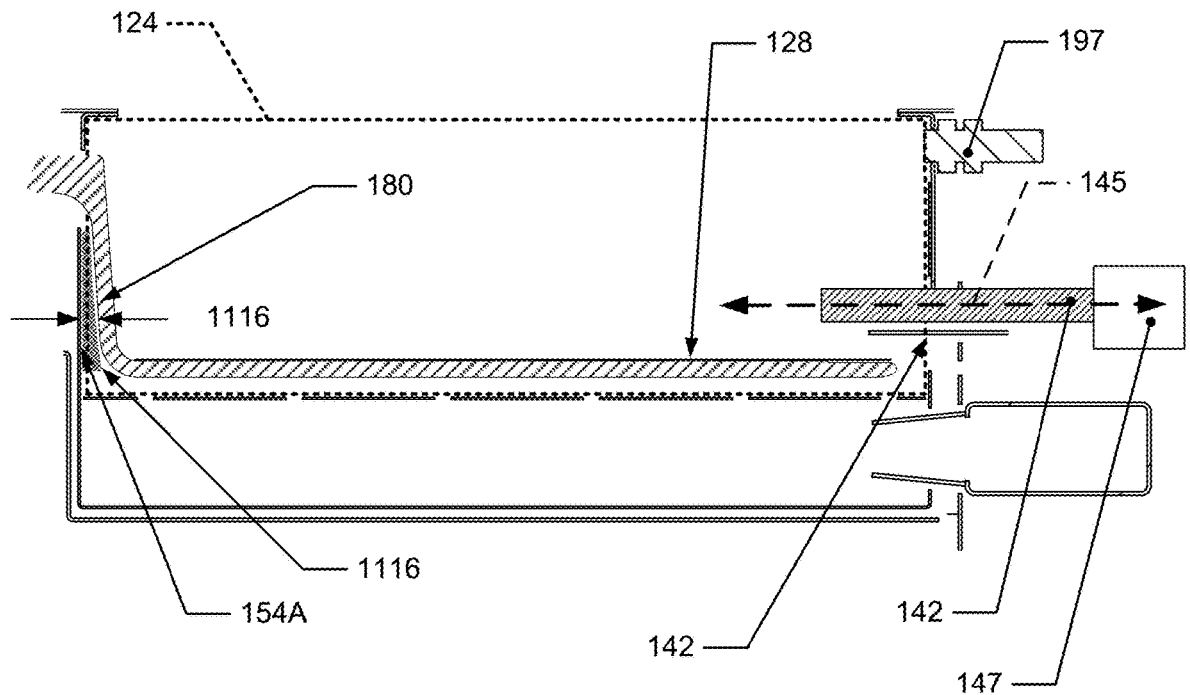
FIG. 10A depicts one portion of this thermal break or gap.
Figure 10B:
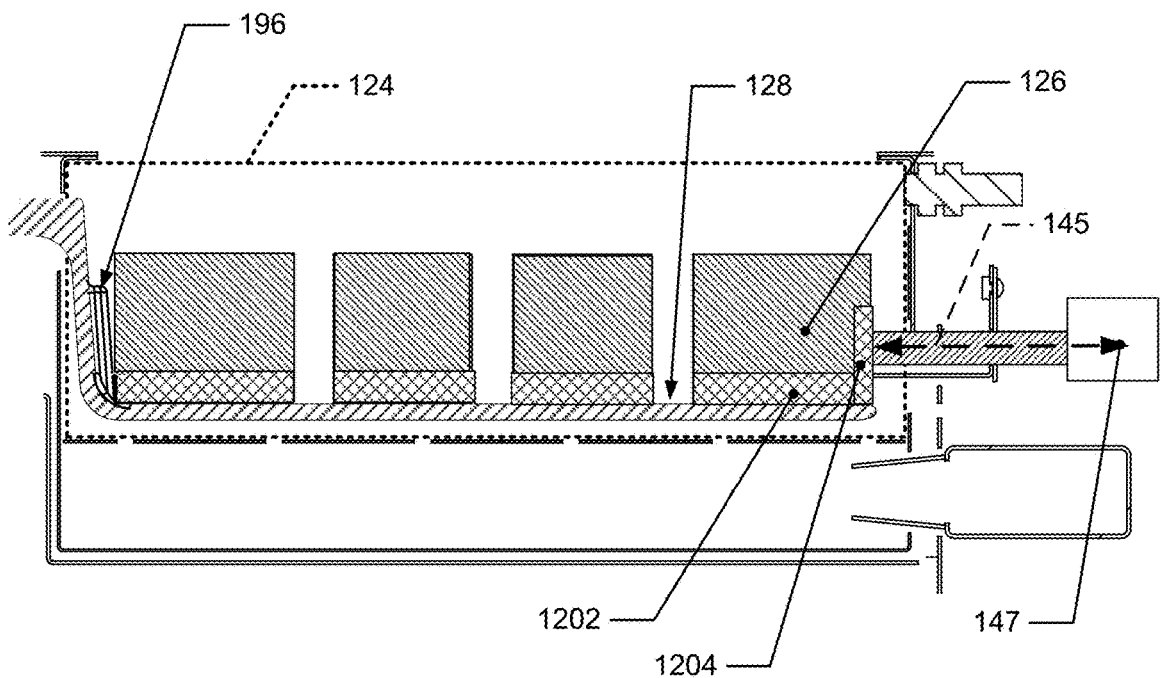
FIG. 10B depicts the stoke box and combustion chamber of FIG. 10A with a charcoal-containing fuel block.

The configuration of the combustion chamber 124, including the fuel pan 178, further enables the ignition of the charcoal-containing fuel block. This configuration includes positioning the charcoal-containing fuel block within the combustion chamber so that the igniter 142 can contact, and remain in contact with, the charcoal-containing fuel block. FIG. 10A depicts a cross-sectional side view of the stoke box and combustion chamber without a charcoal-containing fuel block and FIG. 10B depicts the stoke box and combustion chamber of FIG. 10A with a charcoal-containing fuel block. As can be seen, and as mentioned above, the igniter 142 extends through an igniter opening 143 into the combustion chamber 124. The combustion chamber 124 also may include a temperature sensor 149 configured to generate temperature data regarding the temperature inside the combustion chamber in order to, for example, detect whether ignition of the charcoal-containing fuel block has occurred.

When a charcoal-containing fuel block 126 is positioned on the support surface 128 in the combustion chamber 124, the igniter is configured to contact the charcoal-containing fuel block as seen in FIG. 10B. In some embodiments, this configuration may include the igniter 142 being movable along a horizontal axis 145 (as indicated by the double arrows) and a resistive force member 147, such as a spring, that exerts a force along the horizontal axis 145 so that the igniter 142 pushes against the charcoal-containing fuel block 126, e.g., when the combustion chamber 124 is moved along the x-axis so as to contact the igniter 142. The aligning surfaces of the fuel pan 178 described above may position the charcoal-containing fuel block 126 so that it can be contacted by the igniter 142 and remain in position within the fuel pan 178 during this contact. In FIG. 10B, one aligning surface 196 is illustrated.

In some embodiments, the igniter may be a solid or composite material that is configured to generate heat. In some instances, the igniter may be a silicon nitride igniter that, when provided with an electrical current, can heat to a temperature of approximately 1,300° C., and can do so relatively quickly, such as at approximately 3 seconds or 5 seconds, for example. The silicon nitride may be various compositions, such as $Si_3N_4$ and may have an embedded electrical component, such as a tungsten wire. In some instances, the igniter may include a resistive wire, that when provided with an electrical current, can heat to a temperature greater than approximately 400° ° C., for example. In some other instances, the igniter may generate a flame, such as a propane-fuel flame, or may generate an arc between two electrodes, or may generate heat and light such as a heat lamp or laser. In some instances, contact with the charcoal-containing fuel block does not occur.

In some embodiments, combustion chamber 124 and the igniter 142 are configured such that the igniter 142 contacts an ignition pad on the charcoal-containing fuel block when it is inserted into the combustion chamber. In some such instances, the charcoal-containing fuel block may have a plurality of layers, including a charcoal layer and an ignition layer that burns at a faster combustion rate than the charcoal layer. The charcoal-containing fuel block may have an ignition pad that is a portion of the ignition layer that forms a part of the exterior surface of the charcoal-containing fuel block. Referring to FIG. 10B, an ignition layer 1202 having an ignition pad 1204 is seen in the charcoal-containing fuel block 126. The igniter 142, combustion chamber 124, the support surface 128, and the aligning surfaces 196 are configured such that the ignition pad 1204 is in contact with the igniter 142 when it is positioned in the combustion chamber 124. Igniting the ignition pad 1202 may ignite the ignition layer in the charcoal-containing fuel block 126 which in turn ignites other portions of the charcoal-containing fuel block 126, such as one or more charcoal layers and one or more flavor layers.

In some embodiments, the fuel pan may also include an aligning feature that is also configured to cause the charcoal-containing fuel block to be positioned in the correct orientation within the combustion chamber such that the igniter can contact the ignition pad within the combustion chamber and, in some instances, such that the charcoal-containing fuel block's top and bottom are in the intended orientation. Referring back to FIG. 9D, the fuel pan 178 includes an aligning feature 181 that is an angled surface spanning between two adjacent side walls 180A and 180B. The fuel pan 178 does not have a perpendicular or radiused corner here, but rather it may be considered to have a chamfered corner. The cross-sectional area of the fuel pan 178 may therefore not be perfectly or exactly square or rectangular, but rather may have one corner with a chamfer or angled corner. The charcoal-containing fuel block may also be similarly shaped, i.e., with an angled surface at a corner, or a chamfer, such that there is only one orientation in which the charcoal-containing fuel block may be placed in the fuel pan—the charcoal-containing fuel block's angled corner is to be placed in the same corner as the fuel pan's angled corner.

Figure 9E:
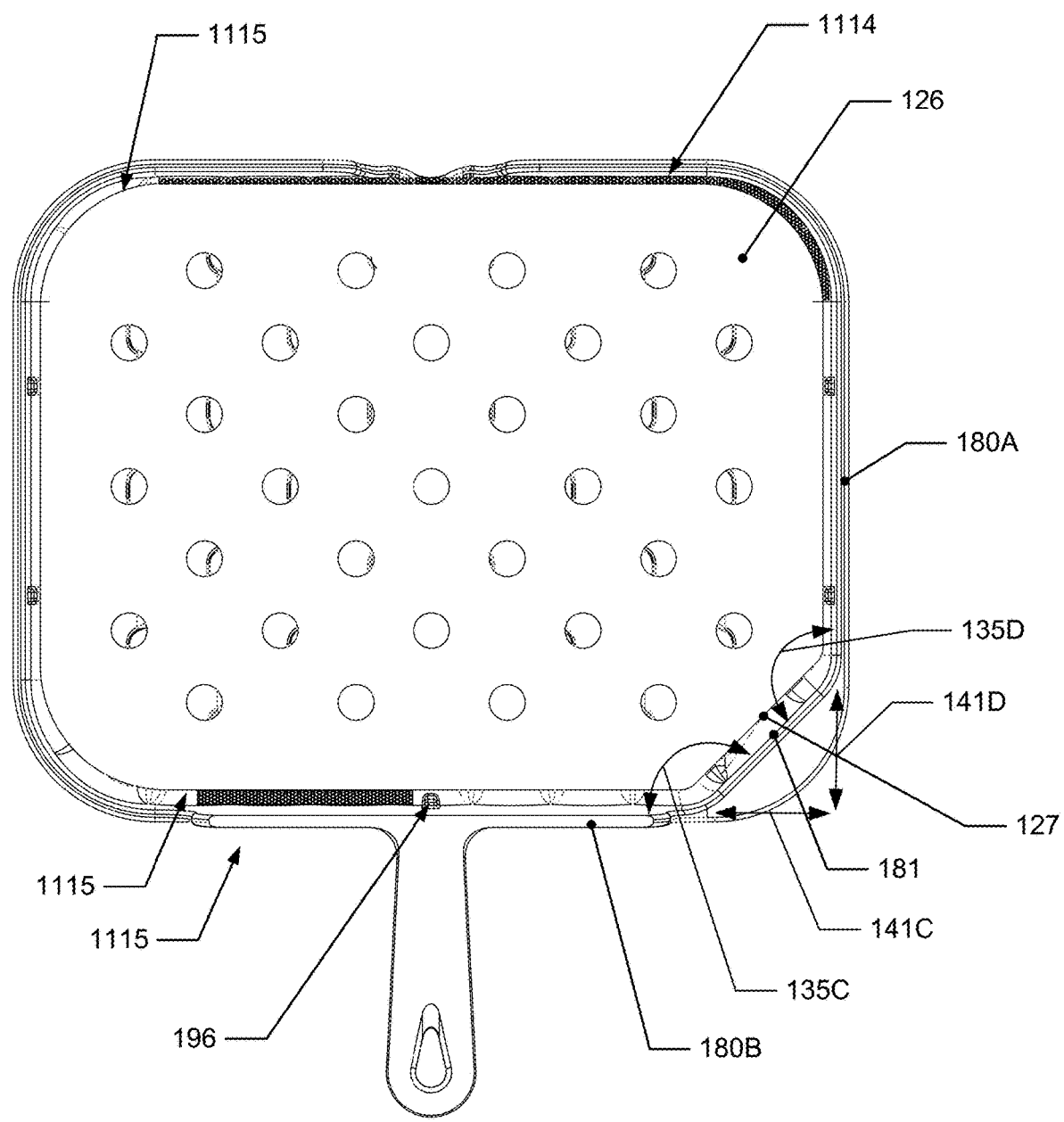
FIG. 9E depicts a top view of the fuel pan of FIG. 9D with a charcoal-containing fuel block inserted therein.

FIG. 9E depicts a top view of the fuel pan of FIG. 9D with a charcoal-containing fuel block inserted therein. As can be seen, the fuel pan's aligning feature 181 spans between a first side wall 180A and a second side wall 180B of the fuel pan 178; as seen, these side walls are perpendicular, or substantially perpendicular to each other (e.g., within ±10% of perpendicular), and the aligning feature 181 is oriented at oblique angles 135C and 135D to the these side walls. The aligning feature 181 may also have a length 141C and a height 141D which may be equal to each other. The charcoal-containing fuel block includes a block aligning surface 127 that also spans between two adjacent sides 129A and 129B and is oriented at an oblique angle to these sides. This may again be considered a chamfer of one corner of the charcoal-containing fuel block. The angle of the aligning feature 181 and the block aligning surface 127 may be the same or substantially the same, e.g., within ±10%, ±25%, or ±35% of each other. As can also be seen, the fuel pan 178 shape and configuration allow the charcoal-containing fuel block to be positioned within the fuel pan 178 in a single position and orientation. This may advantageously position the charcoal-containing fuel block so its ignition pad is in contact with the igniter, and advantageously orient the charcoal-containing fuel block so its bottom is in contact with the support surface 128 and its top faces the cooking chamber. As discussed in more detail below, the charcoal-containing fuel block may be configured with specific layers that are oriented and configured to burn in a specific sequence, such as the bottom layer combusting first. If the charcoal-containing fuel block is not properly oriented, it may not ignite or combust properly.

It is further desirable to configure the surfaces of the kettle to create a chimney that contains and directs air upwards to the fuel block and contains and directs air and heat generated by the charcoal-containing fuel block to the cooking chamber. This configuration includes, in part, creating a sealed, or mostly sealed, flow path from the stoke chamber 122, through the combustion chamber 124, and to the cooking chamber, as well as creating thermal breaks to enable vertical heat transfer to the cooking chamber and to prevent or reduce unwanted lateral thermal heat transfer. As mentioned above, for containing and directing the stoke air, the stoke chamber 122 has side walls that are sealed to create a plenum volume, an air inlet to receive the stoke air, and a top with a fluidic connection to the combustion chamber. This configuration contains air within the stoke chamber and directs air from the stoke chamber upwards through the top of the stoke chamber and into the combustion chamber; air is not directed laterally in this air flow, but rather vertically.

Similarly, the air and smoke within the combustion chamber are contained within the plenum volume created by the combustion chamber's side walls, and this air and smoke are directed upwards by the combustion chamber's open top and fluidic connection to the cooking chamber. In some embodiments, the combustion chamber's side walls are sealed to other surfaces within the kettle in order to create a sealed, or mostly sealed, fluidic connection between the combustion chamber and the cooking chamber. Referring back to FIG. 3B, the combustion chamber 124 has an open top and the side walls that contact a drip tray 198 which may bound a part of the cooking chamber 144. The drip tray 198 also includes an opening 1100 aligned with the combustion chamber 124 top such that heat and air within the combustion chamber 124 flows into the cooking chamber 144 through the opening 1100. This alignment may include positioning the center axis 1102 of the opening 1100 such that it is collinear, or substantially collinear such as within ±10%, ±20% of collinear, with the center axis of the combustion chamber 124. This may also include configuring the shape of the opening such that has the substantially similar size and shape to the combustion chamber cross-sectional shape. For example, the combustion chamber 124 of FIGS. 2 and 3B is a rectangle having a first length and a first width, and the drip tray opening 1100 may have a second length and a second width that are substantially similar to the first length and the first width, such as within ±10% or ±20% of each other.

In some embodiments, the drip tray 198 may also include overlapping seal surfaces that are configured to provide a seal, or partial seal, around the combustion chamber 124. In some implementations, these overlapping surfaces may engage with one or more surfaces of the combustion chamber; these overlapping surfaces may also provide thermal breaks within the kettle 104. As identified in FIG. 3B, and further illustrated in FIG. 11C (discussed below), two overlapping seal surfaces 1102A and 1012B of the drip tray 1100 are visible and are engaged with, i.e., in contact with, two side walls 154A and 154B, respectively, of the combustion chamber 124. The drawer 1104 is in an open position so the two overlapping seal surfaces 1102A and 1012B of the drip tray 1100 are not yet engaged with, i.e., in contact with, the two side walls 154A and 154B. However, when the drawer 1104 is in a closed position, this engagement, or contact, between surfaces provides at least a partial seal between the combustion chamber 124 and the drip tray 1100 in order to enable air and heat generated within the combustion chamber 124 to travel upwards into the cooking chamber 144.

Figure 11A:
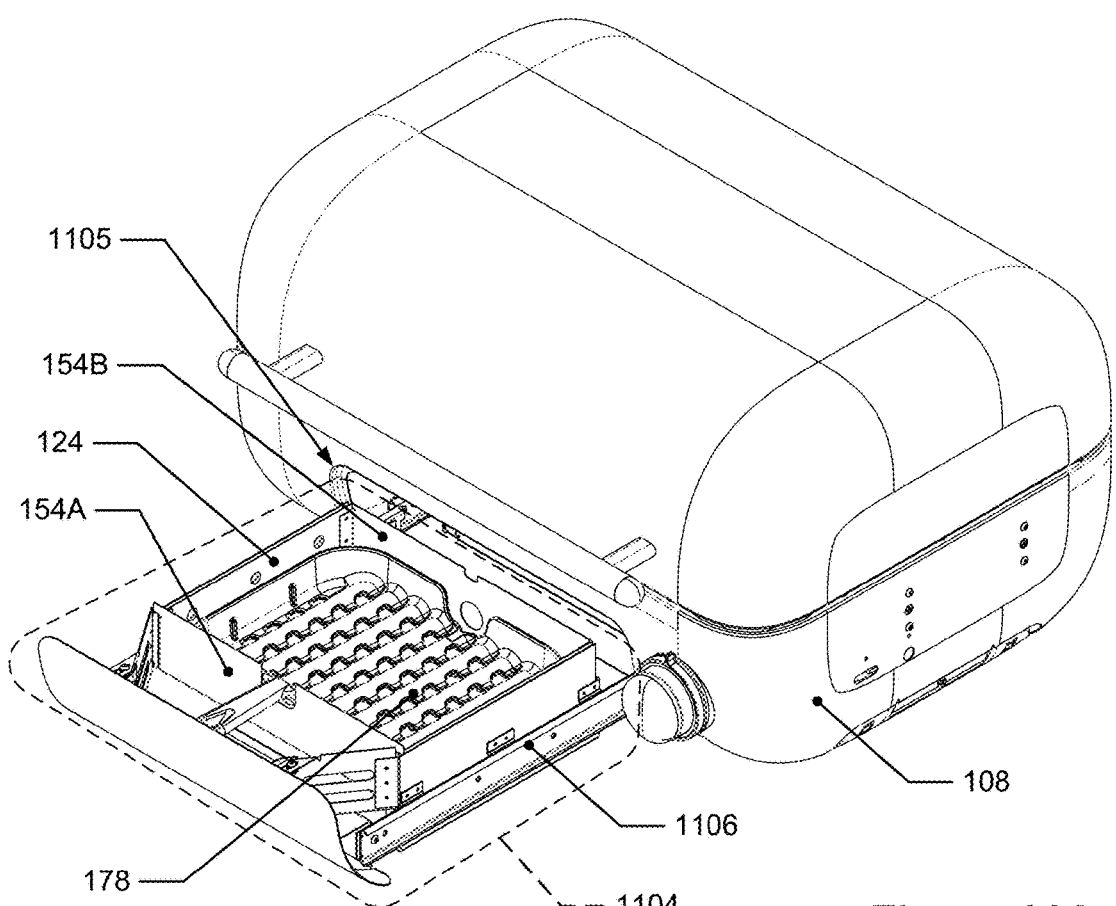
FIG. 11A depicts an isometric view of the grill of FIG. 1 with a drawer in an open position.
Figure 11B:
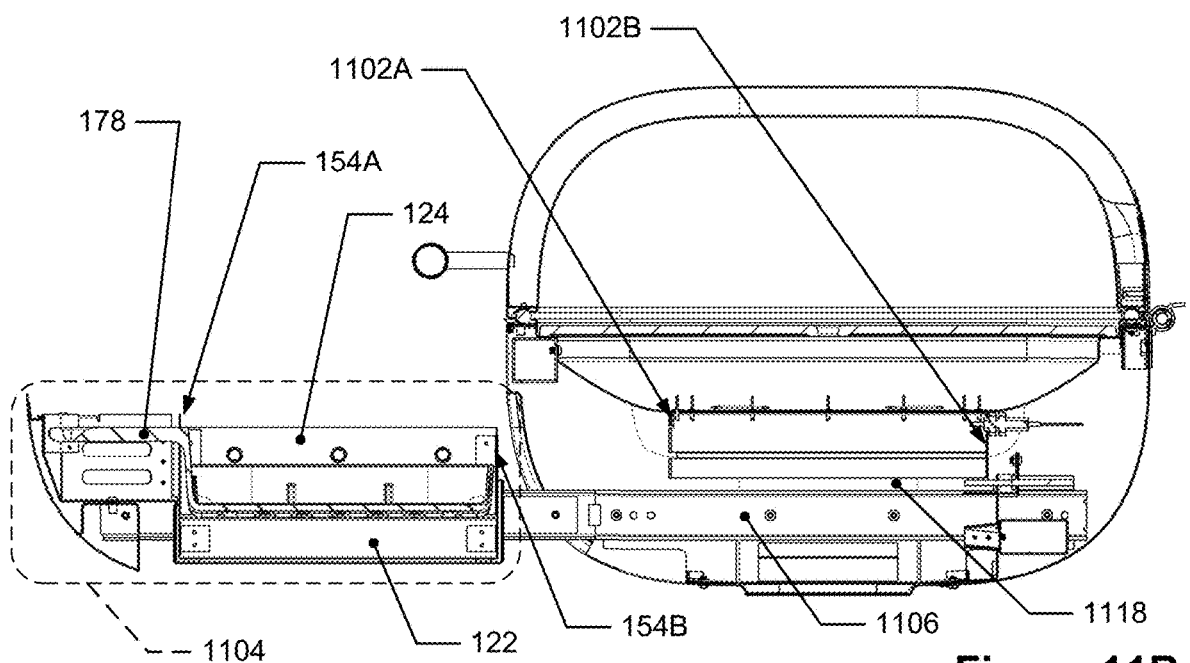
FIG. 11B depicts a cross-sectional side view of the grill and drawer of FIG. 11A.

In some embodiments, the combustion chamber and the stoke chamber may be moveable into and out of the kettle. This may include the combustion chamber and the stoke chamber being a part of a moveable drawer. To enable this movability, the connection and engagement between the combustion chamber and the drip tray may be able to be repeatedly separated and reconnected. FIG. 11A depicts an isometric view of the grill of FIG. 1 with a drawer in an open position, FIG. 11B depicts a cross-sectional side view of the grill and drawer of FIG. 11A, FIG. 11C depicts a cross-sectional side view of the grill and drawer of FIG. 11A, and FIG. 11D depicts a cross-sectional side view of the drawer in a closed position. In FIG. 11A, the drawer 1104 is encompassed by the dashed shape and includes the combustion chamber 124 and the stoke chamber 122 (not visible), and the fuel pan 178. The kettle 108 includes an opening 1105 large enough for the combustion chamber 124 and the stoke chamber 122 to move into and out of the kettle 104. The drawer 1104 may include a plurality of drawer slides, such as two drawer slides 1106 with one on each side of the drawer as seen in FIG. 11A. Each drawer slide may be mounted to a surface of the kettle 104 and directly or indirectly to the combustion chamber 124 and stoke chamber 122. In FIGS. 11A through 11C, the combustion chamber's two side walls 154A and 154B are visible and separated from the two overlapping seal surfaces 1102A and 1012B of the drip tray 1100. In the cross-sectional slice illustration of FIG. 11C various features are more clearly visible, such as the combustion chamber's two side walls 154A and 154B, the overlapping seal surfaces 1102A and 1012B, the stoke chamber 122. As also illustrated, the air inlet 132 is configured to allow a nozzle 1206 of the stoke ducting 140 to extend into the stoke chamber 122. This configuration allows the stoke chamber 122 to fluidically connect with the stoke ducting 140 when the drawer 1104 is in the closed position within the kettle 108.

When the drawer 1104 is inserted into the kettle 108 and is in the closed position as illustrated in FIG. 11D, the two side walls 154A and 154B of the combustion chamber 124 engage with, or are in close proximity to, the two overlapping seal surfaces 1102A and 1012B, respectively, of the drip tray 198 in order to create the seal, or partial seal, between the combustion chamber 124 and the cooking chamber 144. The two side walls 154A and 154B of the combustion chamber 124 and the two overlapping seal surfaces 1102A and 1012B may be vertically positioned such that there is vertical overlap of these surfaces; this overlap may contribute to creating a more effective seal between these surfaces. In FIG. 11D, the top 1108A of the side wall 154A is vertically offset closer to the lid 104 than the bottom 1110A of the seal surface 1102A such that there is a vertical overlap of a first distance. Similarly, the top 1108B of the side wall 154B is vertically offset closer to the lid 104 than the bottom 1110B of the seal surface 1102B such that there is another vertical overlap of a second distance. By having these surfaces configured in such a manner, the drawer 1104 is able to repeatedly slide into the kettle and create a seal, or partial seal, between the cooking chamber 144 and the combustion chamber 124 at both ends.

In some embodiments, the kettle may include one or more retention features configured to hold the drawer in the closed position and release the drawer upon the application of an opening force. As illustrated in FIG. 11C, this may include a magnet 1112 positioned in the drawer 1104, the kettle 108 (as shown in FIGS. 11C and 11D), or both and is configured to retain the drawer 1104 in the closed position until an opening force is applied to open the drawer. Aspects of the drawer 1104 and/or the kettle 108 may be magnetic so that a magnet placed in one element is attracted to the other element. For example, the magnet 1112 may be positioned in the kettle 108 as shown in FIGS. 11C and 11D and be attracted to a metal surface in the drawer. The one or more retention features may also include engagement between a ridge and a wheel such that the ridge causes a resistive force on the wheel as the wheel rolls over the ridge; once over the ridge, the wheel remains in place until the opening force pulls the wheel in the opposite direction over the ridge.

The one or more retention features may provide numerous advantages, such as causing the charcoal-containing fuel block to be in the desired position so that the igniter can contact and ignite it, causing the stoke chamber 122 to fluidically connect with the stoke ducting 140, and causing the side walls of the combustion chamber 124 to engage with the overlapping surfaces of the drip tray 198 to create the seal, or partial seal, between the combustion chamber 124 and the cooking chamber 144. In some embodiments, the retention force caused by the one or more retention features may be greater than the resistive force applied by the igniter 142 to prevent the resistive force from pushing open the drawer.

As partially discussed above, the kettle 108 may include thermal breaks that assist with reducing or preventing heat transfer in unwanted directions, e.g., downward or laterally, and facilitating vertical heat transfer to the cooking chamber. These thermal breaks may be created by laterally offsetting surfaces such that air gaps exist between the surfaces which act as the thermal breaks. As mentioned above and shown in FIG. 9E, a thermal break is created by using the fuel pan's aligning surfaces 196 that extend from the fuel pan 178 side walls 180 to create an offset gap and thus an air gap, two sections are highlighted by shading 1114, between these sidewalls and the majority of the charcoal-containing fuel block periphery 1115. This creates a thermal break between the sidewalls and the charcoal-containing fuel block by reducing heat transfer through physical contact between these items. Similarly, as illustrated in FIG. 10A, the fuel pan 178 may be positioned within the side walls 154 of the combustion chamber 124 such that a horizontal offset gap 1116, and thus a thermal break, exists between all of the fuel pan side walls 180 and the side walls 154 of the fuel chamber 124. FIG. 10A depicts one portion of this thermal break or gap 1116. This thermal break 1116 reduces lateral heat transfer between these items.

Figure 12:
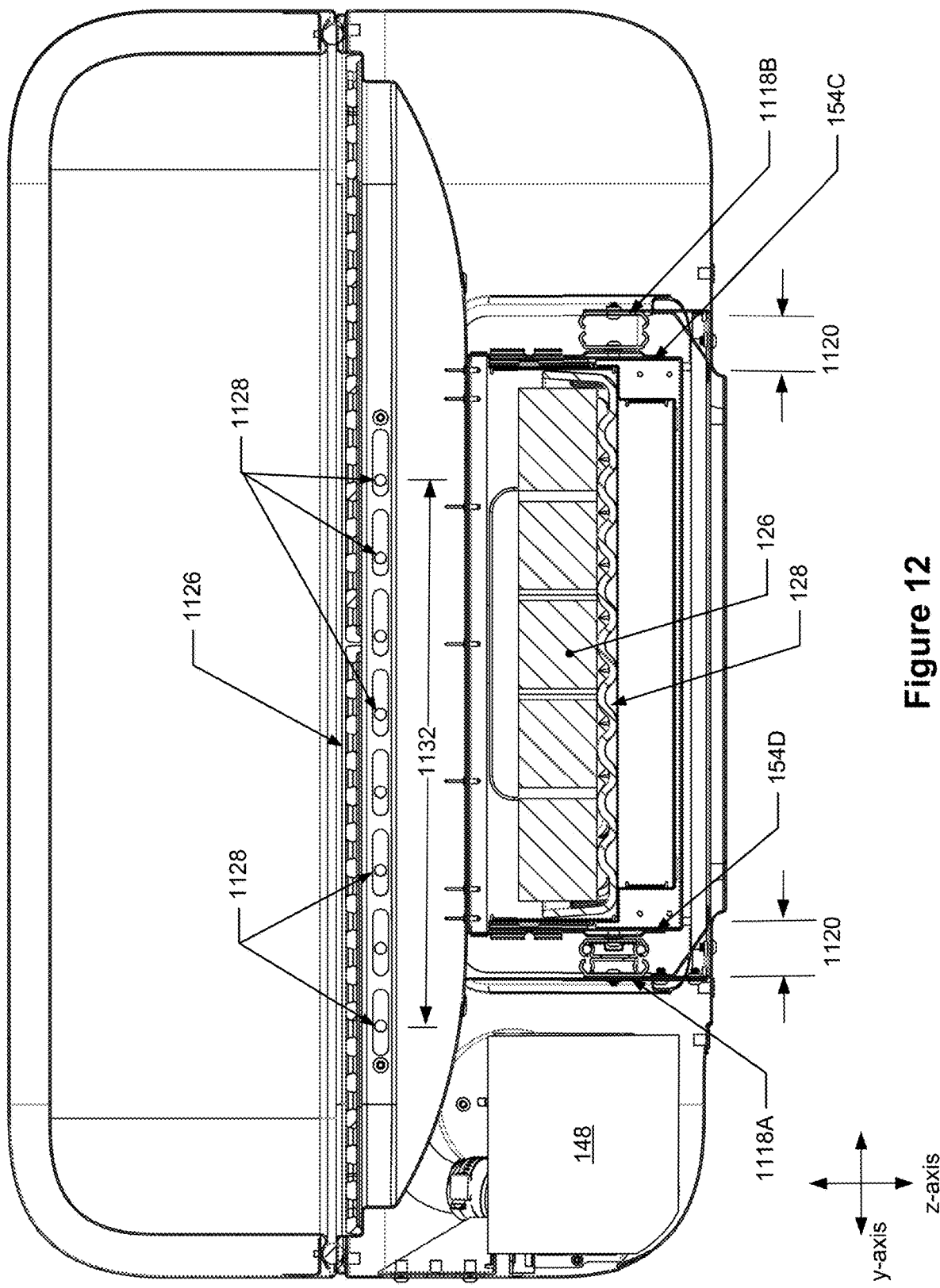
FIG. 12 depicts another cross-sectional view of the grill of FIG. 1A.

Referring back to FIG. 9B (and visible in FIG. 11A and in FIG. 12), in some embodiments two combustion chamber side walls 154C and 154D are connected to the drawer slides 1106. The thermal breaks 1114 and 1116 reduce thermal heat transfer to the drawer slides 1016. Additionally as seen in FIG. 11B, the kettle 108 may include drawer mounting surfaces 1118, which may be a part of the drip tray 198, to which the drawer slides 1106 are connected. These connections create another thermal gap between the drawer slide 1106 and the drawer mounting surface 1118 to which it is connected to further reduce lateral heat transfer into the kettle. This is also illustrated in FIG. 12 in which the thermal gap 1120 between the combustion chamber side walls 154C and 154D and drawer mounting surfaces 1118A and 1118B. The drawer slides 1106 may also be further configured to withstand exposure to some heat, such as at least 200° F., by using metal bearings and graphite lubrication. Further, as illustrated in FIG. 11C, the drawer handle 1122 is also offset from the combustion chamber side wall 154B in order to create a thermal break 1124 between the handle 1122 and the combustion chamber to reduce unwanted and unsafe heating of the handle 1122. These thermal breaks facilitate vertical heat transfer towards the cooking chamber 144 and reduce unwanted lateral heat transfer towards other features within the kettle 108, such as the drawer handle, the stoke ducting 140, and electrical components described below.

It is desirable to evenly heat the entire cooking chamber, but in some instances the charcoal-containing fuel block may have a smaller surface area than the whole cooking chamber. In order to evenly heat the cooking chamber using such a charcoal-containing fuel block, a heat spreader may be used in some embodiments. The heat directed towards and into the cooking chamber is therefore evenly distributed within the cooking chamber by the heat spreader. Referring back to FIG. 3C, the grill 100 has a heat spreader 1126 in the cooking chamber 144 that is configured to evenly distribute heat within the cooking chamber. The charcoal-containing fuel block 126 is sized smaller than the cooking chamber 144, and the heat spreader 1126 is positioned in the cooking chamber 144 and vertically interposed between the cooking grates 1127 and the drip tray opening 1100. The heat spreader may have various thermal properties and physical configurations to cause heat to spread evenly within the cooking chamber. This may include angled through-holes or slots or vanes that direct heat and air outwards towards the exterior of the grill and partially upwards. The thermal properties of the heat spreader may include, for example, high thermal conductivity and emissivity as well as resistance to high temperature and corrosion. Steel, aluminum, and stainless steel, with or without enamel or other coatings may be used.

In some embodiments, the heat spreader may include one or more surfaces, which may be angled with respect to each other, that divert radiative and convective heat within the cooking chamber. In some instances, the spreader may have two angled sheets that provide double-wall insulation to dampen the heat traveling from the fuel block throughout the cooking chamber. The surfaces may be provided by surfaces of one or more sheet metal structures or plates. In some embodiments, the surfaces described herein may be considered one or more sheets that comprise a metal. The heat spreader may also be configured to direct fluids, such as grease or other liquids from food or food preparation (e.g., sauces or marinades), or food that fall below the cooking grates to a center region and to allow these fluids or other items to fall through the heat spreader and onto the fuel block below the heat spreader. This configuration may include angling the surfaces to have a center region that is lower than the outer edges thereof and having through-holes in this center region that allow the liquid to pass through the heat spreader. By directing these fluids onto the fuel block, they can be kept from pooling on the heat spreader and can be burned away or confined to the fuel block, which may later be removed and discarded, thereby allowing them to be conveniently disposed of. In contrast, traditional controllable grilling appliances, e.g., gas grills, typically have a drain in the base of the grill housing that leads to a grease trap, which often overflows, is messy to empty, and difficult to clean. By directing grease and other fluids into the fuel block, such materials may be easily disposed of with the ash/remains of the fuel block and no separate grease trap needs to be emptied.

Figure 24A:
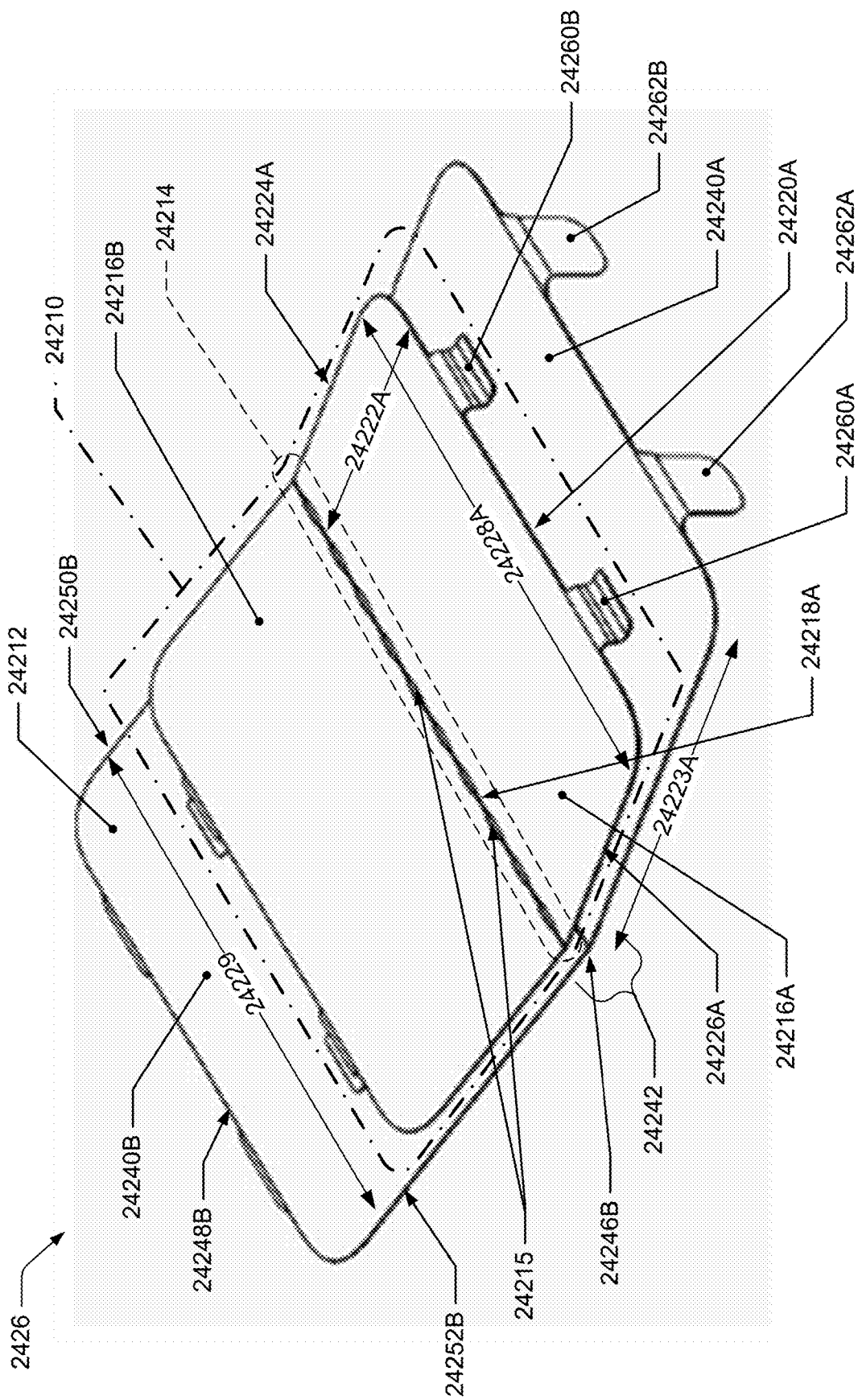
FIG. 24A depicts an off-angle view of an example heat spreader.
Figure 24B:
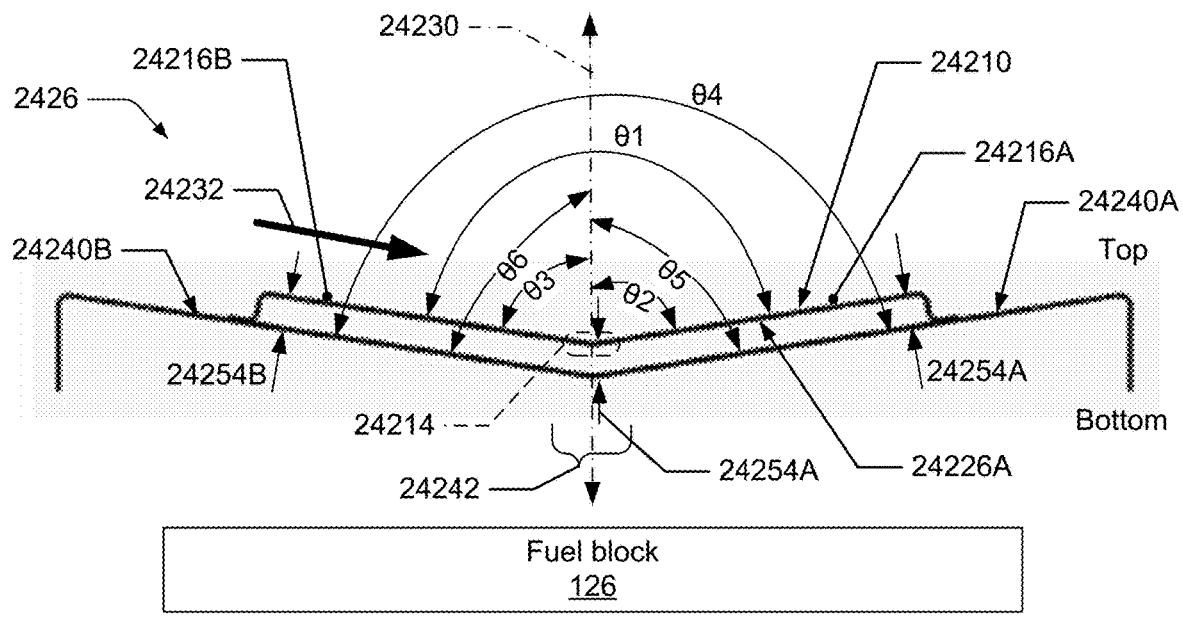
FIG. 24B depicts a side view of the example heat spreader of FIG. 24A.
Figure 24C:
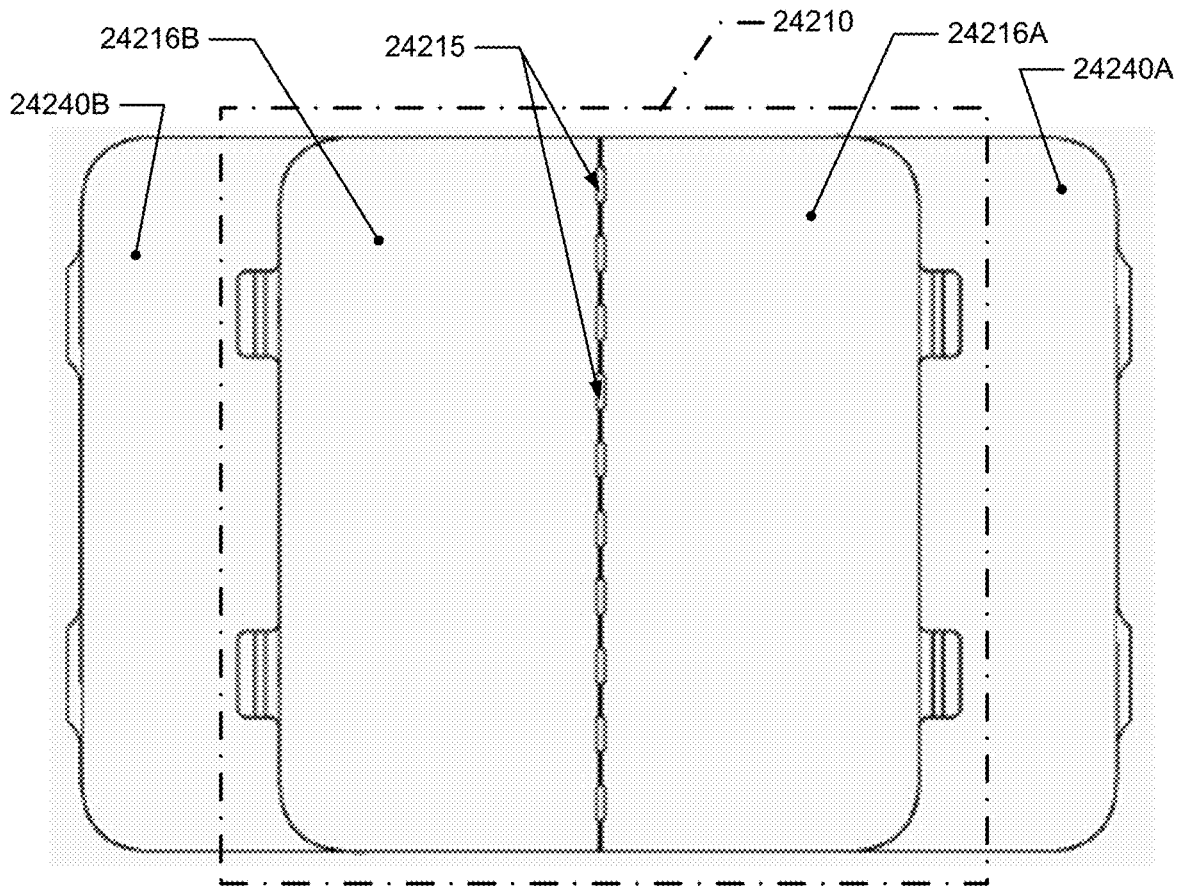
FIG. 24C depicts a top view of the example heat spreader of FIG. 24A.

FIG. 24A depicts an off-angle view of an example heat spreader, FIG. 24B depicts a side view of the example heat spreader of FIG. 24A, and FIG. 24C depicts a top view of the example heat spreader of FIG. 24A. This heat spreader 2426 includes a first surface 24210 (within the dash-dot-dash shape) positioned above a second surface 24212 that are each non-planar, angled surfaces. The first surface 24210 includes a center region 24214 (within the dashed obround) having one or more through-holes 24215, a first side region 24216A, and a second side region 24216B. The first side region 24216A has a first end 24218A within the center region 24214, a second end 24220A opposite and offset from the first end 24218A by a first width 24222A, a first side 24224A opposite and offset from a second side 24226A by a first length 24228A. The second side region 24216B includes the same features, a first end 24218B within the center region 24214, a second end 24220B opposite and offset from the first end 24218B by a first width 24222B, a first side 24224B opposite and offset from a second side 24226B by a first length 24228B, although for clarity these identifiers are not included in FIG. 24A.

The first and second side regions 24216A and 24216B of the first surface 24210 are at an angle with respect to each other. They may be considered non-planar with, and non-parallel to, each other. As seen in FIG. 24B, the first and second side regions 24216A and 24216B are angled at an obtuse angle θ1 with respect to each other. In reference to a center axis 24230 of the first surface, the first side region 24216A is angled from the center axis 24230 by a first acute angle θ2, the second side region 24216B is angled from the center axis 24230 by a second acute angle θ3, and the first and second acute angles θ2 and θ3 added together equal the obtuse angle θ1. By having the first and second side regions 24216A and 24216B angled towards the center region 24214, grease or other liquids or material that fall onto the first and second side regions 24216A and 24216B are caused to travel downwards, as illustrated by arrow 24232, and towards the center region 24214, through the one or more through-holes 24215, and through the heat spreader down towards the fuel block underneath. It should be noted that the heat spreader 2426 is configured and intended to be oriented within the grill above the fuel block as seen in FIG. 24B such that the center region 24214 is closer to the fuel block 126 and stoke chamber 124 than the second ends of the first and second side regions of the first surface 24210. The top and bottom of the heat spreader are also labeled in FIG. 24B.

The heat spreaders described herein are configured for use in the grills described herein that use the charcoal-containing fuel block. Charcoal grills typically do not use heat spreaders, as they are designed to allow the user to manipulate the coals during use, and a heat spreader would interfere with that. Any metal sheets used in gas grills are usually long and relatively thin width-wise (usually to match the aspect ratio of U-shaped burners). They are often designed with a single crease down the middle so that they "tent" over the burner, but they don't have supports that stick out from the edges and extend in generally the same direction as the crease.

In some embodiments, at least 90% or more of the upward facing surfaces slope down towards the center region that is lower than the ends of the sheets when installed in the grill.

In the top view of FIG. 24C, the one or more through-holes 24215 of the first surface 24210 are seen, with 10 holes shown. In some other instances, there may be a single hole. The top view of FIG. 24C may also be considered the view looking down into the grill, when the heat spreader is installed in the grill, towards the stoke chamber and fuel block that are not depicted. The surfaces of the first and second side regions of the first surface that are visible are considered to generally face upwards towards the cooking grates and lid such that they have normal vector to the surfaces that has a primary component in the vertically upward direction.

The heat spreader may also include, in some embodiments as shown in FIGS. 24A-24C, a second surface 24212. The second surface 24212 is offset from, and below, the first surface 24210 when positioned in the grill as seen in FIGS. 24A-24C. The second surface 24212 also includes two side regions, a first side region 24240A underneath the first side region 24216A of the first surface 24210, a second side region 24240B underneath the second side region 24216B of the first surface 24210, and a center region 24242 underneath the center region 24214 of the first surface 24210. Similar to the first surface 24210, the two side regions of the second surface 24212 each have a first end in the center region 24242, a second end opposite and offset from the first end, and first and second sides opposite each other. The first end 24246B, the second end 24248B, the first side 24250B, and the second side 24252B of the second side region 24240B of the second surface 24212 are identified in FIG. 24A.

The second surface 24212 may have one or more dimensions larger than the first surface 24210. For example, as seen in FIG. 24A, the first width 24222A of the first side region 24216A of the first surface 24210 is smaller than a width 24223A of the second side region 24240A of the second surface 24212. In some instances, the length 24228A of the first surface may be the same, or substantially the same (e.g., within +/−10%) as the length 24229 of the second surface 24212. In some instances, the length 24228A of the first surface may be smaller than the length 24229 of the second surface 24212.

Figure 26A:
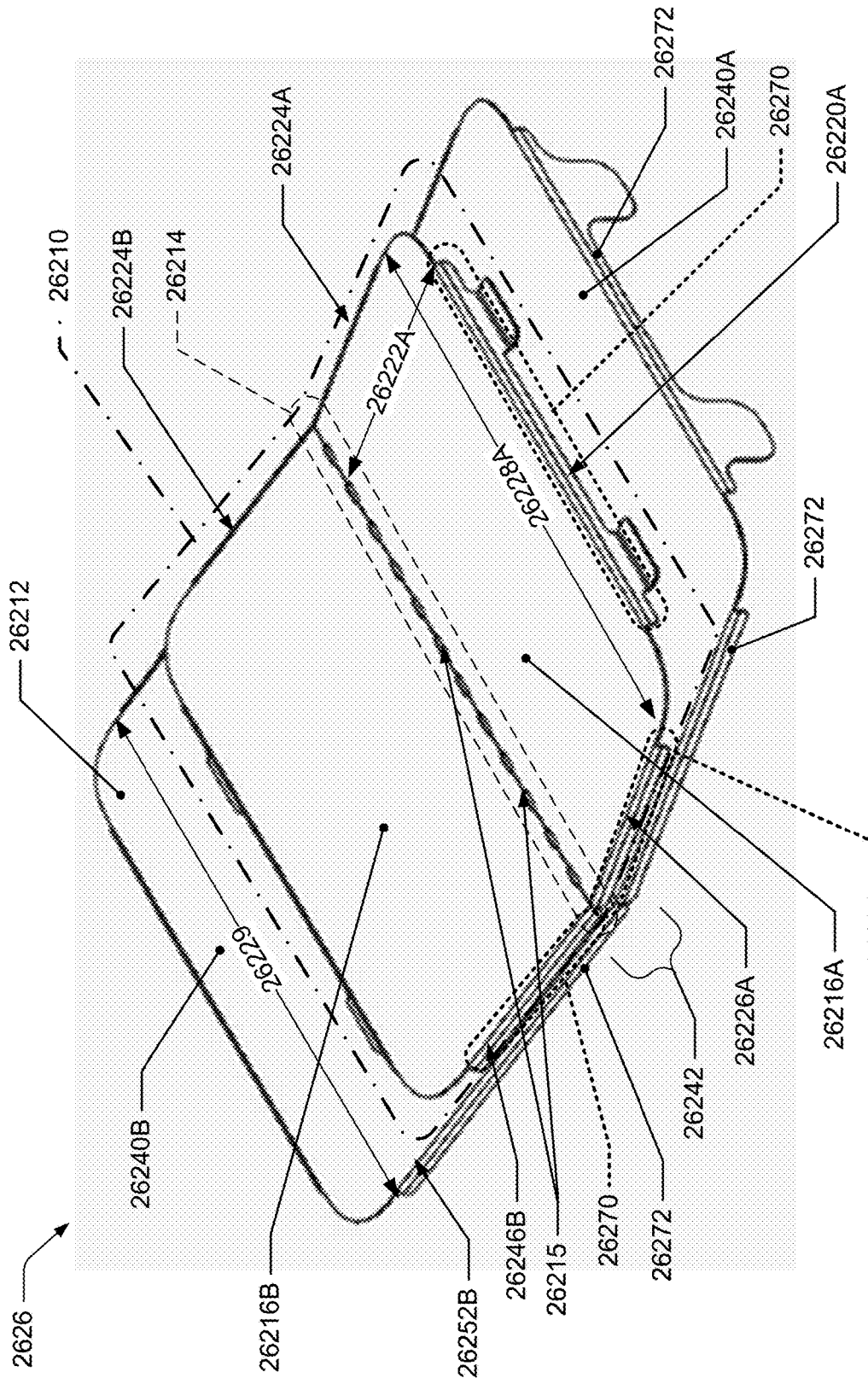
FIG. 26A depicts an off-angle view of a second example heat spreader.

In some embodiments, the first width 24222A or the first width 26222A of the first surface 24210 or 26210 of heat spreader of FIGS. 24A and 26A, may be between about 85 mm and 130 mm, for instance, including about 95 mm, 100 mm, 115 mm, or 120 mm, which may include +/−2 mm). In some embodiments, the width 24223A of the second surface 24212 or 26212 of heat spreader of FIGS. 24A and 26A, may be between about 130 mm and 190 mm, for instance, including about 135 mm, 140 mm, 150 mm, 155 mm, 160 mm, 170 mm, or 180 mm, which may include +/−2 mm). In some embodiments, the length 24228A of the first surface 24210 and the length 24229 of the second surface in FIG. 24A, the length 26228A of the first surface in FIG. 26A, and the length 26229 of the second surface in FIG. 26A may be between about 200 and 300 mm, including about 225 mm, 250 mm, or 275 mm, for example. In some instances, the dimensions of the first surface may be different than the second surface.

The first and second side regions 24240A and 24240B of the second surface 24212 are also at an angle with respect to each other. They may be considered non-planar with, and nonparallel to, each other. As seen in FIG. 24B, the first and second side regions 24240A and 24240B are angled at an obtuse angle θ4 with respect to each other. In reference to the center axis 24230 of the first surface, the first side region 24240A is angled from the center axis 24230 by a third acute angle θ5, the second side region 24240B is angled from the center axis 24230 by a fourth acute angle θ6, and the third and fourth acute angles θ5 and θ6 added together equal the obtuse angle θ4. By having the first and second side regions 24240A and 24240B of the second surface 24212 also angled towards the center region 24242, grease, food, or other liquids or material that fall onto the first and second side regions 24240A and 24240B are caused to travel downwards, as illustrated by arrow 24232, and towards the center region 24242, through the one or more through-holes of the second surface 24212 that are also in the center region 24242 but not visible in the Figures, and down towards the fuel block underneath.

In some embodiments, θ1 and θ4 may be between about 175° and 150°, including about 170°, 165°, 162.5°, 160°, and 155° (which also includes +/−0.5°), and θ2, θ3, θ5, and/or θ6 may be between about 175° and 150°, including about 170°, 165°, 162.5°, 160°, or 155° (which also includes +/−0.5°), 87.5°, 85°, 81°, 80°, 77.5°, or 75°.

As illustrated in FIG. 24B, the first surface 24210 is offset from the second surface 24212. In some instances, the center region 24214 of the first surface 24210 may be offset from the center region 24242 by a first offset distance 24254A. In some instances, the first surface may be configured such that it is offset by the same, or substantially the same, distance from the second surface 24212 as illustrated in FIG. 24B. For example, the second side region 24216B of the first surface 24210 is offset from the second side region 24240B of the second surface 24212 by the same distance 24254B that the first side region 24216A of the first surface 24210 is offset from the first side region 24240A of the second surface 24212. This distance may be measured from an angle perpendicular to the first and or second surface as shown in FIG. 24B, or may be measured along the center axis 24230.

The heat spreader 2426 may also include one or more supports that extend between the first and second surfaces 24210 and 24212, and cause them to be offset from each other, e.g., vertically offset when in an in-use state. As seen in FIG. 24A, the heat spreader 2426 includes two supports 24260A and 24260B that extend between the second end 24220A of the first side region 24216A of the first surface 24210 and the first side region 24240A of the second surface 24212. In some instances, the supports 24260A and 24260B may be a part of the first surface 24210 and may be affixed, such as by welding, or otherwise secured to the second surface 24212. In some other embodiments, the supports 24260A and 24260B may be a part of the second surface 24212 and may be affixed, such as by welding, or otherwise secured to the first surface 24210. As also illustrated in FIG. 24A, the second surface 24212 may also include second supports 24262A and 24262B that extend from the second ends of each side region (second end 24246A in FIG. 24A) and may connect with the grill housing and support the heat spreader 2426 in the grill.

Figure 24D:
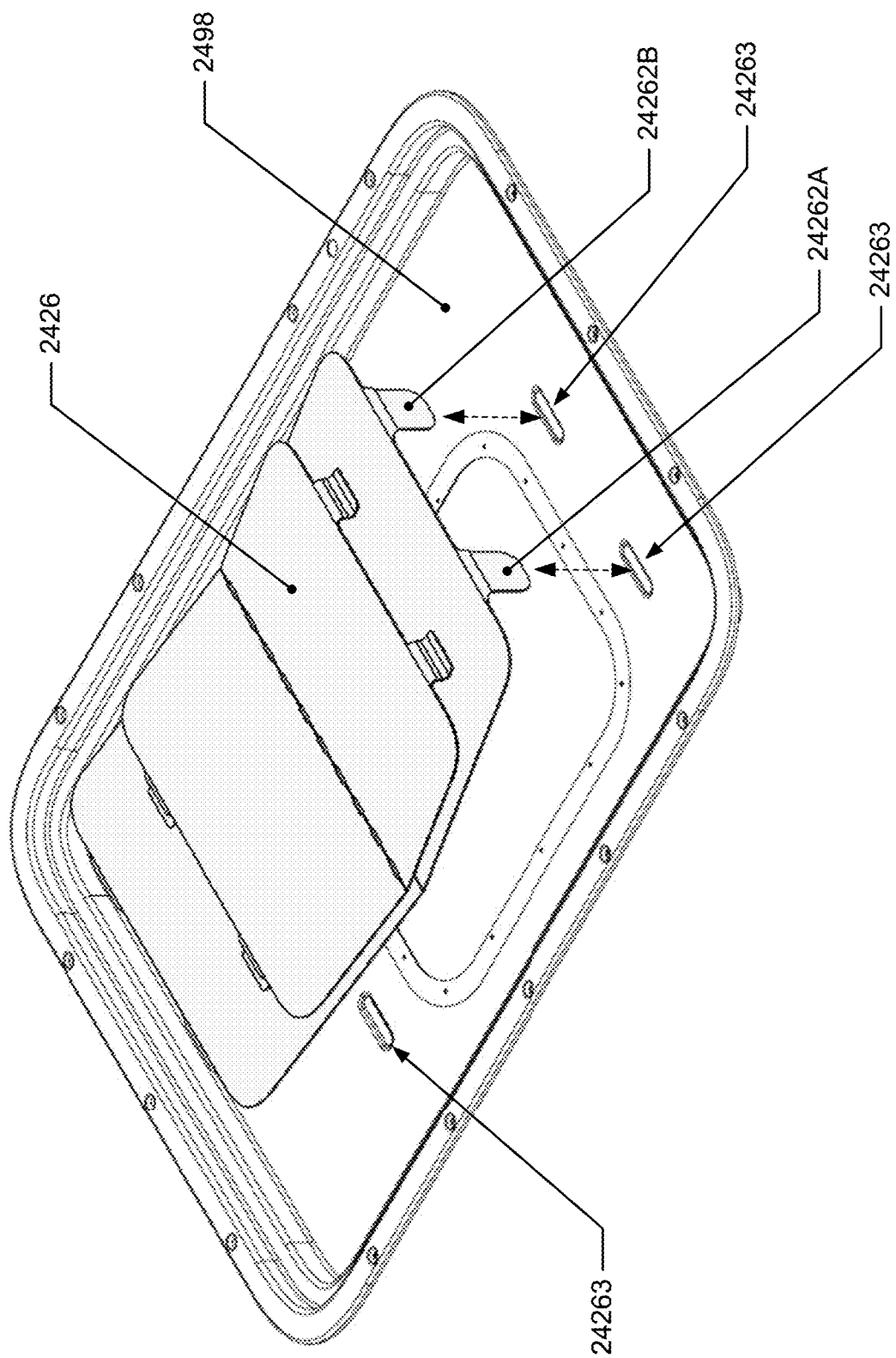
FIG. 24D depicts an off-angle exploded view of a drip tray and the heat spreader of FIG. 24A.

In some embodiments the grill may include aligning features configured to connect with the heat spreader and properly align the heat spreader inside the grill so that the heat spreader is centered over the combustion chamber. In some such instances, the grill's aligning features may be slots, grooves, or holes that are configured to receive the heat spreader's second supports 24262A and 24262B and that are located in the grill's drip tray (e.g., item 198 in FIG. 3B). FIG. 24D depicts an off-angle exploded view of a drip tray and the heat spreader of FIG. 24A. The drip tray 2498 here includes a plurality of aligning features 24263 that are slots configured to receive the second supports 24262A and 24262B of the heat spreader 2426. When the heat spreader is positioned in the grill, these aligning features and second supports are configured to center the heat spreader over the combustion chamber 124 which may further assist with providing evenly distributed heat throughout the grill.

In some embodiments, as illustrated in FIG. 24B, the first and second side regions 24216A and 24216B of the first surface 24210 may be offset from each other at the same angle as the first and second side regions 24240A and 24240B of the second surface 24212. As illustrated in FIG. 24B, this may result in the first side region 24216A of the first surface 24210 being parallel to the first side region 24240A of the second surface 24212, and the second side region 24216B of the first surface 24210 being parallel to the second side region 24240B of the second surface 24212. Parallel here means both exactly parallel and substantially parallel, e.g., within +/−10% of parallel, because of manufacturing tolerances and imperfections in construction. By having these side regions parallel, or substantially parallel, to each other, heat generated by the fuel block is evenly directed and distributed within the grill. This further causes heat to spread throughout the grill in a region larger than the surface area of the fuel block. Additionally, offsetting the first surface 24210 above the second surface 24212 creates a double-wall insulation area above at least a part of the fuel block that creates an insulating air layer between the two surfaces which prevents hot spots directly over the fuel block and redirects and blocks some of the generated heat radially outwards into the grilling chamber.

Figure 25:
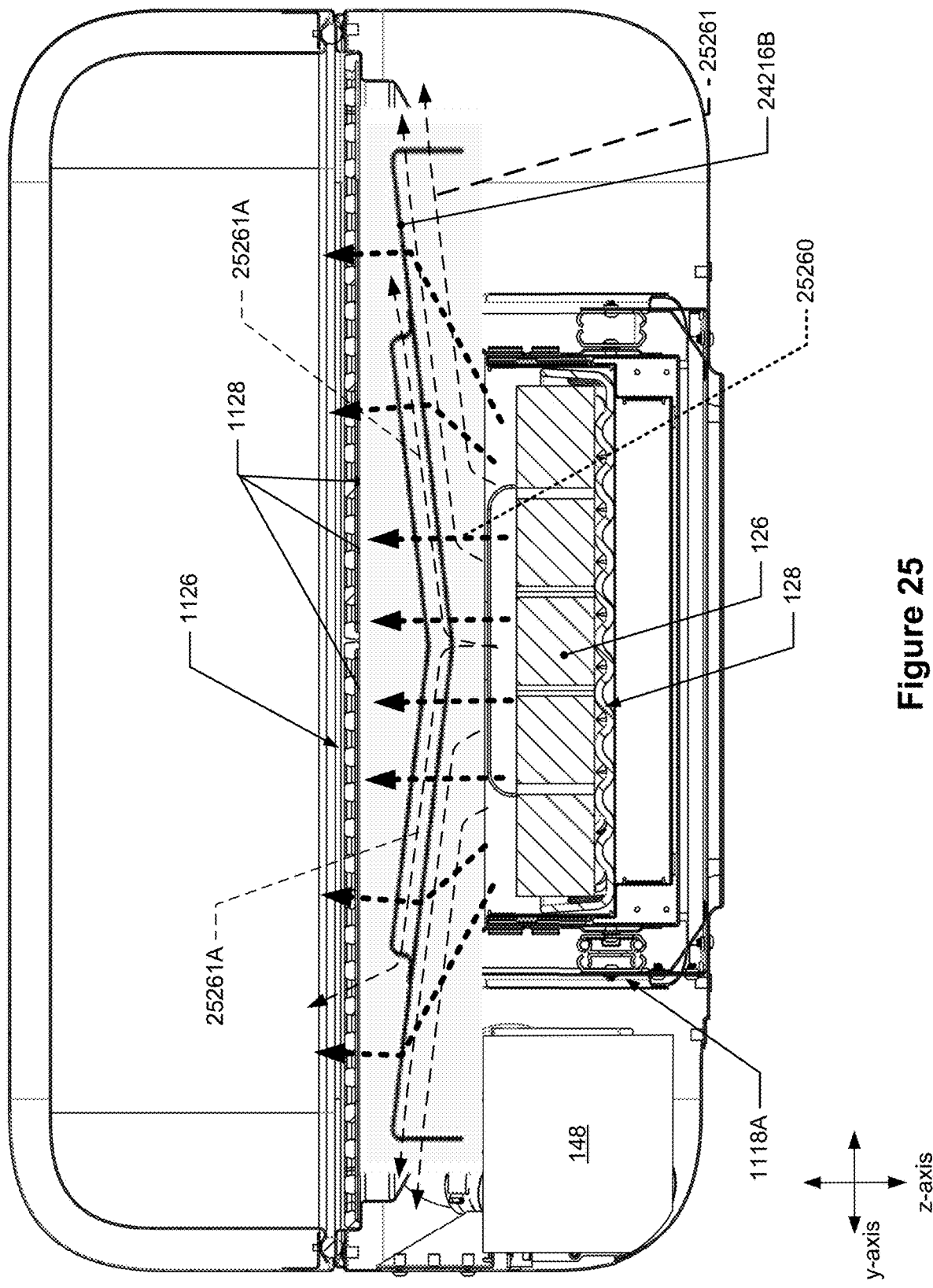
FIG. 25 depicts the cross-sectional view of the grill of FIG. 12 with the example heat spreader of FIG. 24B.

FIG. 25 depicts the cross-sectional view of the grill of FIG. 12 with the example heat spreader of FIG. 24B. As can be seen here, the heat spreader 2426 is positioned below the grates 1127 and above the fuel block 126. The radiative heat generated by the fuel block, illustrated by dotted lines 25260, travels upwards to the heat spreader 2426 to heat up the heat spreader which radiates that heat towards the grates in the z-direction to the grate; this radiative heat gets redirected and redistributed in the y-direction and upwards in the z-direction. The convective heat is illustrated with dashed lines 25261 and 25261A. This convective heat travels through the one or more holes (not identified) in the center region of the second surface 24212 and into the gap between the first and second surfaces 24210 and 24212, as illustrated with dashed lines 25261A. The other convective heat travels underneath the second surface radially outwards as further illustrated. This redistribution of the heat causes the heat to be more evenly distributed within the grill even though the surface area of the fuel block 126 is less than the surface area of the grill. In some instances, the use of the heat spreader within the grill was found to reduce the temperature differential across the grates from about 130° C. to about 50° C.

Figure 26B:
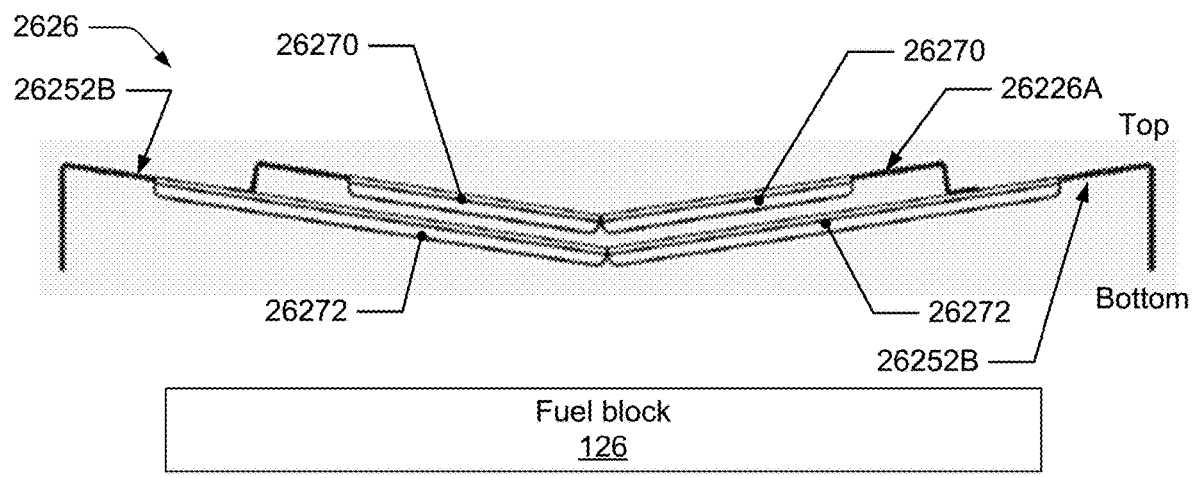
FIG. 26B depicts a side view of the second example heat spreader of FIG. 26A.

In some embodiments, the heat spreader may include structural supports around the periphery of the first and/or second surfaces that may prevent warping and/or assist with heat distribution. FIG. 26A depicts an off-angle view of a second example heat spreader and FIG. 26B depicts a side view of the second example heat spreader of FIG. 26A. The heat spreader 2626 in FIGS. 26A and 26B may be similar to that described above, except for some noted differences. Here, for instance, the first surface 26210 includes 12 through-holes 26215. Additionally, the first surface 26210 includes one or more structural supports 26270 (within the dotted obrounds) along at least a part of the second end 26220A, the first side 26224A (although not seen), and on the second side 26226A of the first side region 26216A. Similarly, the second surface 26212 includes one or more structural supports 26272 along the second ends of its first and second side regions, and their first and second sides (e.g., along a part of the second side 26252B in FIG. 26A). The first side region 26216A includes a first width 26222A, a length 26228A.

These illustrated structural supports 26270 and 26272 extend towards the bottom (as indicated in FIG. 26B) of the heat spreader 2626. In some embodiments, the structural supports that extend away from the first surface are oriented at an oblique or perpendicular angle to the first surface, such as substantially 90 degrees, and the structural supports that extend away from the second surface are oriented at an oblique or perpendicular angle to the second surface, such as substantially 90 degrees (e.g., within +/−10%).

These structural supports 26270 and 26270 on the heat spreader 2626 may prevent the first and second surfaces from warping caused by the heat generated by the fuel block, as well as by repeated heat cycling. In some embodiments, these structural supports 26270 and 26270 may also assist redistributing heat throughout the gill.

In the side view of FIG. 26B, the structural supports 26270 and 26270 extend along parts of the sides of the first and second surfaces. This may include, the second side 26246A of the first side region 26216A of the first surface 26210, the second side 26246B of the second side region 26216B of the first surface 26210, and the second side 26252B of the first side region 26240A of the second surface 26212, for instance.

Figure 26C:
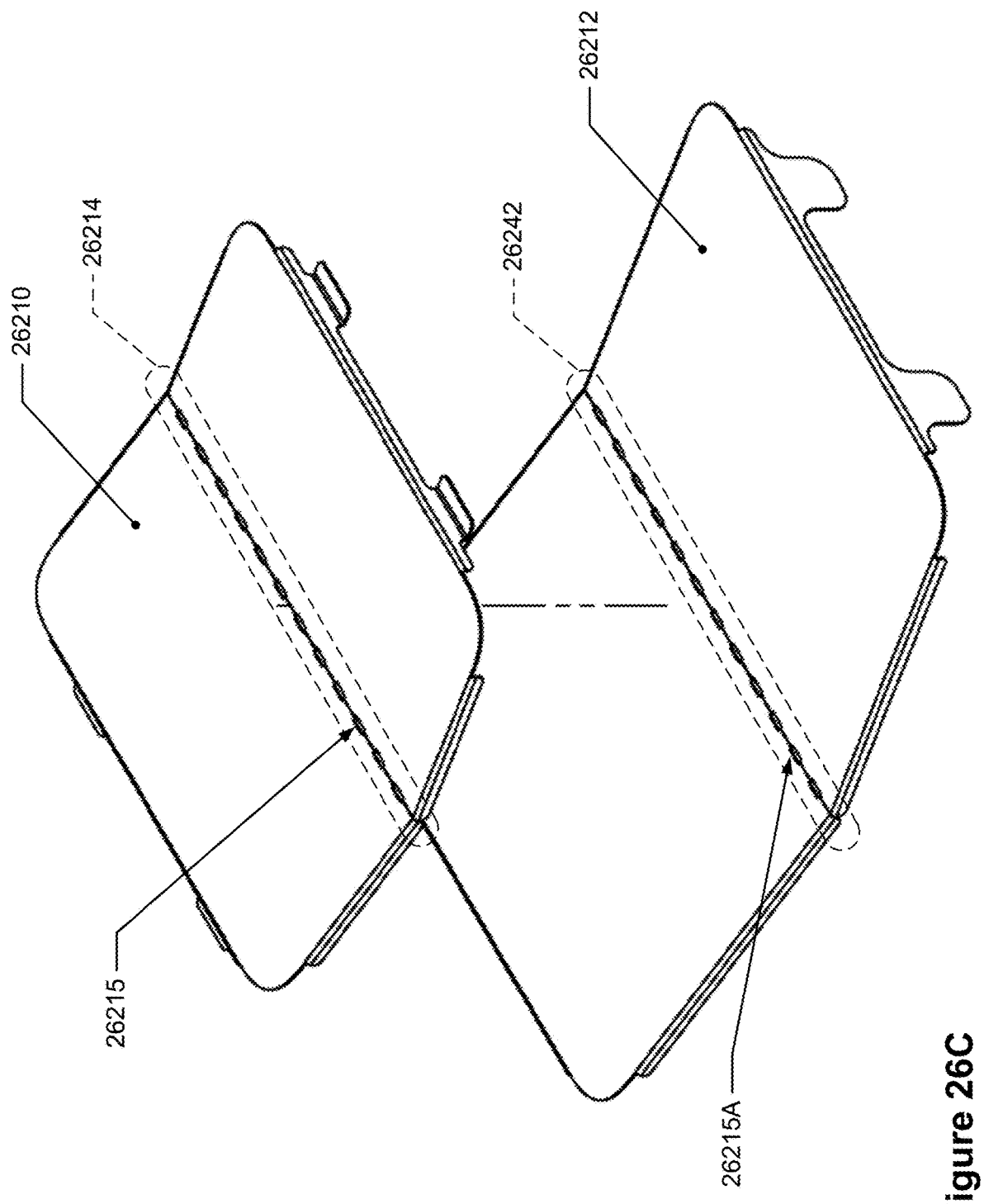
FIG. 26C depicts an exploded view of the heat spreader of FIG. 26A.

In FIG. 26C which depicts an exploded view of the heat spreader of FIG. 26A, the plurality of through-holes 26215A in the center region 26242 of the second surface 26212 are visible. These through-holes 26215A are below, and in some instances may be aligned with, the through-holes 26215 of the first surface 26210. These through-holes 26215 and 26215A may also assist in distributing the convective heat throughout the grill. In some embodiments, the second surface 24212 of FIGS. 24A-24D may also be considered to have the same through-holes in the same configuration as shown in FIG. 26C.

The heat spreader of FIGS. 24A-26B may be made of various materials, such as steel, aluminum, stainless steel, iron, or a combination thereof. In some instances, the heat spreader may also include one or more coatings, such as an enamel coating. This may include, for example, a stainless steel heat spreader with an enamel coating.

In some embodiments, the heat spreader may be configured with some differences from the heat spreaders in FIGS. 24A-26B, such as including two surfaces that are offset from each other, but one or more of these surfaces are planar. In some such instances, the top surface, i.e., the surface configured to be closer to the cooking grates when installed in a grill, may be smaller than the bottom surface, as shown in FIGS. 24A-26B, for example. One or more of these surfaces may also have features extending from one or more edges, similar to the structural supports and supports described above in FIGS. 24A-26B. The shape of one or more of these surfaces may also vary, such as being rectangular, square, elliptical, obround, or having shaped corners, such as angled, chamfered, or rounded corners. For instance, similar to the surfaces in FIGS. 24A-26B, the corners of the surfaces may be rounded. In some embodiments, the surfaces may also be conical or conical frustrum shapes.

Figure 27A:
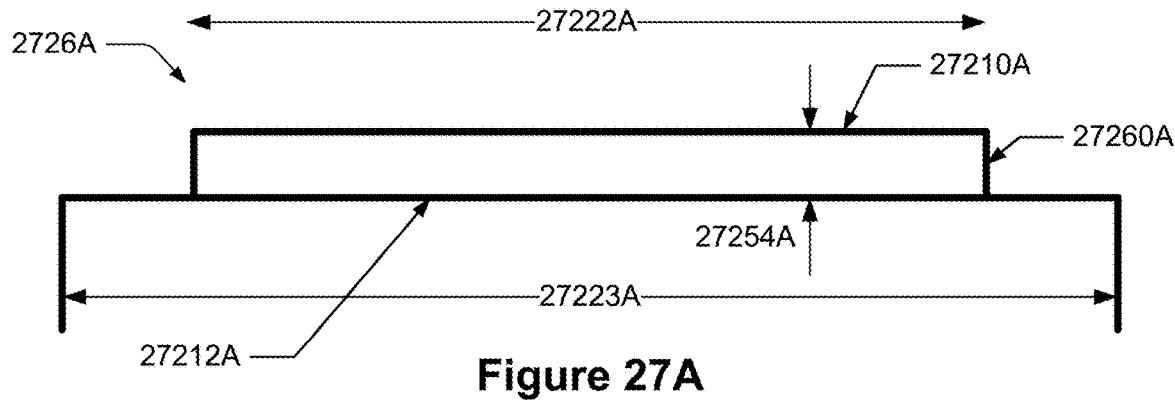
FIGS. 27A-27E depict side views of other example heat spreaders.

FIGS. 27A-27E depict side views of other example heat spreaders. In FIG. 27A, the heat spreader 2726A has a first surface 27210A and second surface 27212A that are planar, or substantially planar (e.g., within 5%, 10%, or 15% of flat), surfaces. The first surface 27210A is offset from the second surface 27212A by a distance 27254A in order to create a double-wall effect. Also, the width 27222A of the first surface 27210A is smaller than the width 27223A of the second surface 27212A. In some instances, the length of the first surface 27210A may be the same, less than, or greater than, the length of the second surface 27212A. The heat spreader 2726A also includes supports 27260A that offset the surfaces from each other. Although not shown, the surfaces of this heat spreader, or any heat spreader herein, may include the structural supports illustrated in FIGS. 26A and 26B, along at least a part of one or more sides of the surface.

Figure 27B:
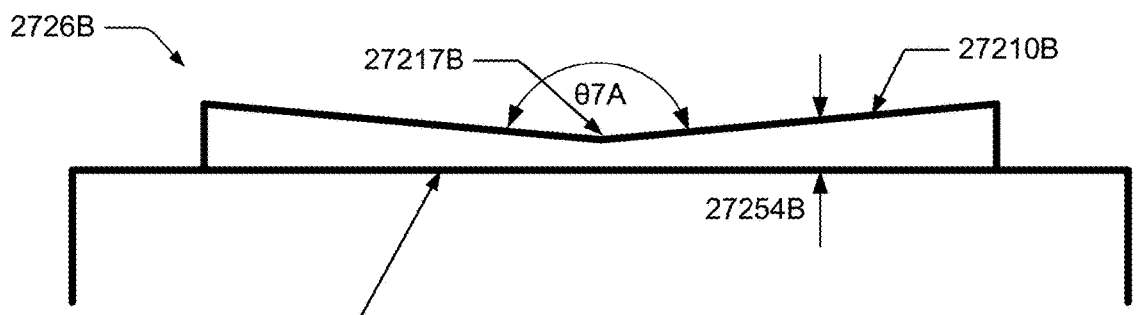
Figure 27C:
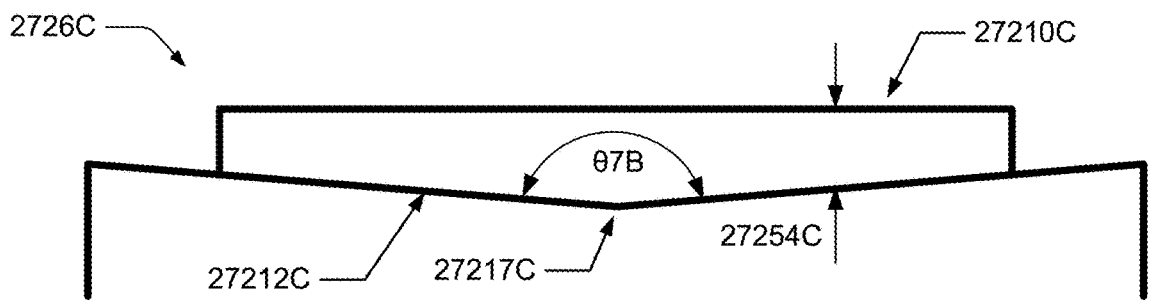

In some instances, one of the surfaces may be planar while the other may be angled. In FIG. 27B, the first surface 27210B is angled and the second surface 27212B is planar while in FIG. 27C, the first surface 27210C is planar and the second surface 27212C is angled. These different configurations may assist with directing heat throughout the grill interior, including with convection and creating even heating in the grill. In FIG. 27B, the distance 27254B between the first surface 27210B and the second surface 27212B is the smallest in the center 27217B of the heat spreader 2726 and increases as the distance from the center increase. In FIG. 27C, the distance 27254C between the first surface 27210C and the second surface 27212C is the largest in the center 27217C of the heat spreader 2726C and decreases as the distance from the center 27217C increases. The first surface 27210B in FIG. 27B has two side regions offset from each other by an obtuse angle θ7A and the second surface 27212C in FIG. 27C has two side regions offset from each other by an obtuse angle θ7B. These side regions may configured in any way as described herein.

Figure 27D:
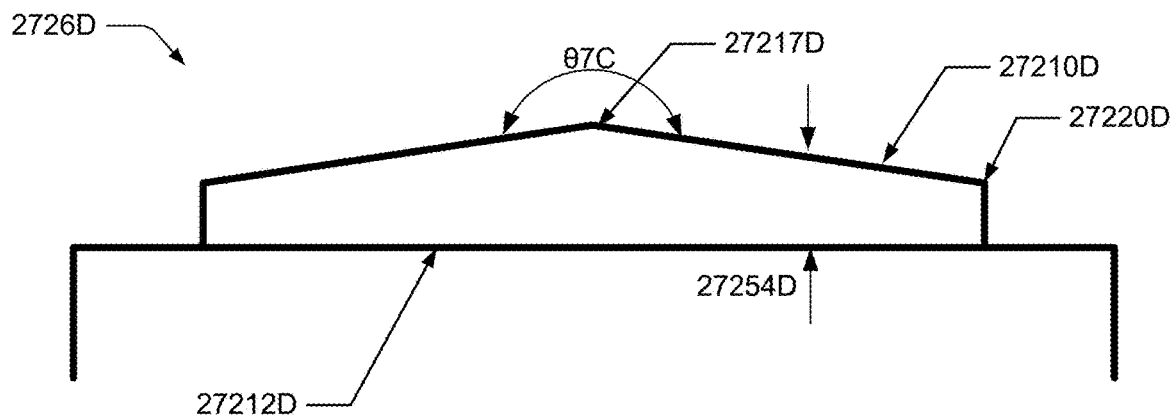
Figure 27E:
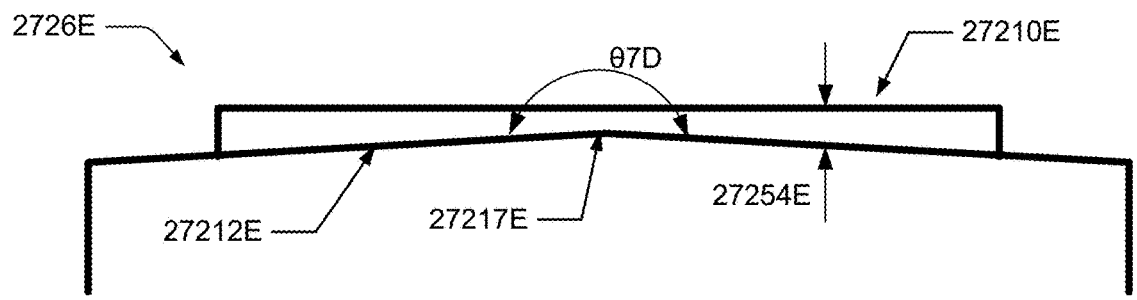

In some instances, one or more of the angles of the heat spreader surfaces may be reflex angles that are larger than 180°. A surface with such a reflex angle has a center higher than the ends of its side regions such that the center is closer to the grates than the ends when the heat spreader is installed in the grill. The heat spreader 2726D of FIG. 27D has a first surface 27210D with two side regions angled from each other at an angle θ7C that is a reflex angle; the second surface 27212D is planar, or substantially planar, here. This causes the center 27217D to be higher than the ends 27220D. FIG. 27E depicts a heat spreader 2726E with a second surface 27212E having two side regions angled from each other at an angle θ7D that is a reflex angle; the second surface 27212E is planar or substantially planar, here. This causes the center 27217D to be higher than the ends 27220E, and closest to the first surface 27210E than the rest of the second surface 27212E. The offset distance 27254D in FIG. 27D is largest at the center 27217D and decreases as the distance from the center increases, and the offset distance 27254E in FIG. 27E is smallest at the center 27217D and increases as the distance from the center increases. These angles provided herein may create acute angles with the main surfaces that face the fuel block and an obtuse angle between the main surfaces facing away from the fuel block.

Although not shown in the Figures, in some embodiments the both surfaces of the heat spreader may be angled at reflex angles. This may cause the center regions of each surface to be closer to the grates when installed in the grill than the respective ends of each surface. For example, the surfaces may be configured similarly to the first surface 27210D in FIG. 27D and the second surface 27212E in FIG. 27E. In some instances, the reflex angles of each surface may be the same while in other instances they may be different than each other. These different configurations may further provide for evenly distributed heat throughout the grill.

In some embodiments, the heat spreaders may have more than two sheets vertically offset from each other, such as two or three. Additional sheets may provide additional insulation and ability to evenly distribute heat throughout the grill. In some instances, the more than two sheets may be differently sized in order to create multiple heat spreading regions.

Additional details of the air flow and ducting within the grill will now be discussed. Referring back to FIG. 2, the grill includes a stoke fan 138 fluidically connected to stoke ducting 140 and configured to flow stoke air into the grill 100 through the air intake 118, shown in FIG. 1C, through the stoke ducting 140 and into the stoke chamber 122. As discussed above, the stoke air flows up from the stoke chamber 122 into the combustion chamber 124, and into the cooking chamber 144. The stoke air may also exit the grill 100 through the vents 114. This stoke air flow path 150 is illustrated as item 150. The stoke fan 138 may be configured to deliver multiple air flow rates to the stoke chamber, such as 0 to 20 cubic feet per minute, for instance. The stoke ducting may also be configured to allow for these flowrates and may have a cross-sectional area of at least 1.25 in$^2$, or 1.5 in$^2$, for example. The cross-sectional shape of the ducting may also be configured to deliver even air flow to the stoke box 122, which may include the ducting having a square or rectangular cross-sectional area.

The grill also includes a cooling fan 148 fluidically connected to the cooling ducting and configured to flow air into the grill 100 through the air intake 118, through the cooling ducting 146, and into the cooking chamber 144 through the cooling air ports (not visible in FIG. 2) that form the fluidic connection between the cooling ducting 146 and the cooking chamber 144. This cooling flow path 152 is also illustrated. Similar to the stoke fan, the cooling fan may be configured to deliver multiple air flow rates to the cooking chamber 144, such as 0 to 20 cubic feet per minute, for instance. The cooling ducting may also be configured to allow for these flowrates and may have a cross-sectional area of at least 1 in$^2$, or 1.25 in$^2$, for example. The cross-sectional shape of the cooling ducting may also be configured to deliver even air flow to the cooking chamber 144, which may include the ducting having a square or rectangular cross-sectional area.

Referring back to FIG. 3C, the cooling ducting 146 is shown and has a square cross-sectional shape; one cooling air port 1128 is also visible. These air ports are also visible in FIG. 12 which depicts another cross-sectional view of the grill 100 of FIG. 1A. Here, the cooling air ports 1128 are holes that extend from the cooling ducting into the cooking chamber 144. In some instances, the shapes of these ports may be individual slots that may have a rectangular or obround shape. In some other instances, this may one single port that is single long continuous rectangular or elliptical port. As seen in FIG. 3C, these ports 1128 may also be arranged underneath the grates 1127 to avoid blowing cooling air onto food placed on the grates 1127 which can lead to undesirable temperature variations on the food; the food may also undesirably obstruct the cooling air flow and create uneven air flow within the cooking chamber 144. This may also assist with cooling air before it reaches the food on the grates in order to prevent or reduce overcooking or burning the food. These ports 1128 may also be arranged along a first distance 1132 along the length (along the y-axis) of the grill, and in some instances evenly spaced from each other, in order to provide even air flow across the cooking chamber 144.

Figure 13A:
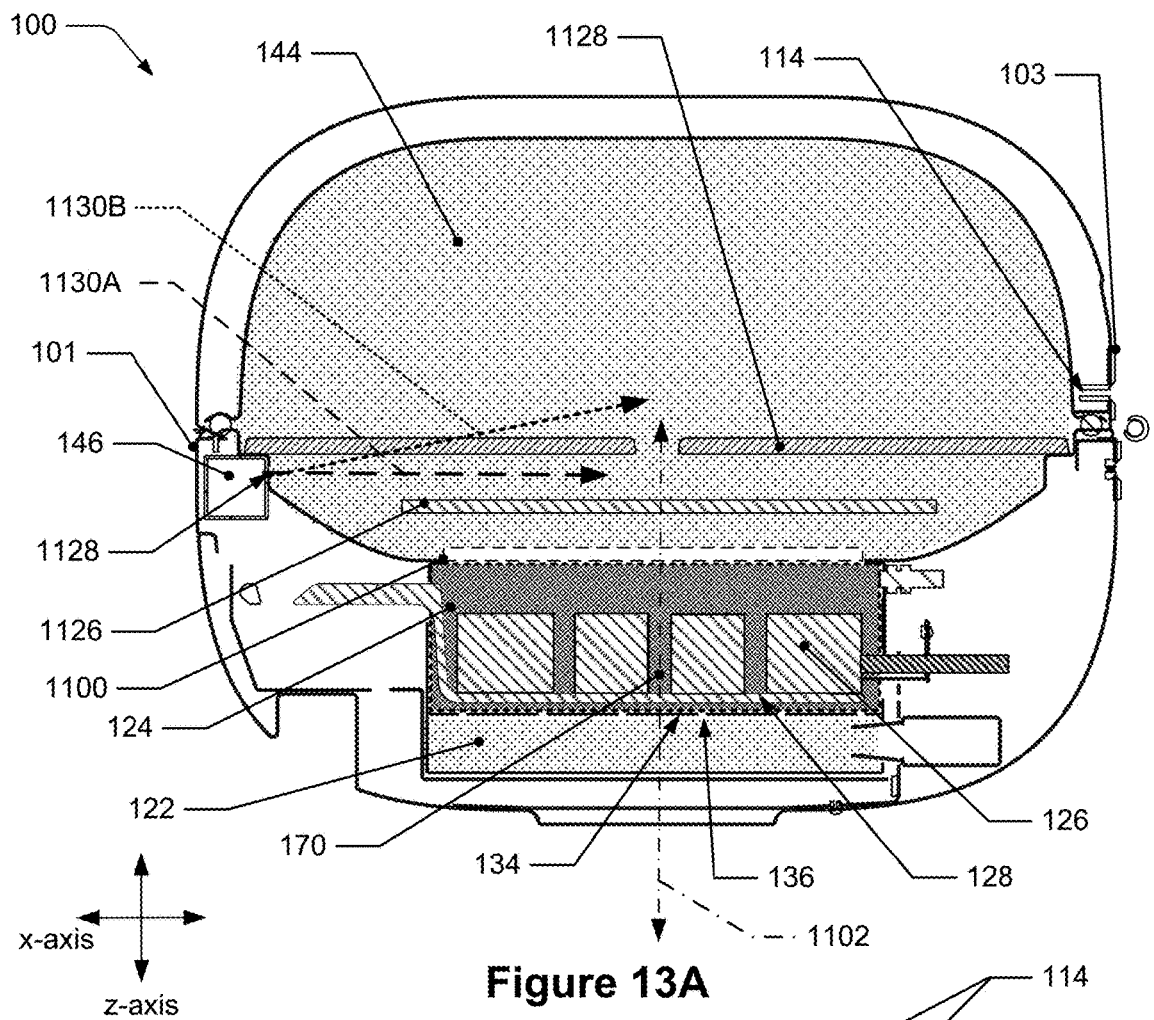
FIG. 13A depicts the cross-sectional side view slice of the grill of FIG. 3C.
Figure 13B:
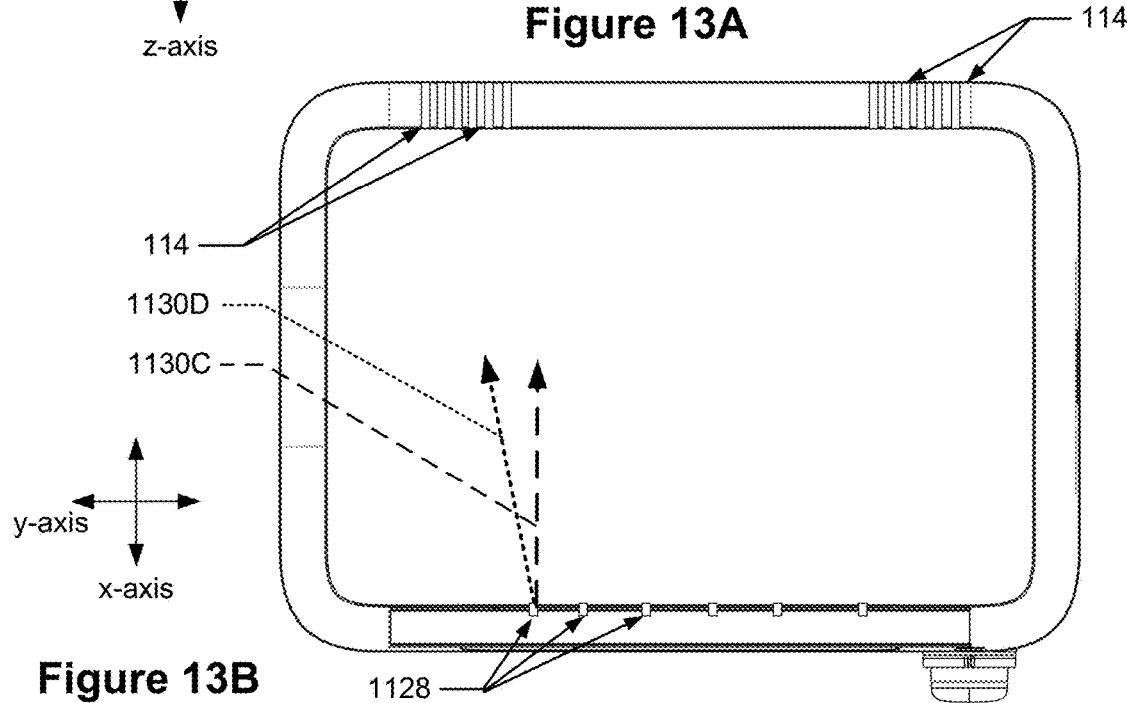
FIG. 13B depicts a cross-sectional top view slice of the grill of FIG. 1A.

In some embodiments, the cooling air ports 1128 are configured to flow air into and across the cooking chamber such that the cooling air has a directional component towards the vents. By flowing cooling air across the cooking chamber in such a manner, the cooling air can displace and move heat and hot air out of the grill through the vents and therefore cool the grill. As described herein, the configuration of these cooling air ports and the resulting cooling air flow paths may differ such that the cooling air may have vertical and horizontal directional components, such as in the x-, y-, and/or z-axes as illustrated in FIGS. 13A and 13B. FIG. 13A depicts the cross-sectional side view slice of the grill of FIG. 3C and FIG. 13B depicts a cross-sectional top view slice of the grill of FIG. 1A. As seen in FIG. 13A, a z-axis (or vertical axis) may be considered an axis running through and perpendicular to the drip pan opening 1100, the x-axis is perpendicular to the z-axis and is considered to span between the front 101 and the back 103 of the grill 100, and the y-axis is perpendicular to both the x-axis and the z-axis and may be considered to span between the two sides of the grill 100 and run perpendicular to the page of FIG. 13A. The view of FIG. 13A may be considered a view along the y-axis. In FIG. 13B, the view may be considered along the z-axis, and the x- and y-axes are depicted.

As stated, the cooling air flow may be vectors that have x-, y-, and/or z-directional components. For example, as seen in FIG. 13A, a first cooling air flow 1130A has an x-component and no z-component, while a second cooling air flow 1130B has both an x- and z-directional component. Because this Figure is 2-dimensional, these two cooling air flows may or may not have a y-directional component. Similarly, in FIG. 13B, a third air flow component 1130C has an x-component but no y-component and a fourth air flow component 1130D has both an x- and y-directional components. Again, because this Figure is 2-dimensional, these two air flows may or may not have a z-directional component. By having at least one directional component in the x-direction towards the vents 114, the cooling air flow flows at least partially towards the vents 114 in order to move heat out of the grill through the vents and cool the grill.

Figure 14A:
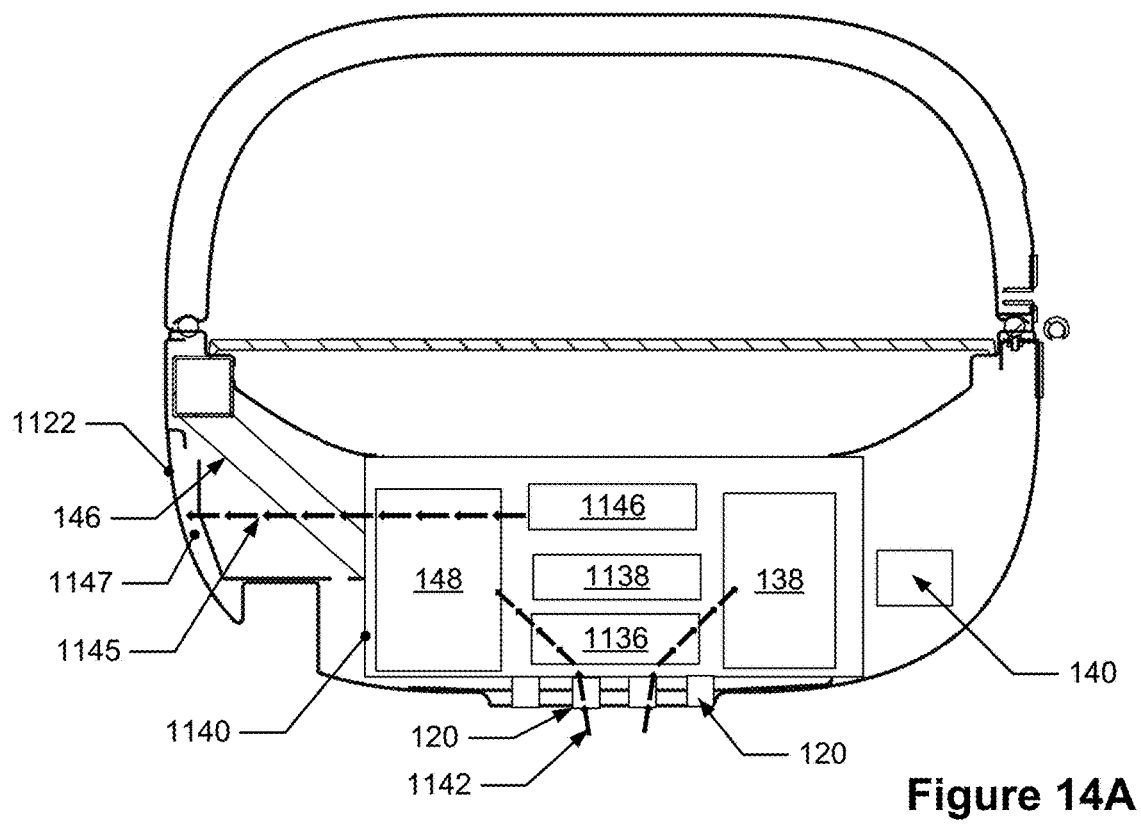
FIG. 14A depicts a cross-sectional side view schematic of the grill of FIG. 1A.

The cooling fan and the stoke fan may be positioned within a removable section of the grill, e.g., an "engine bay," in order to allow for the maintenance, repair, and replacement of these fans as well as the other parts in this removable section. In some embodiments, the removable section may include electronics for the grill 100, including a controller and a connector board. Referring back to the FIG. 1B, the external cover 1134 of this removable section is seen in this Figure and includes the through-holes which serve as the inlet for the cooling fan and the stoke fan. FIG. 14A depicts a cross-sectional side view schematic of the grill of FIG. 1A. Here, the inlets 120, controller 1136, connector board 138, stoke fan 138, and the cooling fan 148 are positioned within the removable section 1140 and arranged such that both fans draw in air through the inlets and over the electronics in order to air-cool these electronics with the operation of one or both fans. This air flow is indicated by dashed arrows 1142.

Figure 14B:
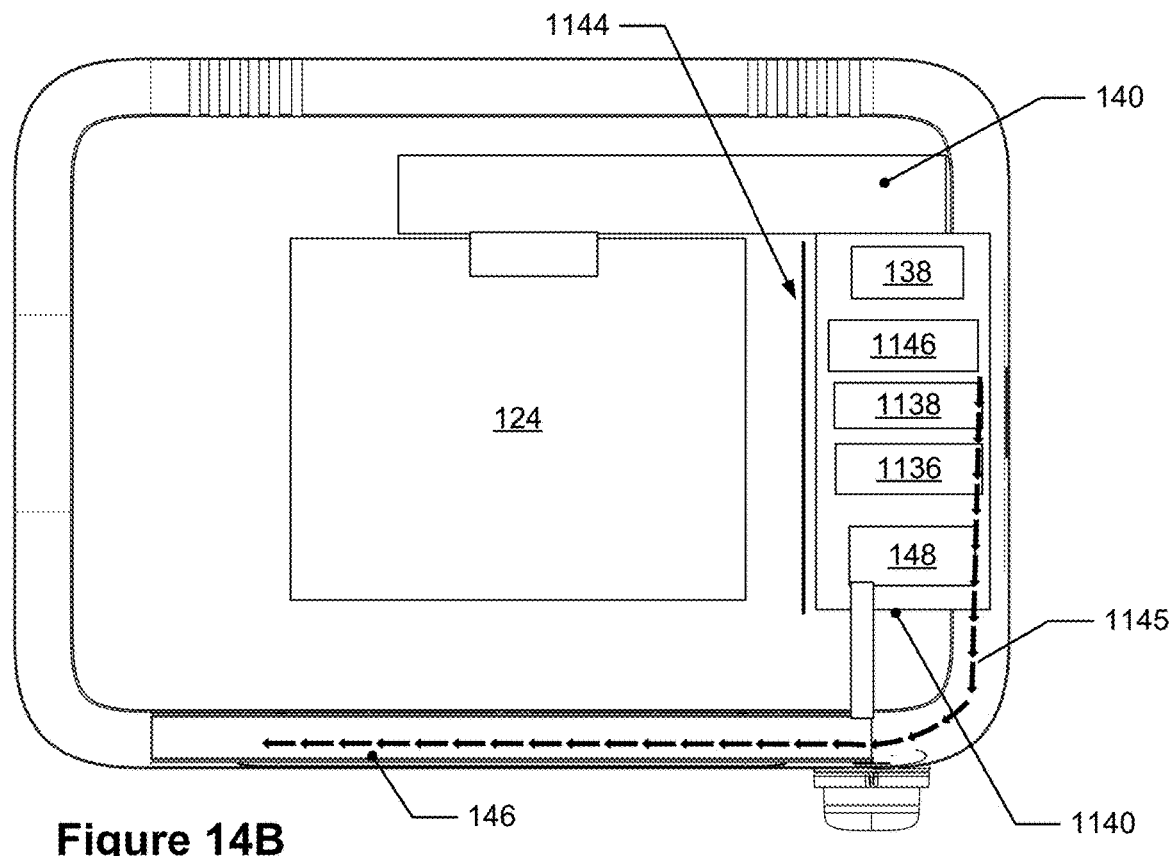
FIG. 14B depicts a cross-sectional top schematic view of the grill of FIG. 1A.
Figure 14C:
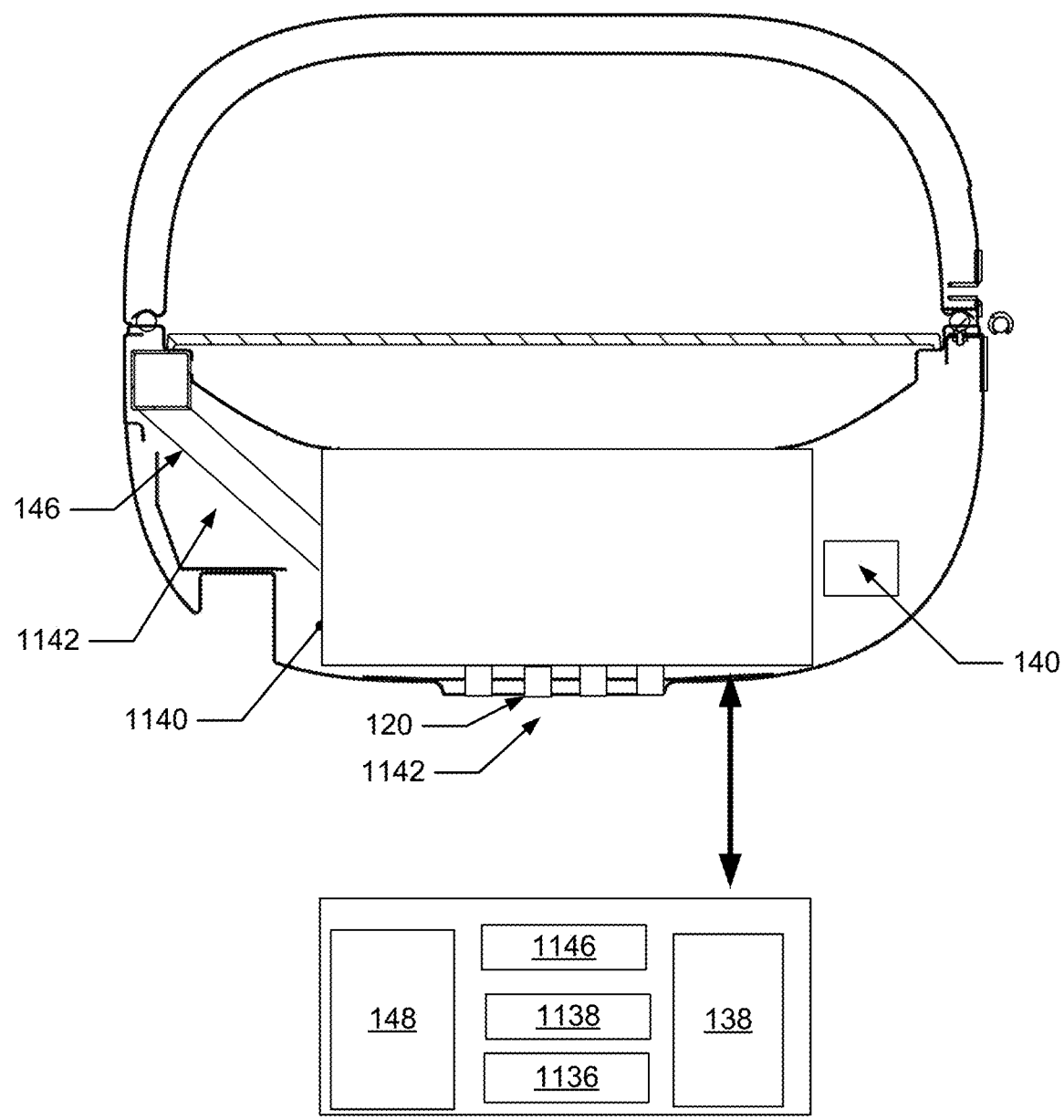
FIG. 14C depicts a cross-sectional side view schematic of the grill of FIG. 1A.

FIG. 14B depicts a cross-sectional top schematic view of the grill of FIG. 1A. Here, the stoke ducting and the cooling ducting are representationally illustrated, along with the stoke fan 138, the cooling fan 148, controller 1136, and connector board 1138, positioned within the removable section 1140. In some embodiments, the removable section also may include ducting connectors that are configured to mate with and connect each of the fans with its respective ducting. The removable section may also include a single bus connector configured to mate with corresponding bus connector positioned within the kettle 108 in order to connect the electronic components in the removable section with the electrical components of the kettle 108. In some embodiments, the removable section may also include thermal shielding 1144, such as one or more plates offset form the electronics and configured to create thermal breaks between the removable section and the heat generated by the charcoal-containing block in the combustion chamber. FIG. 14C depicts the cross-sectional view of FIG. 14A with the removable section removed from the grill.

In some embodiments, the grill 100 may also include a third fan configured to blow air within and across features of the kettle to cool these features. In FIGS. 14A and 14B, the third fan 1146 is positioned within the removable section and configured to blow air, the black dashed arrows labeled 1145, across the electronics, such as the controller 1136, in the removable section 1140 and along the front of the kettle 108 such that the air blow across a portion of the control dial 110 that is internal to the kettle 108 and across the handle 1122 of the drawer 1104, including an air gap 1145 within the handle 1122. This air does not flow through the cooling duct, but rather it may flow underneath, above, or both.

Figure 15:
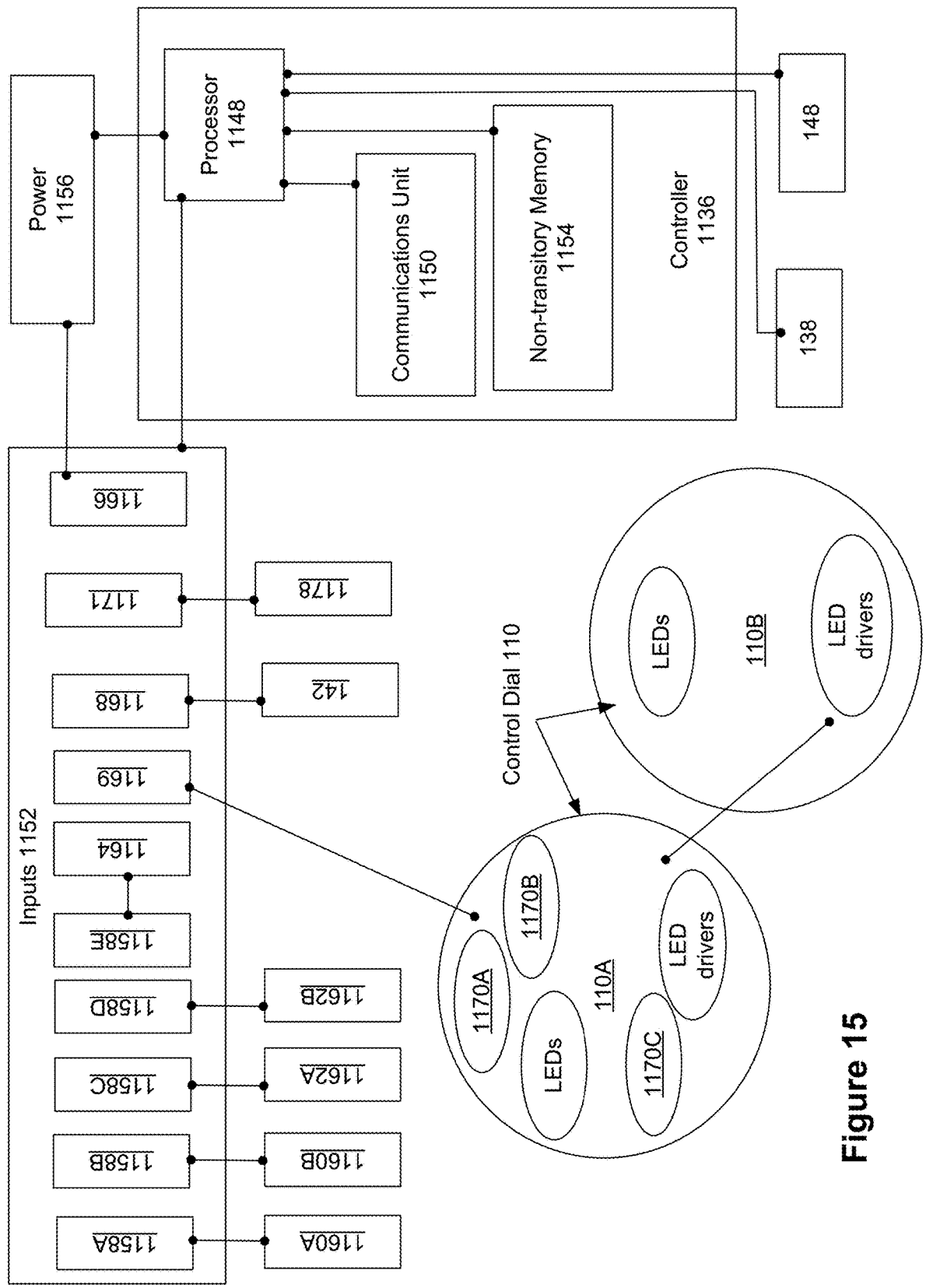
FIG. 15 depicts an example controller of the grill 100.

The controller of the grill is configured to control various aspects of the grill including operation of the cooling fan and stoke fan, as well as receive data from one or more sensors inside the grill. The controller may have various integrated circuits, logic, memory, and/or software that receive instructions, issue instructions, receive data, and control operations. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). FIG. 15 depicts an example controller of the grill 100. In some embodiments, this controller 1136 may include one or more processors 1138, one or more communications units 1150, one or more inputs 1158, which may be a separate connector board as illustrated in FIG. 15, configured to receive power and data from one or more sensors, and one or more non-transitory memory devices 1154 configured to store instructions for causing the processor to control various aspects of the grill. The processor 1138 is communicatively connected to each of these elements and is also communicatively connected to the stoke fan 138 and the cooling fan 148 and configured to control these fans including turning them on and off and adjusting their speeds. In some embodiments, the controller may have its own power source 1156, such as a battery, within the grill or it may be connected to an external power source, such as a battery, an outlet, or a generator for example.

The instructions stored on the one or more non-transitory memory devices 1154 and the corresponding operations sequences of the controller and grill are described in more detail below. The one or more non-transitory memory devices 1154 may be any combination of one or more memory devices, short term, and/or long-term memory. Aspects of the disclosure described below may be implemented by various types of hardware, software, firmware, etc. For example, some features of the disclosure may be implemented, at least in part, by non-transitory, machine-readable media that include program instructions, state information, etc., for performing various operations described herein. Examples of program instructions include both machine code, such as produced by a compiler, and files containing higher-level code that may be executed by the computer using an interpreter. Examples of non-transitory, machine-readable media include, but are not limited to, magnetic media such as hard disks with rotating media, floppy disks, and magnetic tape; optical media such as CD-ROM disks, digital versatile disk (DVD); magneto-optical media; semiconductor memory such as flash memory devices, nanosystems (including molecular memory ICs), or any type of media or device suitable for storing instructions and/or data. Hardware elements configured to store and perform program instructions may be read-only memory devices ("ROM") and/or random access memory ("RAM").

Additionally, a computer program product implementation includes a machine-readable storage medium (media) having instructions stored thereon/in which can be used to program a computer to perform any of the processes of the implementations described herein. Computer code for operating and configuring the controller to communicate with other devices and/or to process data as described herein may be stored on any of the types of physical memory described above. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

The communications unit 1150 may have one or more antennas configured to wirelessly transmit and receive data from one or more external devices, such as a mobile device, a remote processor, a remote server, and a remote temperature sensor. The communications unit may have various antennas and communications protocols including a WiFi modem or other transceiver which may include, WiFi (802.11b/g/n 2.4 GHZ), LiFi, Bluetooth (e.g., Bluetooth low energy, enhanced data rate), nearfield communications, long range wireless IoT communication protocols such as LoRaWAN LPWAN (narrowband IoT (NB-IOT)), Cat M1 (LTE Cat M1), and conventional cellular communications protocols such as 3G, 4G, and 5G.

The connector board 1152 includes multiple inputs for receiving data from multiple sensors as well as connectors for connecting to various features of the grill. For example, the connector board 1152 of FIG. 15 includes four temperature sensor inputs 1158A through 1158D for connecting to temperature sensors. In this embodiment, the first and second temperature sensor inputs 1158A and 1158B are connected to temperature sensors 1170A and 1170B that are positioned within the cooking chamber and configured to detect the temperature at their respective location in the cooking chamber. The third and fourth temperature sensor inputs 1158C and 1158D are configured to connect with food probes 1162A and 1162B that are configured to be inserted into and measure the temperature of food, e.g., a meat probe or meat thermometer. The connector board 1152 may also include a fifth temperature sensor input 1158E configured to connect with a temperature sensor 1164 within the removable section, such as on the connector board 1152 or the controller 1136. Each of these sensors is configured to generate data, including temperature data. The controller 1136 is configured to receive data from each of the inputs and each of the sensors connected to the inputs of the connector board 1152.

The connector board 1152 may include a power input 1166 for connecting with and receiving power, such as an AC or DC power source; in some instances, the connector board or grill may also include an AC-to-DC converter. The connector board 1152 may also include an electrical connection 1168 to the igniter 142 and configured to transmit electrical signals and power to the igniter 142. This may include transmitting power to the igniter 142 in order to cause the igniter 142 to generate heat.

In some embodiments, the controller 1136 may also be connected directly, or indirectly through a connection 1169 in the connector board 1152 as shown in in FIG. 15, to the control dial 110. The control dial 110 may, in some instances, include various sensors configured to generate data which is transmitted to and received by the controller 1136 and which may be used to turn the grill 100 "on" or "off" as well as to "start" and to adjust the temperature of the grill. For example, the control dial 110 may include a first sensor 1170A configured to detect a first input which is received and used by the controller as an input to turn the grill "on," a second sensor 1170B configured to detect a second input which is received and used by the controller as an input to ignite the charcoal-containing fuel block, and a third sensor 1170C configured to detect a third input which is received and used by the controller as a temperature set point for the grill.

In some embodiments, the first and second sensors 1170A and 1170B are hall effect sensors configured to detect the presence of a magnet in an input mechanism, such as a switch or ring. The third sensor 1170C may, in some instances, be a rotary encoder configured to detect rotation of a second input mechanism such as the rotation of a dial. The rotary encoder may be a mechanical, optical, on-axis magnetic, or off-axis magnetic. These three sensors may be positioned on a rear portion 110A of the control dial 110. In some embodiments, the drivers for controlling lights, such as LED lights, on the control dial may be positioned on the rear portion 110A and a front portion 110B of the control dial 110, which is connected to the rear portion 110A. These drivers may power various LEDs which may be configured to emit different color lights, such as orange to indicate the grill is heating, blue to indicate the grill is cooling, and white to indicate the grill is at the desired temperature. Additionally, the control dial 110 may include a set of temperatures which may correlate to a set temperature of the grill. These temperatures may be illuminated, such as with an orange light, to reflect the actual temperature of the grill when it is heating, or with a blue light as the temperature is cooling.

Figure 16B:
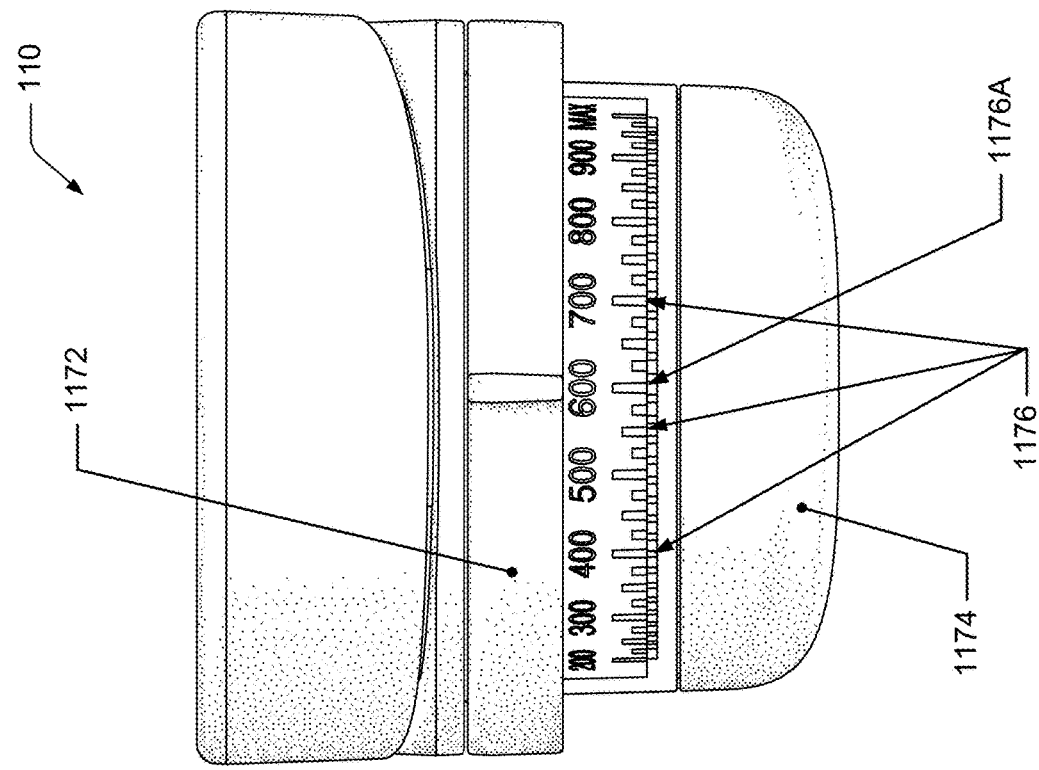
FIG. 16B depicts a top view of the control dial.
Figure 16A:
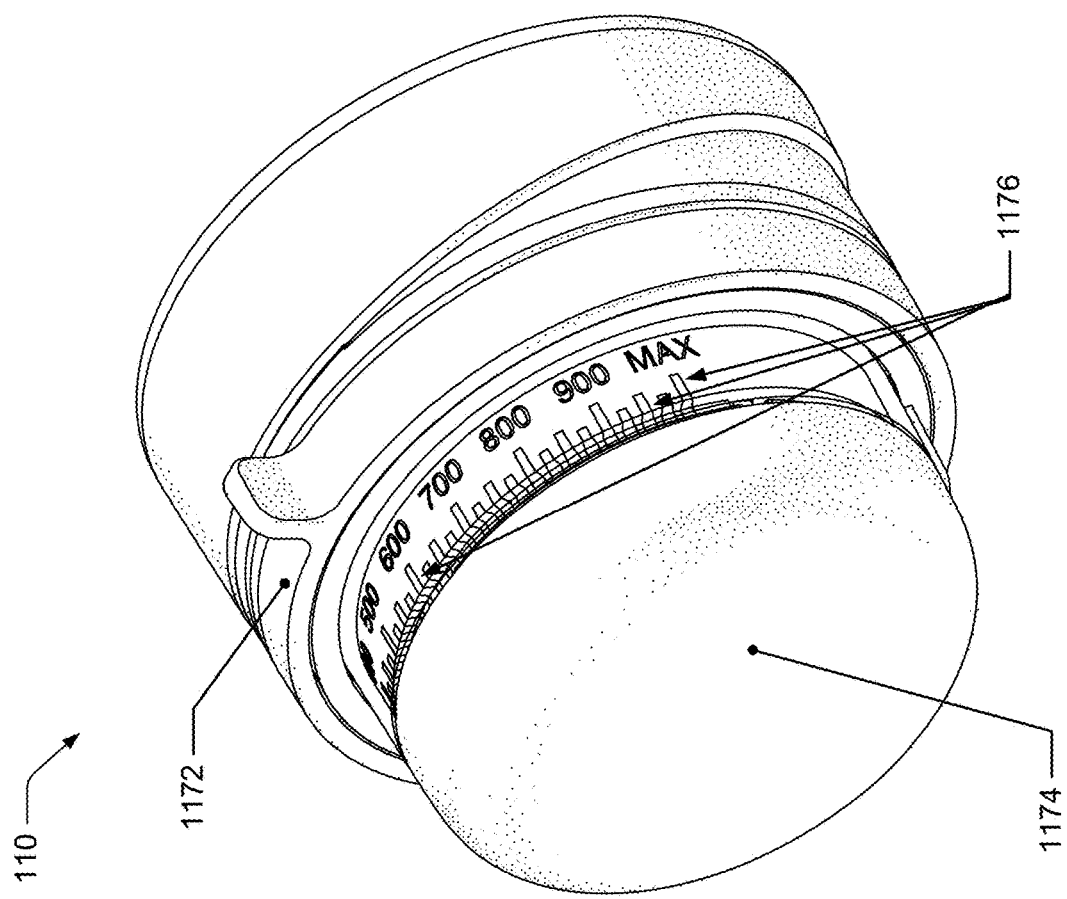
FIG. 16A depicts an off-angle view of a control dial.
Figure 16C:
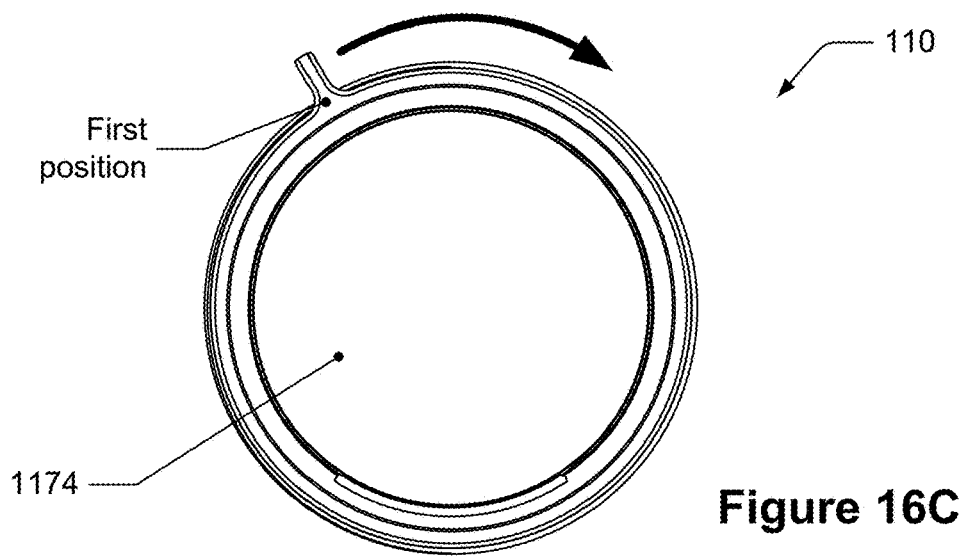
FIGS. 16C through 16E depict a front view movement sequence of the control dial.
Figure 16D:
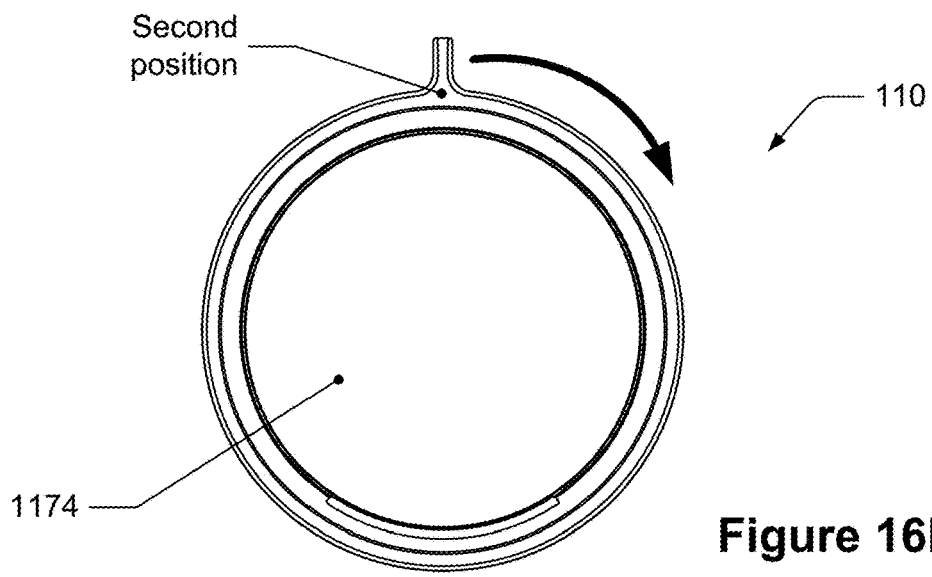
Figure 16E:
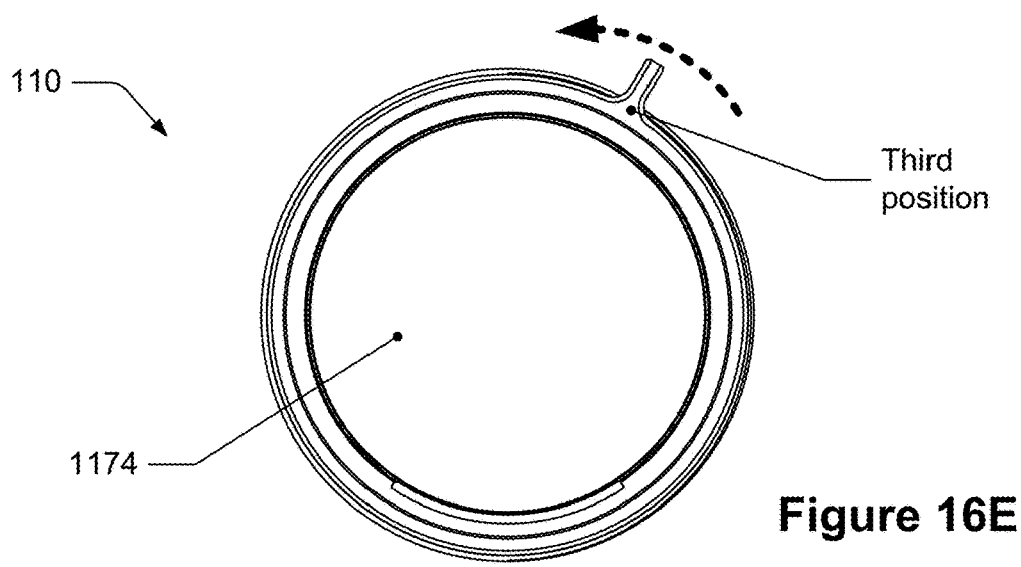

FIG. 16A depicts an off-angle view of a control dial, FIG. 16B depicts a top view of the control dial, and FIGS. 16C through 16E depict a front view movement sequence of the control dial. This control dial 110 of FIGS. 16A and 16B includes a rotatable ring 1172 configured with an internal magnet and configured to rotate around the center axis of the control dial 110, and a rotatable dial 1174 also configured to rotate around the center axis. The rotatable dial 1174 may have or be connected to the rotary encoder such that its rotation translates to the rotary encoder 1170C. This rotatable dial 1174 is used to set the desired temperature, such as by a user manually rotating the rotatable dial 1174.

As also seen in FIGS. 16A and 16B the rotatable dial 110 includes a plurality of numbers to indicate the set and actual temperature of the grill, and a plurality of LEDs 1176 that may illuminate in various manners. This may include one LED illuminating a particular color to indicate the set temperature and other LEDs illuminating a particular color, such as orange, to indicate the actual temperature inside the grill, and those temperatures already reached. For example, in FIG. 16B, the temperature may be set to 600° F. which illuminates LED 1176A, such as with a blue LED. As the temperature inside the grill increases, such as from 200° F., 300° F., until 600° F., each of the LEDs corresponding with the grill temperature that has been reached may illuminate and remain illuminated, such as with an orange or red LED. For instance, when the grill reaches 300° F. while heating to 600° F., the LED corresponding with 300° F. may illuminate and all the LEDs corresponding to the temperatures lower than 300 OF may be illuminated. Once the grill temperature reaches the set temperature, such as the 600° F., the LEDs may change color, such as to white. Similarly, if a temperature is set to a number lower than the actual grill temperature, that set temperature may be illuminated with a particular color, such as blue, and as the temperature the grill inside decreases, the LEDs corresponding to the actual temperature may be illuminated a different color, and those temperatures above the actual temperature inside the grill may not be illuminated.

The rotation of the rotatable ring may be used to turn the grill on and off, and to ignite the grill. For instance, in FIG. 16C the front of the control dial 110 of FIG. 16A is seen and the rotatable ring 1172 is rotatable, such as in the direction of the arrow. In the depicted position, the rotatable ring 1172 may be in a first, or "off," position. In FIG. 16D, the rotatable ring 1172 has been moved to a second position, which may be an "on" position. When in this second position, the internal magnet may be in close proximity to the first hall effect sensor 1170A which sends a signal to the controller and which the controller may interpret as an "on" command to turn the grill on. In FIG. 16E, the rotatable ring 1172 has been moved to a third position, which may be an "ignite" position. When in this third position, the internal magnet may be in close proximity to the second hall effect sensor 1170B which sends a signal to the controller and which the controller may interpret as an "ignite" command to ignite the charcoal-containing fuel blow in the grill.

In some embodiments, the control dial 110 may include a return mechanism configured to cause the rotatable ring 1172 to rotate counterclockwise to the second, or on, position from a position clockwise from the second position, including form the third position. Once the rotatable ring 1172 has moved clockwise past the second position, the return mechanism may exert a counterclockwise resistive force that pulls the rotatable ring 1172 towards the second position as indicated by the dashed arrow in FIG. 16E. Once at the second position (i.e., as depicted in FIG. 16D), the rotatable ring 1172 may remain at this position until a user exerts a counterclockwise force on the rotatable ring 1172 to move it to the first position. Once the magnet has moved away from the first sensor 1170A, the controller may interpret the absence of that signal as an "off" command to turn the grill off. In some embodiments, the return mechanism may be one or more springs internal to the control dial 110.

Referring back to the controller of FIG. 15, in some embodiments, the grill may include a notification mechanism 1178 connected to the controller 1136, such as to connection 1171, which is configured to issue a notification, such as an alert, to a user. As described in more detail below, these notifications may include that the grill has reached the set temperature or that food has reached the desired internal temperature. The "notification" may be one or more of an alarm, alert, message, an auditory output, an electronic communication, an electromagnetic communication, a tactile output, and a visual output. Notifications may be provided through a variety of media, and may, in some cases, require further action by an intermediate device before being perceptible by the person. For example, the grill may have a notification mechanism that includes lights that are configured to light up in order to catch the attention of a person (the notification, in this case, may refer to a signal that is sent to the lights that cause these components to light up; it may also refer to the light or graphics that is emitted or displayed by components receiving the signal in response to the signal). In some examples, the grill may have a notification mechanism that includes a speaker or other device capable of generating auditory output that may be used to provide the notification (the notification in this case may be a signal that is sent to a speaker or other audio device; it may also refer to the actual audio output that is generated by the audio device in response to the signal).

In some other or additional examples, the notification mechanism may include a wireless interface and the notification may take the form of an electronic or electromagnetic communication, e.g., a wireless signal, that is sent to another device, e.g., a mobile device or a smartphone, associated with a user (the notification in this case may be an electromagnetic signal; it may also refer to any audio, visual, tactile, or other output generated by the receiving device in response to receipt of the signal). In such scenarios, the notification may still be generated or initiated by the notification mechanism even if the intended recipient device of the communication fails to be activated or otherwise fails to convey the notification to the person. The notification mechanism may be configured to generate and/or provide one or more notifications to the user, and may include one or more components that may be used to generate audio, visual, tactile, electromagnetic, or other types of notifications.

The grill 100 is configured to receive, ignite, and manage a self-contained charcoal-containing fuel block mentioned above and shown in various Figures. In some embodiments, the charcoal-containing fuel block includes a unitary charcoal briquette slab, a combustible igniter layer extending across the unitary charcoal briquette slab, and a flavor layer encased in a combustible packaging. In some embodiments, the charcoal-containing fuel block may include an ignition coating around the periphery of the charcoal-containing fuel block that servers as the ignition layer for all of the charcoal-containing fuel block. The charcoal-containing fuel block can thus be fully self-contained, including: a long-term fuel source in the form of the charcoal slab; an early ignition source—configured to heat and ignite the charcoal slab—in the form of the ignition layer or coating; flavoring, such as in the form of a layer of compressed wood chips; and packaging configured to encase and isolate these fuel, ignition, and flavor components from human handling, which may simplify use of the grill and charcoal-containing fuel block. The charcoal-containing fuel block can also be fully combustible such that very little or none of it remains in the cartridge chamber in the grill upon completion of a clean or burnout mode as described below.

Figure 17A:
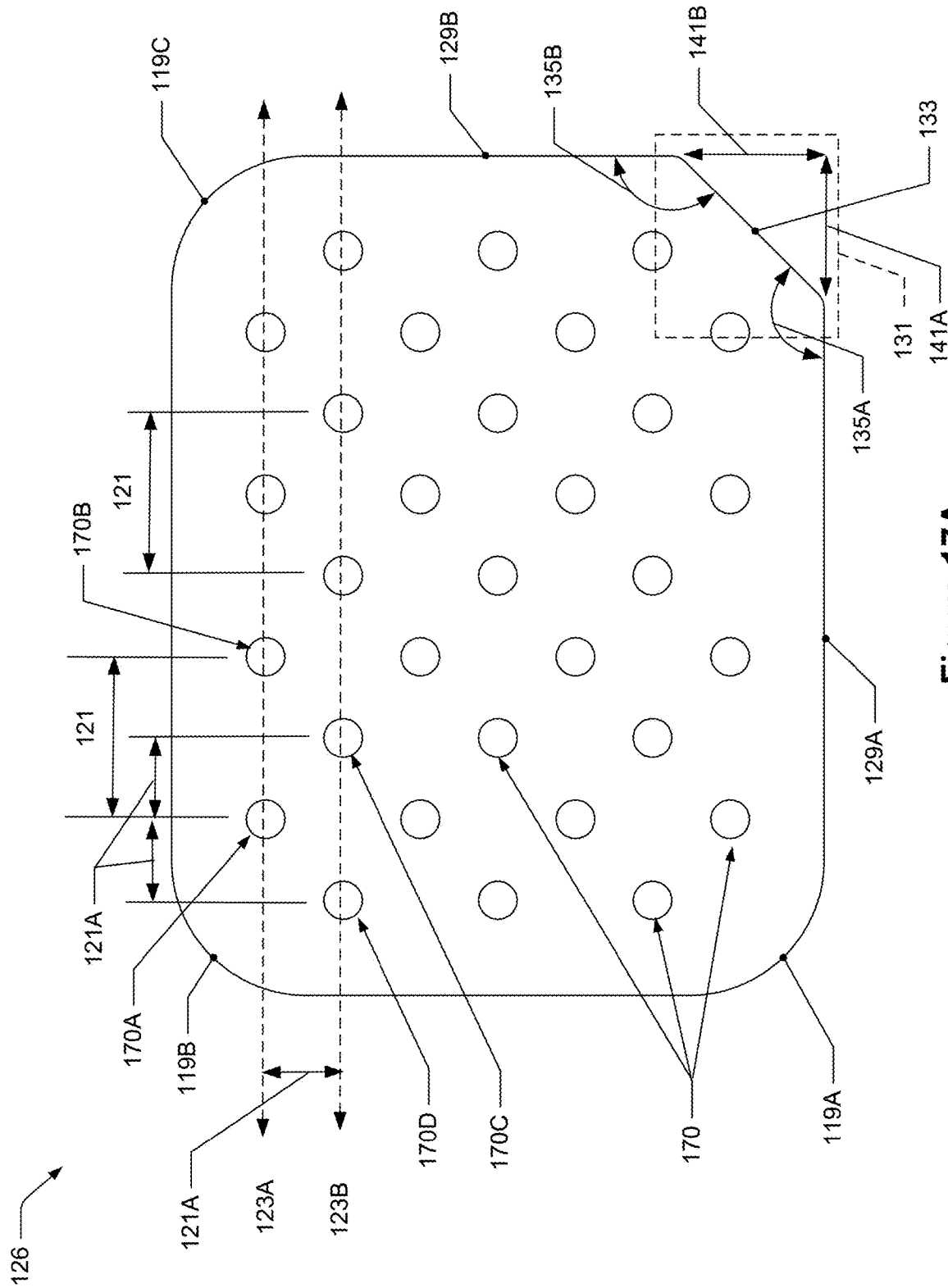
FIG. 17A depicts a top view of an example charcoal-containing fuel block.

As mentioned above, in some embodiments the charcoal-containing fuel block may have a generally rectangular shape with one corner having an aligning cut formed by the removal of material in a particular shape, such as a chamfered or angled corner. FIG. 17A depicts a top view of an example charcoal-containing fuel block. In this illustrated embodiment, the charcoal-containing fuel block 126 includes three radiused corners, 119A, 119B, and 119C, and a fourth corner, encompassed by a dashed rectangle 131 in which material has been removed to form the aligning cut 133, which is in the form of a chamfer having a planar surface 133 spanning between two adjacent sides 129A and 129B. This planar surface 133 may be offset from one side 129A by a first oblique angle 135A and offset from the other side 129B by a second oblique angle 135B. In some instances, these oblique angles may be the same angle while in others they may differ. This chamfer also has a length 141B and a height 141A which may be equal to each other, as shown in FIG. 17A. The shape of this chamfered corner 131 enables it to be positioned in and aligned with the fuel pan described above, including the aligning feature 181 shown in 9E. In some such embodiments the planar surface 133 of the chamfered corner of FIG. 17A may be parallel, or substantially parallel (e.g., within ±1%, ±5%, ±10%, or ±20% of parallel), to the aligning surface 196 of the aligning feature.

The charcoal-containing fuel block 126 also includes a plurality of through-holes 170 that extend through the charcoal-containing fuel block 126. The center axis of each of these holes may be parallel, or substantially parallel (e.g., within ±1%, ±5%, ±10%, or ±20% of parallel) to the center axis of the charcoal-containing fuel block 126 which runs perpendicular to the page of FIG. 17A. These through-holes may have a circular, or substantially circular (e.g., within ±1%, ±5%, ±10%, or ±20% of round), cross-sectional shape, as shown in FIG. 17. In some other embodiments, one or more of these through-holes 170 may have a different cross-sectional shape, such as elliptical, rectangular, triangular, or obround, for example. As shown in FIG. 17A, in some embodiments, these through-holes 170 may arranged along linear arrays and offset from adjacent through-holes on the array by an equal, or substantially equal, distance 121 in order to provide uniform air flow through the charcoal-containing fuel block 126. Two linear arrays 123A and 123B are illustrated in FIG. 17 and the through-holes on each array are spaced apart from each other by the same distance 121. These arrays may also be offset from each other by half of the separation distance 121 such that each through-hole is equally spaced from adjacent through-holes in an adjacent array. For example, through-hole 170A is equally spaced by distance 121 from through-hole 170B which is adjacent to through-hole 170A in the same linear array 123A. Through-hole 170A is also equally spaced by distance 121A from adjacent through-holes 170C and 170D which are adjacent to through-hole 170A in an adjacent array 123B. Distance 121A may be, as shown, half or substantially half (e.g., within ±1%, ±5%, ±10%, or ±20% of half), of distance 121. Similarly, each linear array may be offset from each other by the distance 121A in order to create equal, or semi-equal spacing, of the through-holes 170.

The arrangement, size, and number of these through-holes may affect various aspects of the grill and charcoal-containing fuel block, such as the combustion rate and air flow through the grill. For example, increasing the hole diameter may reduce the amount of material to combust, therefore decreasing potential burn duration, and may increase the combustion rate of the charcoal-containing fuel block by increasing air flow through it. Additionally, adding more holes may again reduce the amount of material to combust, but and may also increase the combustion rate. In contrast, decreasing the number of holes and/or the diameter of the holes may increase combustion duration and reduce combustion rate of the charcoal-containing fuel block. In some embodiments, the charcoal-containing fuel block may not have any through-holes which may still allow for air flow through the combustion chamber 124 around the periphery of the charcoal-containing fuel block and cause a longer combustion duration and lower temperature combustion. This may be considered a "low and slow" charcoal-containing fuel block.

In some embodiments, the charcoal-containing fuel block 126 may have a length (right to left in FIG. 17A) that is at least 250 mm, including 263 mm, and a height (top to bottom in FIG. 17A) that is at least 200 mm, including 205 mm. The distance 121A may be at least 20 mm, including 24 mm. The oblique angles 135A and 135B may be at least 125°, 130°, 135°, and 140°, for example. The length 141B and the height 141A of the chamfered corner may be, in some instances, equal lengths such as at least 35 mm, 40 mm, 45 mm, 47 mm, 50 mm, and 55 mm. The diameter of the through-holes may be, for example, at least 7 mm, 10 mm, 12 mm, and 15 mm. The radius of corners 119A, 119B, and 119C may be at least, for instance, 35 mm, 40 mm, 42 mm, 45 mm, and 50 mm.

Figure 17B:
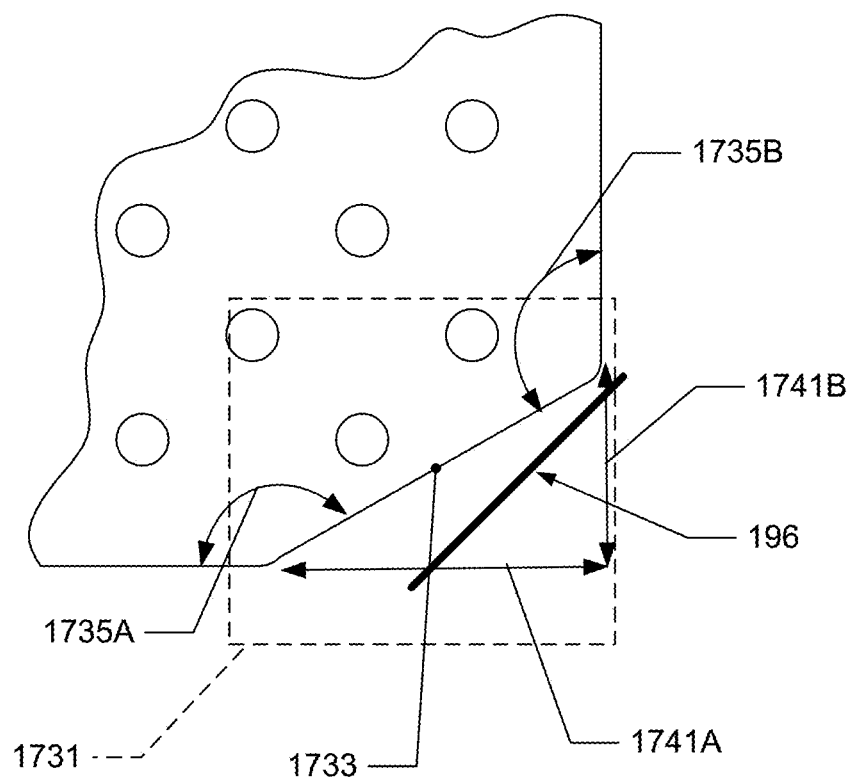
FIGS. 17B through 17D depicts three example corners of a charcoal-containing fuel block.
Figure 17C:
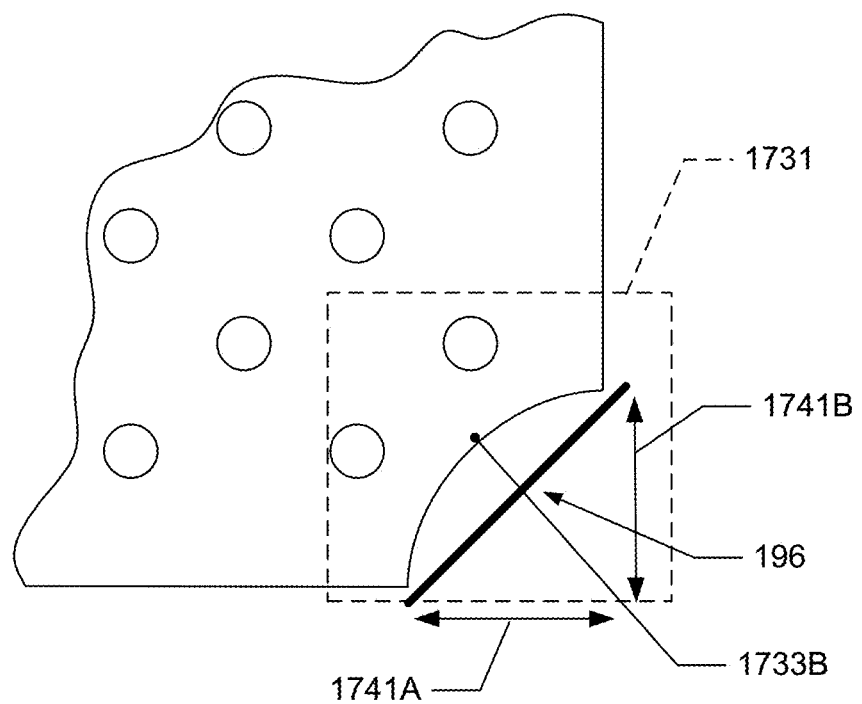
Figure 17D:
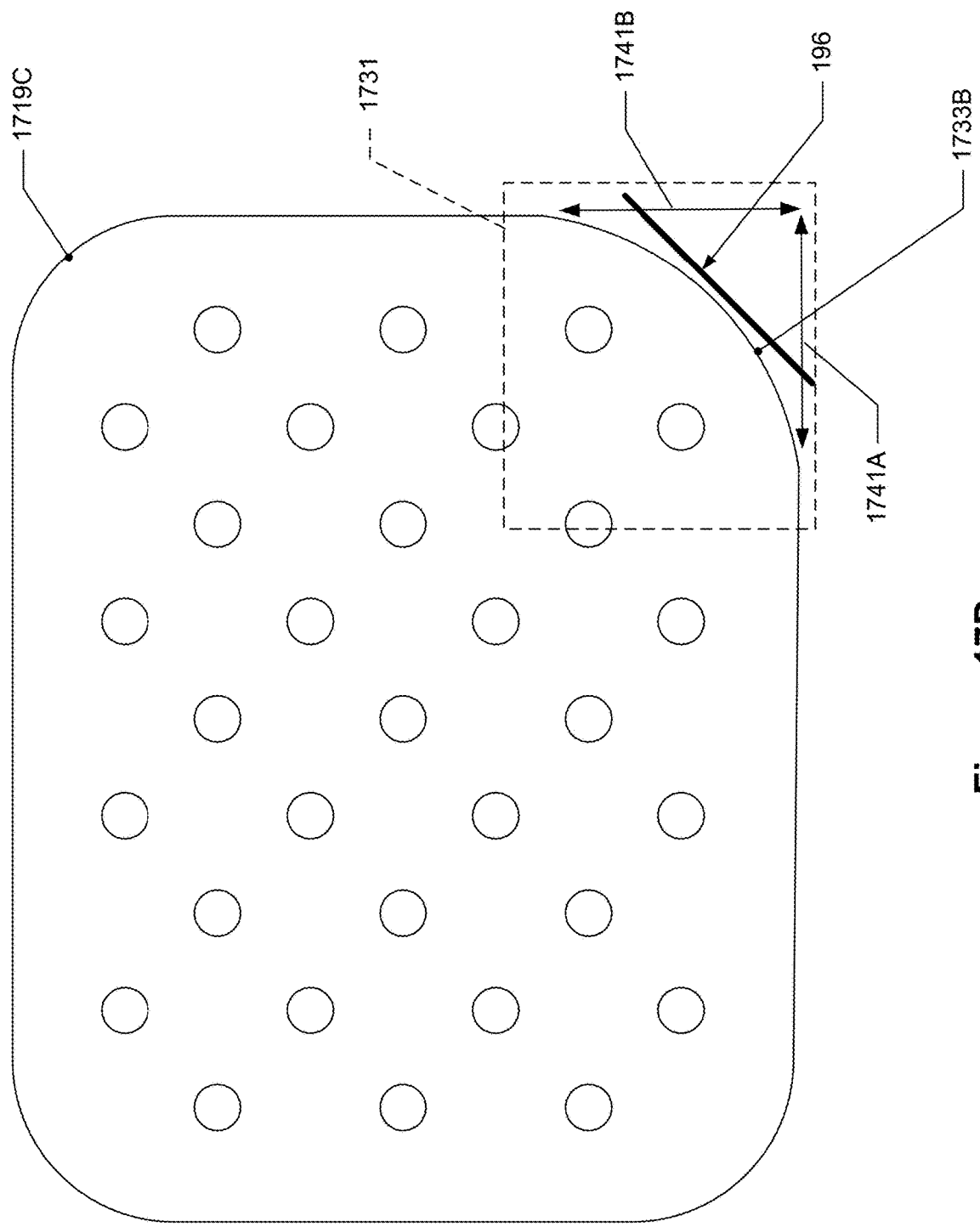

In some embodiments, the configuration of the charcoal-containing fuel block may differ. As provided above, the charcoal-containing fuel block is configured to be positioned inside the fuel pan which has the aligning feature seen in FIGS. 9D and 9E. In some embodiments, the fourth corner 131 of the charcoal-containing fuel block may have a different shape that still may fit within and align with the fuel pan and aligning feature. This may include a chamfer with the height and length different than each other such that oblique angles are different than each other and the planar surface is not parallel with the aligning surface of the aligning feature. This may create a chamfer with a scalene triangle shape. This may also include the fourth corner 131 having a non-planar surface, such as a curved surface including a convex and concave curve. FIGS. 17B through 17D depicts three example corners of a charcoal-containing fuel block. FIG. 17B depicts a partial charcoal-containing fuel block and it has a chamfered corner with an unequal height 1741B and length 1741A such that corner 1731 has unequal oblique angles 1735A and 1735B. The aligning surface 196 of the aligning feature is also depicted and as can be seen, the planar surface 1733 is not parallel with the aligning surface 196 but this corner 1731 may nevertheless still be aligned with the aligning feature.

FIG. 17C also depicts a partial charcoal-containing fuel block, but this has a rounded corner with a concave curved surface 1733B having a radius. The section removed from this partial charcoal-containing fuel block may have a height 1741B and length 1741A that may be the same or greater than the height 141 and length 141B of FIG. 17 in order for this charcoal-containing fuel block to fit within the fuel pan and align with the aligning feature, again depicted here. FIG. 17D depicts a charcoal-containing fuel block, but this has a rounded corner with a radiused corner, such as a convex curved surface 1733B having a radius. The section removed from this partial charcoal-containing fuel block may have a height 1741B and length 1741A that may be the same or greater than the height 141 and length 141B of FIG. 17 in order for this charcoal-containing fuel block to fit within the fuel pan and align with the aligning feature, again depicted here. The radius 1733B of this corner 1731 may be larger than the other radiuses of the other corners, such as 1791C, of the charcoal-containing fuel block.

Figure 18:
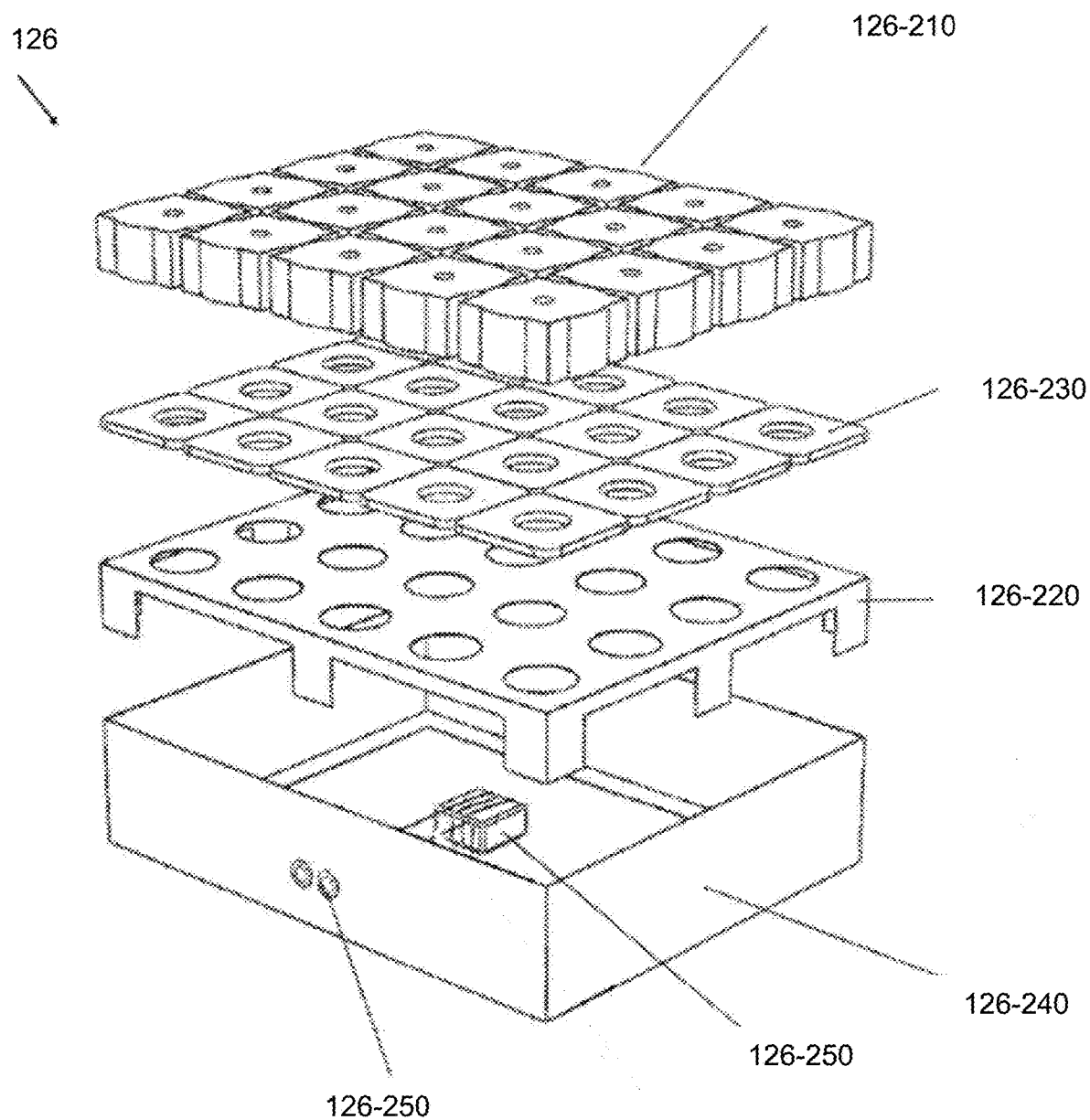
FIG. 18 depicts another example charcoal-containing fuel block.

The charcoal-containing fuel block may include multiple layers as described herein and shown in FIG. 18 depicts another example charcoal-containing fuel block. In some embodiments, the charcoal layer 126-210 can include a unitary charcoal briquette slab, such as in the form of a single pressed, cast, or extruded charcoal structure. The charcoal briquette slab can also be perforated to permit airflow through the charcoal-containing fuel block 126. Alternatively, the charcoal-containing fuel block 126 can include a group of discrete charcoal briquettes arranged in a rigid combustible support structure, such as a corrugated paper tray or corrugated paper lattice. The charcoal layer 126-210 in a charcoal-containing fuel block 126 can also include additives or otherwise be of a type of charcoal that outputs heat within a particular range during typical operation of the stoke fan in the charcoal grill system. For example, the charcoal grill system can be configured to interface with charcoal cartridges of different types and configured to output heat at different rates to support different cooking chamber temperatures (hereinafter "operating temperatures") in the charcoal grill system 100, such as: a "low-and-slow" charcoal-containing fuel block 126 configured to support cooking chamber temperatures between 175° F. and 250° F.; a "standard" charcoal-containing fuel block 126 configured to support cooking chamber temperatures between 250° F. and 450° F.; and a "charcoal-fired pizza" cartridge configured to support cooking chamber temperatures between 750° F. and 950° F.; etc.

The charcoal-containing fuel block 126 can also include a combustible igniter layer 126-220, or ignition layer, that extends across the charcoal layer 126-210 (e.g., across the unitary charcoal briquette slab). The igniter layer 126-220 can be of a material that is more highly combustible than the charcoal layer 126-210 and can be configured to ignite prior to the charcoal layer 126-210 when the igniter in the charcoal grill system is activated. For example, the igniter layer 126-220 can include a layer of pressed paper soaked or impregnated with mineral oil or lighter fluid and arranged across the breadth and width of the charcoal layer 126-210. In another example, the igniter layer 126-220 can include a layer of fire starter material or lower-density charcoal granules arranged across the charcoal layer 126-210.

In one variation, the charcoal-containing fuel block 126 also includes a flavor layer 126-230. For example, the charcoal-containing fuel block 126 can include a layer of compressed wood chips, such as pressed hickory or apple-wood wood chips. In this example, the flavor layer 230 can be arranged across the charcoal layer 126-210 opposite the igniter layer 126-220.

The charcoal-containing fuel block 126 can also include combustible packaging 126-240 encompassing the unitary charcoal briquette slab and the combustible igniter layer 126-220. For example, the packaging 126-240 can include wax paper. The packing 126-24 may also be removable. The packaging 126-240 can also include text, iconography, or other visual content that indicate the type of charcoal-containing fuel block 126, operating temperatures of the charcoal-containing fuel block 126, and/or a flavor or wood chip type incorporated into the charcoal-containing fuel block 126.

Figure 19:
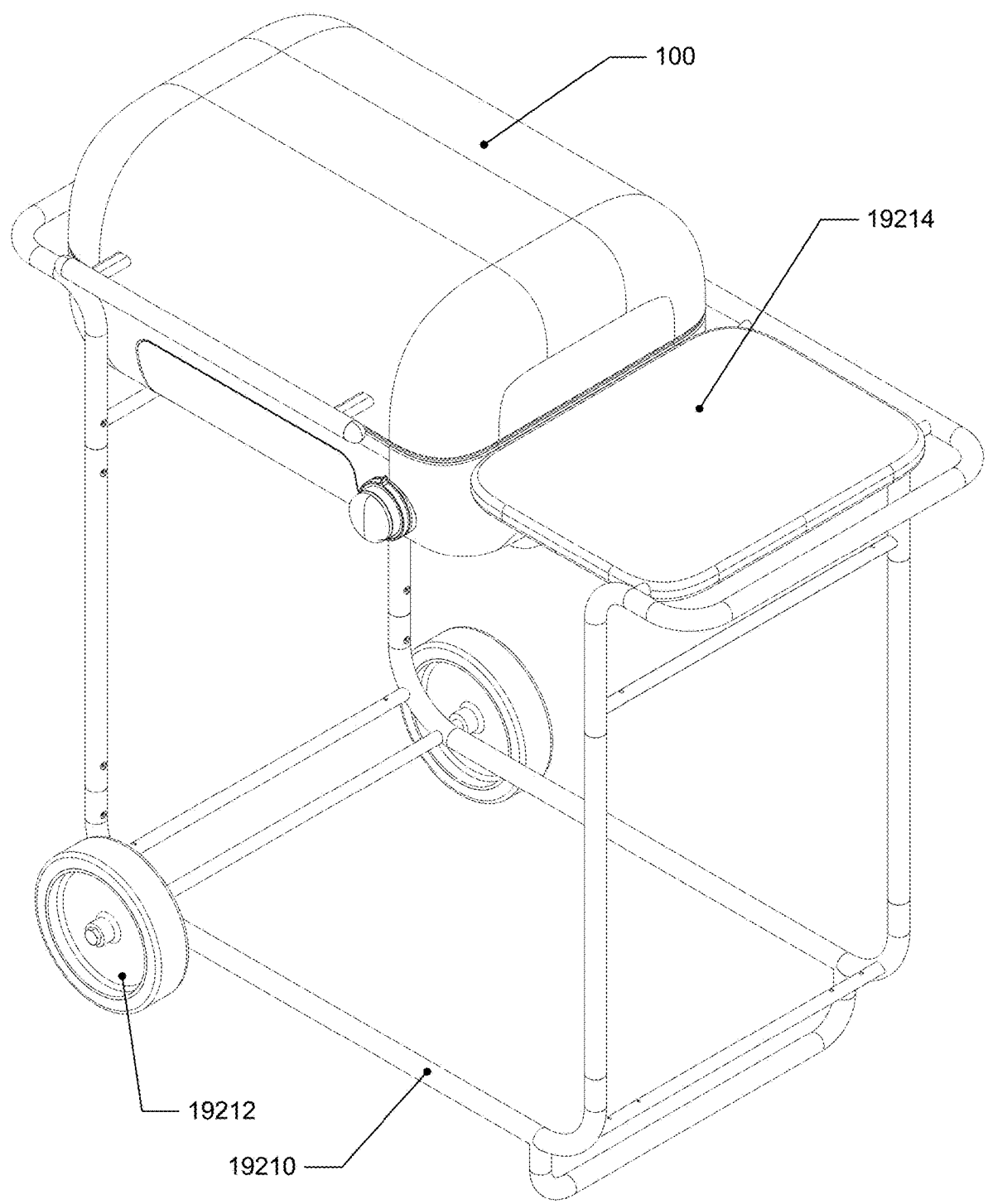
FIG. 19 depicts the grill of FIG. 1A with an example support frame.

In some embodiments, the grill may also include a support frame that includes wheels and a preparation surface adjacent to the grill. FIG. 19 depicts the grill of FIG. 1A with an example support frame 19210 with wheels 19212 and preparation surface 19214.

Example Operations

Figure 20:
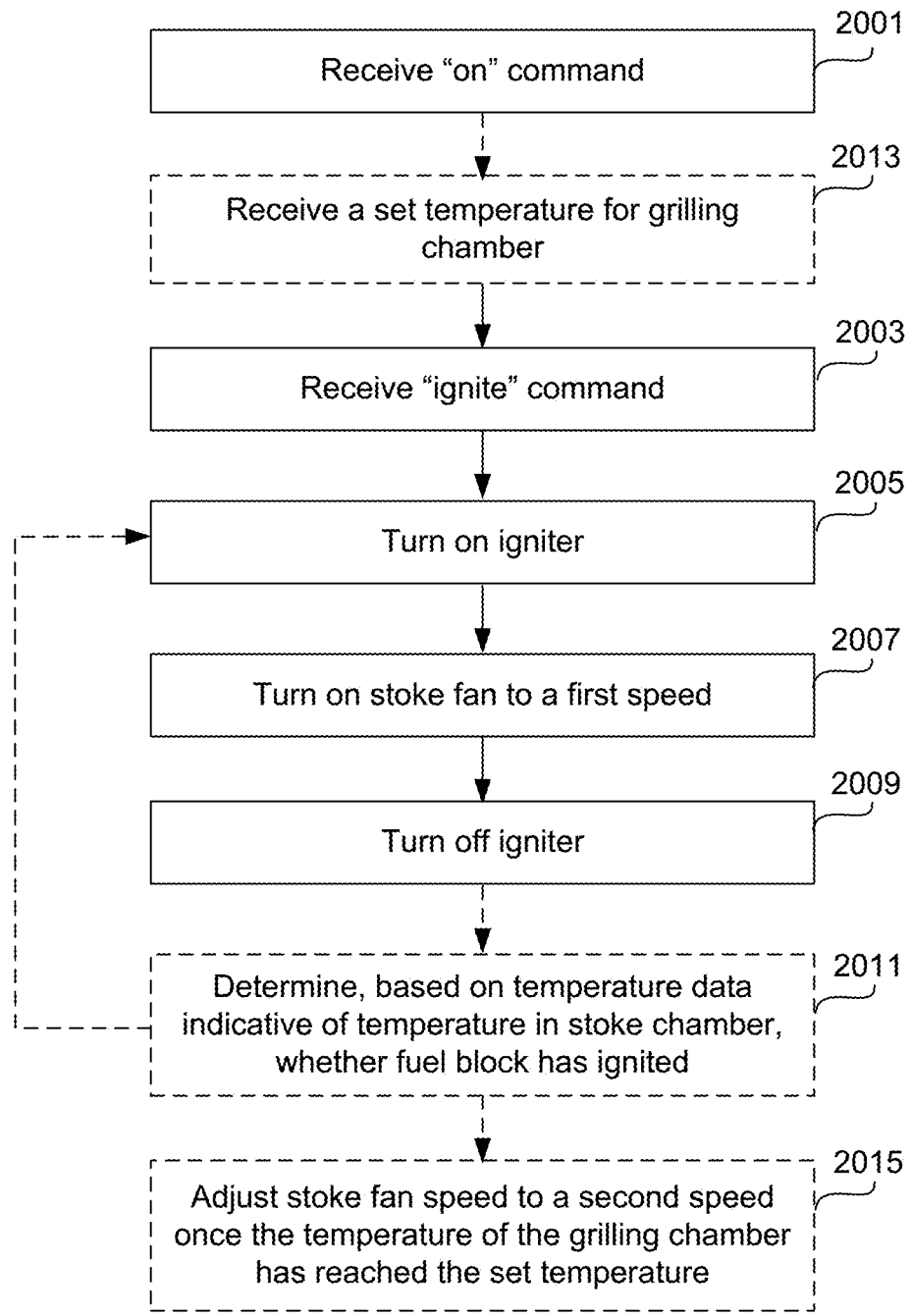
FIG. 20 depicts an example ignition sequence of operations.

Provided herein are example operations sequences for operating the grill. These sequences may include an ignition sequence to ignite the charcoal-containing fuel block, a maintenance sequence for maintaining a desired temperature inside the cooking chamber, and a ramp sequence to increase or decrease the temperature in the cooking chamber. FIG. 20 depicts an example ignition sequence of operations. In block 2001, an "on" command is received by the controller 1136. This command may be in the form of a signal or data from a sensor in the grill 100, such as the first sensor 1170A described above. The controller may be configured to receive this signal and have instructions configured to interpret this signal or data as the "on" command. Before receiving the "on" command, the controller 1136 may be in a sleep state in which power is on to the one or more processors 1138 and at least some of the sensors, including the first sensor 1170A, but in a low power mode, with few if any operations being performed. In this state, the one or more processors 1138 can receive signals from the first sensor 1170A. In some embodiments, the communications unit 1150 may also be on such that it can receive signals, such as an "on" signal transmitted by a remoted device, such as a mobile device. The one or more processors 1138 may exit the low power state, and "wake up", in response to receiving signals or data indicative of an "on" command.

In block 2003, an "ignite" command is received by the controller 1136. This command may be in the form of a signal or data from a sensor in the grill 100, such as the second sensor 1170B described above, or a signal received by the communications unit 1150, such as an ignite signal from a mobile device. The controller may be configured to receive this signal and have instructions configured to interpret this signal or data as the "ignite" command. In response to receiving this signal or data, in block 2005 the igniter 142 is turned on in order to generate heat and ignite the charcoal-containing fuel block 126 in the grill 100. The controller is configured to cause the igniter to turn on and remain on.

After, or concurrent with, block 2005, the stoke fan is turned on and set to a first speed. The controller is configured to control the stoke fan to perform this operation. In some embodiments, the first speed may be a high, or the highest, speed setting in order to accelerate the ignition and combustion of the charcoal-containing fuel block. In some instances, there may be a delay between block 2005 and 2007 to allow the charcoal-containing fuel block to catch fire and to prevent extinguishing the charcoal-containing fuel block.

After blocks 2005 and 2007, the igniter is turned off in block 2009. In some embodiments, the igniter may be turned off after a set period of time, such as 5 seconds, 15 seconds, or 30 seconds. In some other embodiments, the igniter may be turned off in response to temperature data generated by a temperature sensor in the combustion chamber and/or the cooking chamber. After block 2005, the controller may receive temperature data generated by such a first temperature sensor in the combustion chamber, a second temperature sensor in the cooking chamber, or both, and determine from this temperature data whether ignition has occurred. This determination, represented by optional block 2011, may include comparing whether the received temperature data above a first threshold, such as 150° F. or 200° F. for example, which may be indicative that the charcoal-containing fuel block has ignited and is combusting. If it is determined that the charcoal-containing fuel block has successfully ignited, then operation 2009 may be performed; in some of these embodiments, block 2011 may be performed after block 2007 and before block 2009.

In some other embodiments, as depicted in FIG. 20, optional block 2011 may be performed after the igniter has been turned off in operation 2009. Here, if it is determined that the charcoal-containing fuel block did not successfully ignite, then the igniter may be turned on again by repeating operation 2005. In response to this determination, the stoke fan may also be turned off in order to avoid extinguishing the charcoal-containing fuel block has ignited.

The ignition sequence may end after a period of time has passed, or once the grill has reached a set temperature. In some embodiments, the ignition sequence may optionally include block 2013, which may occur after block 2001 and before block 2005, in which a set temperature for the grilling temperature is received, i.e., a desired temperature input by the user. This set temperature may be in the form of a signal or data generated by a sensor on the grill, such as sensor 1170C which may be the rotary encoder. In some embodiments, the set temperature may be in the form of a wireless signal received by the communications unit 1150 and generated by a mobile device of the user. During the ignition sequence, the controller may receive temperature data generated by one or more sensors positioned within the cooking chamber and determine from this temperature data the temperature of the cooking chamber. The controller may continuously or intermittently receive this temperature data. In optional block 2015, the controller may also determine, based on at least this temperature data, whether the cooking chamber temperature has reached the set temperature. If the cooking chamber temperature has reached the set temperature, then the stoke fan may be set to a second speed that is lower than the first speed; this second speed may include a zero speed such that the stoke fan is off. Optional block 2015 may be performed after at least block 2005.

Figure 21:
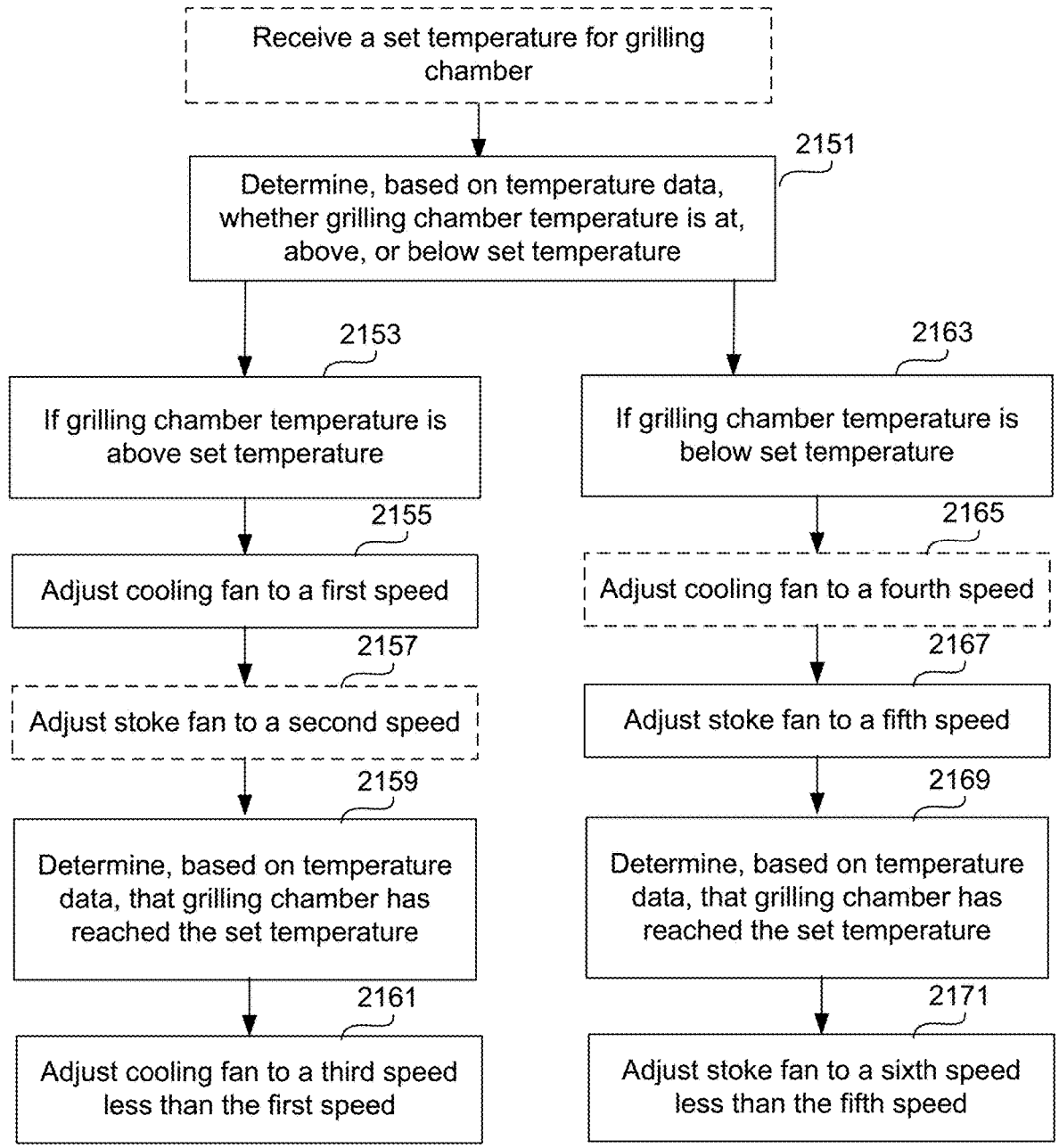
FIG. 21 depicts an example temperature maintenance sequence of operations.

Once at the set temperature, the grill is configured to accurately maintain the set grill temperature using the stoke and cooling fans. FIG. 21 depicts an example temperature maintenance sequence of operations. In some instances, this may be a PID control loop. As shown, this sequence begins with block 2151 in which it is determined, based on temperature data generated by one or more sensors positioned within the cooking chamber, whether the cooking chamber is at, below, or above the set temperature. There may be a margin of error with these temperatures such that the cooking chamber temperature may be "at" the set temperature if it is within a particular threshold, such as ±1° F.,±3° F.,±5° F., or ±10° F., for example. In some embodiments, this sequence may also include the option step of receiving a set temperature before block 2151, as represented by block 2173. This may include receiving a signal or data from one or more sensors in the grill or from a remote source, such as a mobile device over a wireless signal such as a Bluetooth or WiFi signal.

If it is determined that the cooking chamber is above the set temperature, as indicated by block 2153, then block 2153 through 2161 may be performed. In order to cool the grill, the cooling fan may be turned on and set to a particular speed, or if the cooling fan is already on, the cooling fan speed may be increased. This adjustment is represented by block 2155.

In some embodiments, no adjustments may be made to the stoke fan during this cooling sequence of operations. The stoke fan may therefore remain in its current state, such as off or at a particular speed. In some embodiments, optional block 2157 may be performed to adjust the stoke fan which includes turning it off (i.e., a zero speed), or the stoke fan is already on, adjusting it to a lower non-zero speed.

The adjustments to the cooling fan and the stoke fan may be based, at least in part, on the temperature difference between the cooking chamber temperature and the set temperature. In some embodiments, the bigger the temperature difference, the bigger the adjustments. For example, if the temperature difference is large, such as 50° F., then the cooling fan may be adjusted to a high speed and the stoke fan may be turned to a very low speed or off (i.e., a zero speed). In another example, if the temperature difference is small, such as 15° F., then the cooling fan may be adjusted to a low or moderate speed and the stoke fan may be adjusted to a lower speed or off.

After a particular time, or concurrent with the adjustments to the cooling and stoke fan, the determination may be continuously or intermittently made of whether the cooking chamber temperature has reached, i.e., lowered to, the set temperature, as represented by block 2159. Once this has occurred, block 2161 may be performed in which the cooling fan is adjusted to a third speed lower than the first speed. This third speed includes zero such that the cooling fan may be turned off.

A similar sequence of operations may be performed to raise the temperature of the grill as indicated by blocks 2163 through 2171 if it is determined that the cooking chamber is below the set temperature, as indicated by block 2163. In order to heat the grill, the stoke fan may turned on and set to a particular speed, or if the stoke fan is already on, the stoke fan speed may be increased. This adjustment is represented by block 2165. In some embodiments, no adjustments may be made to the cooling fan during this heating sequence of operations. The cooling fan may therefore remain in its current state, such as off or at a particular speed. In some embodiments, optional block 2165 may be performed to adjust the cooling fan which includes turning it off (i.e., a zero speed), or the cooling fan is already on, adjusting it to a lower non-zero speed. Similar to above the adjustments to the cooling fan and the stoke fan to heat the grill may be based, at least in part, on the temperature difference between the cooking chamber temperature and the set temperature. In some embodiments, the bigger the temperature difference, the bigger the adjustments.

After a particular time, or concurrent with the adjustments to the cooling and stoke fan, the determination may be continuously or intermittently made of whether the cooking chamber temperature has reached, i.e., raised to, the set temperature, as represented by block 2169. Once this has occurred, block 2171 may be performed in which the stoke fan is adjusted to a sixth speed lower than the fifth speed. This sixth speed includes zero such that the stoke fan may be turned off.

Figure 22:
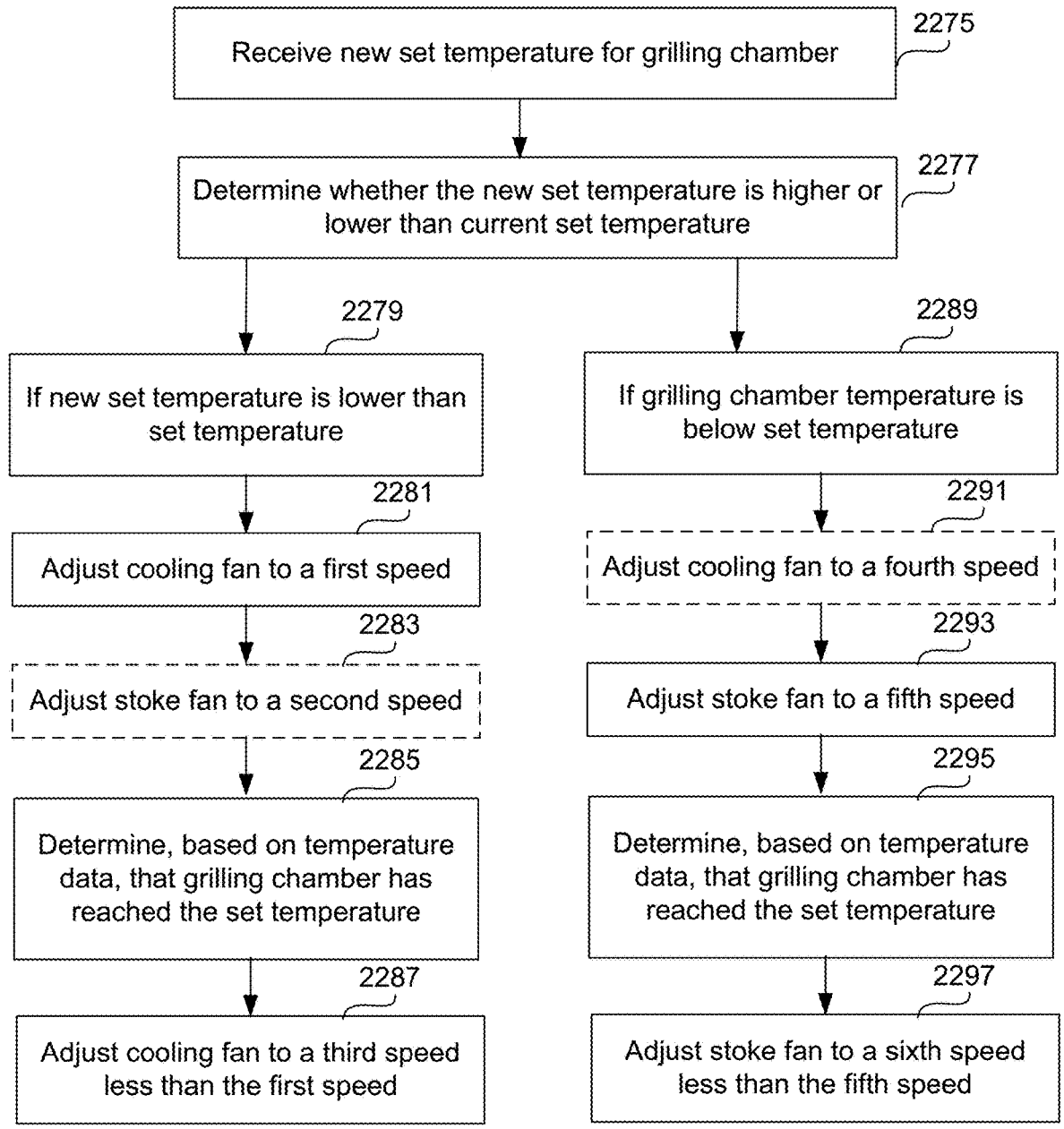
FIG. 22 depicts a temperature ramp sequence for increasing and decreasing the cooking chamber temperature.

In some embodiments, the grill is also configured to ramp the temperature up or down from one set temperature to another set temperature. FIG. 22 depicts a temperature ramp sequence for increasing and decreasing the cooking chamber temperature. The sequence begins with block 2275 in which an input for a new set temperature of the cooking chamber is received. As described above, this may include receiving a signal or data from one or more sensors in the grill, e.g., the rotary encoder 1170C which may be caused by rotating the rotatable dial 1174, or from a remote source, such as a mobile device over a wireless signal such as a Bluetooth or WiFi signal. Once received, a determination may be made in block 2277 as to whether this new set temperature is higher or lower than the current set temperature of the cooking chamber. If lower, then the grill is cooled by performing operations 2279 through 2287 may be performed which may be similar to operations 2153 through 2161; if higher, then the grill is heated by performing operations 2289 through 2297 which may be similar to operations 2163 through 2171.

For cooling the grill, block 2281 adjusts the cooling fan to a first speed which may include turning the cooling fan on and setting it to the first speed. If the cooling fan is already on, then this block 2281 may increase the cooling fan speed. In some embodiments, no adjustments may be made to the stoke fan during this cooling sequence of operations. The stoke fan may therefore remain in its current state, such as off or at a particular speed. In some embodiments, optional block 2283 may be performed to adjust the stoke fan which includes turning it off (i.e., a zero speed), or the stoke fan is already on, adjusting it to a lower non-zero speed. As described above, the adjustments to the cooling fan and the stoke fan may be based, at least in part, on the temperature difference between the cooking chamber temperature and the set temperature. In some embodiments, the bigger the temperature difference, the bigger the adjustments.

After a particular time, or concurrent with the adjustments to the cooling and/or the stoke fan, a determination may be continuously or intermittently made of whether the cooking chamber temperature has reached, i.e., lowered to, the new set temperature, as represented by block 2285. Once this has occurred, block 2287 may be performed in which the cooling fan is adjusted to a third speed lower than the first speed. This third speed includes zero such that the cooling fan may be turned off.

For heating the grill, block 2293 may adjust the stoke fan by turning it on and setting it to a particular speed such as the fifth speed, or if the stoke fan is already on, the stoke fan speed may be increased. In some embodiments, no adjustments may be made to the cooling fan during this heating sequence. The cooling fan may therefore remain in its current state, such as off or at a particular speed. In some embodiments, optional block 2291 may be performed to adjust the cooling fan which includes turning it off (i.e., a zero speed), or the cooling fan is already on, adjusting it to a lower non-zero speed. Similar to above, the adjustments to the cooling fan and the stoke fan to heat the grill may be based, at least in part, on the temperature difference between the cooking chamber temperature and the set temperature. In some embodiments, the bigger the temperature difference, the bigger the adjustments.

After a particular time, or concurrent with the adjustments to the cooling and stoke fan, a determination may be continuously or intermittently made of whether the cooking chamber temperature has reached, i.e., raised to, the new set temperature, as represented by block 2297. Once this has occurred, block 2271 may be performed in which the stoke fan is adjusted to a sixth speed lower than the fifth speed. This sixth speed includes zero such that the stoke fan may be turned off.

In any of the stoke or cooling fan operations described herein, the speed of each fan may be constant, or it may be increased or decreased in a gradual, incremental manner, or in a step manner. For example, during operation 2293, the speed of the stoke fan may be at a constant speed during this sequence of operations, or it may be set to a first speed and then incrementally or steadily decreased to lower speeds. Similarly, during operation 2155, the speed of the cooling fan may be at a constant speed during this sequence of operations, or it may be set to a first speed and then incrementally or steadily decreased to lower speeds.

In some embodiments, a burnout sequence may be performed to consume the remaining portion of the charcoal-containing fuel block. This may include setting the stoke fan to a maximum speed and either turning the cooling fan off or setting it at a zero speed. This may cause the charcoal-containing fuel block to have the highest combustion rate. In some embodiments, a cleaning sequence of operations may be used to repeatedly heat and cool the grill which can clean the grill. This may include first setting the stoke fan to a maximum speed and either turning the cooling fan off or setting it at a zero speed for a first period of time, followed by setting the stoke fan to a zero speed and setting the cooling fan to a maximum speed, and then repeating this cycle one or more times. This may combust and then remove food particles remaining on the grill grates.

In some embodiments, the grill may be configured to raise or lower the cooking chamber temperature based, at least in part, on the internal temperature of a food in the grilling chamber. In these embodiments, the grill may be connected to a food probe temperature sensor that is configured to be inserted into a food, such as meat. The connection between the food probe temperature sensor may be wired or wireless. In some instances, the controller may be configured to issue a notification using the notification mechanism when it is determined, based on data generated by the food probe, that the food has reached a desired temperature. This may include an audible or visual alert, as well as issuing a notification to a remote device, such as the user's mobile device. In some embodiments, the notification mechanism may issue a notification if it is determined in optional block 2011 of FIG. 20 that the fuel block did not successfully ignite.

The controller described above is configured to perform any of the above sequences of operations. This includes the one or more non-transitory memory devices storing instructions for performing any and all of these sequences of operation.

Example Fuel Block

The fuel blocks described herein, referred to herein as charcoal-containing fuel blocks and combustible fuel blocks, enable a combination of convenience, control, cleanliness, flavor, and low cost. This provides a better cooking experience for people. These terms, fuel blocks, charcoal-containing fuel blocks and combustible fuel blocks may be used interchangeably throughout. Additionally, the fuel blocks described herein are configured for use in cooking and in cooking apparatuses, such as grills or barbeques. Charcoal-containing fuel used in non-food or non-cooking applications may have additives or other chemicals that may not be suitable for use in cooking.

The present inventors found that a fuel structure sized for a particular heating or cooking session is the most convenient. While not being limited to any particular weight or size, the charcoal-containing fuel blocks may weigh approximately 250 grams to about 3000 grams, including about 500 grams to 2000 grams. This is in contrast to lump or briquette charcoal that uses many small pieces for a cooking session. Briquettes are generally less than 200 grams each.

As mentioned above, lump or briquette charcoal are typically started in a pile or with a chimney starter, then spread out to create even heating. Incorporation of an ignition material or layer with a flattened fuel blocks as described here greatly simplifies and shortens this process. A round, rectangular or other flattened shape with an ignition layer incorporated into the structure removes the need for a separate starting material or device and removes the need for the messy and potentially dangerous step of spreading the hot coals to create an even heat distribution.

In some instances, using an ignition layer that is separate from the bulk layer may enable the optimization of the materials, processing, and properties of each layer. For example, the ignition layer can be designed to ignite and burn in less than five minutes or even less than one minute, while the bulk layer can be sized and designed to burn over 15 minutes, 1 hour, 12 hours or more. This results in a rapid heat up, followed by a slower burn. Variation of the materials within the bulk can further modify the burn properties of the fuel block. For example, lower density regions, higher density regions, finer particle sizes, larger particle sizes, different types of biomass, different pyrolysis temperatures, etc. can provide different burn rates for different regions or layers within the fuel block.

The rate of combustion may also be affected by the size, number, and distribution of through-holes in the structure. Fuel blocks can be made with no through-holes or hundreds of small through-holes, for instance. In some embodiments, the charcoal-containing fuel blocks may have no holes, or may have between about 1 to 50 holes, for example; the through-holes may result in faster burn rates than fewer or no through-holes. The through-holes can have various shapes, such as round, rectangular, irregular, slits, or any other shape.

In some embodiments, it may be advantageous to have a charcoal-containing fuel block with an ignition layer that starts quickly and has completed the ignition process by less than our equal to about 5 minutes, 2 minutes, or 1 minute, for example.

The charcoal-containing fuel blocks described here may also advantageously have the ability to modify the chemical composition of the binders and ash forming compounds such that the waste can be added to soil to improve or fertilize the soil. For example, including appropriate ratios of sodium, potassium, phosphorous, zinc, calcium, magnesium, etc. in the fuel composition such that the ash from the fuel will improve or fertilize the soil enabling safe, beneficial disposal of waste to the local environment.

Charcoal-containing fuel blocks made into uniform structures may allow for more consistent, reproducible cooking sessions. Charcoal-containing fuel blocks having the same weight, size, hole size and number, etc. can have much more reproducible burn properties than irregular piles of charcoal.

Also provided herein is a combustible fuel block and method of manufacturing the fuel block by forming an ignition layer on one or more surfaces of the fuel block. The ignition layer may be formed on a portion of the fuel block or all of the fuel block and may include regions of various thicknesses. A coating may also be provided on the fuel block to enhance the look, feel, smell, water resistance, water proofing, or other desired property, such as ability to ignite.

Another aspect of the present invention is to provide an ignition layer with a combustible carbonaceous material in an amount of about 65% to 85% by weight and an oxidant and/or accelerant in an amount of about 15% to 35% by weight. The preferred composition of oxidant/accelerant is 20-30%, most preferably about 25%.

Charcoal-containing fuel blocks provided herein also may have an ignition layer that, once ignited, has a combustion front that moves across the surface of the fuel block at a rate of between about 0.05 cm/sec to 5 cm/sec, including 0.2 cm/sec to 2 cm/sec, for example.

The charcoal-containing fuel blocks provided herein also may have an ignition layer that ignites not only the carbonaceous fuel of the layer but also the smoke generated during the ignition of the layer.

In some embodiments, charcoal-containing fuel block structure may have a combustible carbonaceous mass. Binders, plasticizers, oils, fats, waxes, ash formers, oxidant, accelerants, colorants, catalysts, and flavor enhancing substances may be also be included in the combustible carbonaceous mass. In some instances, coatings to decrease dust, improve water resistance, and enhance the appearance of the fuel block may also be added to the surface of the fuel block.

Examples of combustible carbonaceous materials that may be used in the charcoal-containing fuel blocks include, but are not limited to, biomass materials including wood, wood waste, agricultural waste, municipal solid waste, manufacturing waste, and grasses. Switchgrass, miscanthus, hemp, sorghum, sugarcane, and bamboo may also be sources of carbonaceous material. Agricultural waste such as nut shells and pits may also be an abundant and are low-cost source of carbonaceous material. In some instances, the biomass can by heat-treated in the temperature range of 100° ° C. to 1000° C., for example, prior to incorporation into the fuel block including by means of torrefaction (roasting) and pyrolysis. Charcoal may be the combustible carbonaceous material and is well known in the art. As provided above, these terms, fuel blocks, charcoal-containing fuel blocks and combustible fuel blocks may be used interchangeably throughout; the term charcoal-containing fuel block may also refer to any of the fuel blocks described herein and the "charcoal-containing" may include any combustible carbonaceous material provided herein.

In some embodiments, binders may be included to increase the strength of the charcoal-containing fuel blocks and, when included, may be added in the range of 1-15% by weight of the carbonaceous material, including 3-8%, for example. Materials for binders may include, but are not limited to: sugars and waste products from sugar production (molasses); polymers from biomass such as polysaccharides, e.g., starches (wheat, potatoes, maize, cassava, sago), lignocellulosic products (wood, straws, etc.) and others (pectins, chitosan/chitin, agar, xanthan gum, guar gum, other gums); protein and lipids, e.g., animals (casein, whey, collagen/gelatin), and plants (zein, soya and gluten); polymers obtained by microbial production, e.g., polyhydroxyalkanoates (PHA) such as poly(hydroxybutyrate) (PHB) and poly(hydroxybutyrate co-hydroxyvalerate (PHBv); polymers chemically synthesized using monomers obtained from agro-resources, e.g., poly(lactic acid) (PLA); polymers obtained from fossil resources or by chemical synthesis from fossil resources.

In some embodiments, plasticizers for binders and coatings may also be used in the charcoal-containing fuel blocks and may include water, polyols, mono-, di- and oligosaccharides, and many others know in the art. Some such plasticizers may include, for example, sugars, including fructose and glucose, and polyols, including sorbitol and mannitol, and citric acid. For example, adding 10-30% by weight of fructose or sorbitol to a binder can result in a more pliable compound.

In some embodiments, oils, fats, and waxes may be added to the charcoal-containing fuel blocks, including natural oils, fats, and waxes. Natural sources of oils, fats, and waxes may include, but are not limited to: corn, soybean, sunflower, canola, oilseed rape, palm, lanolin, beeswax, candelilla, carnauba, rice bran, and jojoba. For example, adding 10% by weight of corn oil to the ignition layer or protective coating can improve water resistance and enhance combustion.

In some embodiments, ash formers may be added to the include oxides, carbonates, silicates, hydroxides, nitrates, and other salts. In some such embodiments, clays and carbonates are used. For example, 2-10 wt % of clay or calcium carbonate relative to the carbonaceous material can be added to improve the strength of the resulting ash after combustion of the fuel block. This may enhance the structural integrity of the resulting ash block and make clean-up and disposal of the ash block cleaner and easier than the ash resulting from lump charcoal or briquettes. Unexpectedly, the fuel oxidant, such as sodium nitrate or potassium nitrate, creates a strong ash network on the outer surface of the fuel block that makes clean up and disposal of the resulting ash block easy and convenient. A fuel block with ash formers on the outer surface is one aspect of this invention.

Accordingly, in some embodiments, the fuel block may be coated with one or more materials that act as an ash binder or ash former, such as sodium nitrate or potassium nitrate. This coating may be applied by, for instance, spraying, painting, or submerging the fuel block into a solution containing the ash binder, such as a solution containing sodium nitrate or potassium nitrate. This coating, along with other ash formers, may keep the burnt, or otherwise powdery, ash of the fuel block intact, eliminate ash on food during grilling/cooking, and/or provide a clearly visible yellow flame to increase safety. When the fuel block is fully burnt, the ash binders may also prevent ash from accumulating in the stoke box and around the grill cavity, and when disposing of the used fuel block, the ash binding will prevent the fuel block from disintegrating and will confine the ash in the disposal receptacle to further improves handling of a fully or partially burnt fuel block. In some embodiments, these ash binders keep the fuel block intact and assist with containing the drippings that may fall onto the fuel block and also retain the fuel block's heat in a central location (as opposed to split and spread throughout the combustion chamber) so that the heat spreaders can continue to evenly distribute the heat throughout the grill.

In some embodiments, the binders may be incorporated into the charcoal layer or charcoal containing material.

In some instances, oxidants may be combined with a carbonaceous material in the fuel block, including in the ignition layer. Oxidants may include, but are not limited to: bromine, bromates, chlorinated isocyanurates chlorates, chromates, dichromates, hydroperoxides, hypochlorites, inorganic peroxides, ketone peroxides, nitrates, nitric acid, nitrites, perborates, perchlorates, perchloric acid, periodates, permanganates, peroxides, peroxyacids, persulphates, and mixtures of these. In some such embodiments, alkali and alkaline nitrates, including sodium nitrate and potassium nitrate may be used.

In some embodiments, the combustible carbonaceous mass, such as the charcoal layer, may include one or more oxidants, including those listed herein as well as one or more other oxidants that may act as combustion accelerants, such as volatile organic constituents, for example ethyl group containing species alcohol that may include, for example, ethanol; this may also include various alcohols, such as denatured alcohol. This oxidant/accelerant may be mixed with the charcoal layer or may be a coating applied to outside of the fuel block. In some instances, it may be impregnated into the combustible carbonaceous mass. This impregnation may occur, at least in part, by submerging the combustible carbonaceous mass, such as the charcoal layer, into a solution containing the oxidant/accelerant and allowing the oxidant/accelerant to be absorbed by the combustible carbonaceous mass, such as the charcoal layer. After this submersion, the combustible carbonaceous mass, such as the charcoal layer, may be cured in order to evaporate excess and leave the oxidant/accelerant in the combustible carbonaceous mass, such as the charcoal layer.

In some embodiments, colorants may be added to the bulk powder or the ignition layer. For example, red iron oxide can be added to create a pleasing color.

In some embodiments, combustion catalysts may be added to enhance combustion, improve production of specific flavor enhancing compounds, and/or to reduce production of particular compounds. Examples of catalysts include oxides, carbonates, and salts, including, for example, compounds having transition metals, alkali elements, and alkaline elements. The addition of iron oxide has been found to be beneficial to the fuel blocks.

In some embodiments, coatings to decrease dust and improve water resistance may be added. Some examples include starches, such as corn starch and tapioca starches.

In some embodiments, flavor enhancing materials may be added to the fuel block as discreet particles, chips, or liquids. This may include, for instance, biomass chips and fines including but not limited to wood sawdust, wood chips, straws, shells, and pits.

In some embodiments, unexpectedly some of the ignition layers described herein are capable of creating a flaming ignition front wherein the smoke from the ignition reaction is burned in flames. This greatly reduces the smoke given off during ignition of the fuel block and decreases the time it takes to heat a material above the fuel block, for example, the grate in a grill, pizza stone, or other surface used in cooking. This flaming ignition front may be achieved with an ignition layer comprising a combustible carbonaceous material in an amount of about 50% to 85% by weight and an oxidant in an amount of about 15% to 35% by weight. This may include a composition of oxidant of 20-30%, including about 25%. While not being limited to any particular carbonaceous material, some carbonaceous materials include charcoal powder and biomass fines such as sawdust. This may further include, for example, mixtures having 0-85 wt % sawdust and 20-85 wt % charcoal. For example, an ignition layer composed of 34 wt % charcoal powder, 34 wt % hardwood sawdust, 25 wt % sodium nitrate, and 7 wt % xanthan gum binder, pressed at 400 psi, dried at 130° ° C. for 4 hours was ignited with a silicon nitride hot surface igniter and resulted in flaming ignition with little or no smoke.

Manufacturing methods for forming the fuel block may include but are not limited to pressing, rolling, casting, and extruding. Manufacturing methods for the ignition layer and coatings include but are not limited to pressing, rolling, casting, extruding, painting, dipping, spraying, tape transfer, laminating, and the like.

One example fuel block has the following composition. It is may be considered a co-pressed laminated structure with ignition pad and ignition layers on top and bottom of fuel block. The bulk layer (wet powder, in wt %) includes 62.50% mesquite charcoal powder (carbonaceous material), 6.25% calcium carbonate powder (ash former), 6.25% Xanthan Gum (binder), 25.00% water. The ignition layer (wet powder, in wt %) includes 51.14% mesquite charcoal powder (carbonaceous material), 18.75% sodium nitrate (oxidant), 5.11% Xanthan Gum powder (binder), and 25.00% water. For manufacturing, about 160 g of the wet ignition layer powder was spread evenly across a 20 cm×25 cm rectangular mold. 1600 g of the wet Bulk Layer powder was evenly spread on top of this. 25 g of the wet Ignition Layer powder was inserted as a circular Ignition Pad centered on the front face of the rectangular mold, ensuring that contact was made with the Ignition Layer on the bottom of the mold. 160 g of the wet Ignition Layer was spread evenly onto the top surface of the Bulk Layer, ensuring that contact was made with the Ignition Pad. A rectangular ram was fitted into the mold and pressed at 8000 kg. The pressure was released and the laminated fuel block removed and dried in a convection oven at 130 C for 12 hours to remove the water. Once dry 20 holes 8 mm in diameter were drilled. The fuel block was ready for use.

In some embodiments, the fuel block may include an internal ignition section that is configured to assist with ignition of the fuel block. This internal ignition section may have a higher combustion rate than the charcoal layer and may be positioned inside and within the body of the fuel block. The internal ignition section, which may be referred to herein as an ignition plug, may be a discrete section or region that has a particular shape and that extends into the charcoal layer (as opposed, for example, to simply a region of the fuel block that has been impregnated with some sort of accelerant or ignition material).

FIG. 23A depicts an off-angle view of an example fuel block, FIG. 23B depicts a cross-sectional off-angle view of the example fuel block of FIG. 23A, and FIG. 23C depicts a cross-sectional side view of the example fuel block of FIG. 23A. This fuel block 2326 includes an internal ignition section 23202 that is identified with shading and that is illustrated as having a substantially circular cross-sectional shape (substantially here may be, for example, within +/−10% of circular given manufacturing and tolerances and imperfections); this cross-sectional shape is taken along the length of the internal ignition section 23202, shown as D1 in FIGS. 23B and 23C.

As seen in the cross-sectional views of FIGS. 23B and 23C that are taken along section line A-A in FIG. 23A, this internal ignition section 23202 extends into the fuel block 2326 for a first distance D1 resulting in the internal ignition section 23202 having a length D1. In some embodiments, the first distance D1 may be less than the width W1 of the fuel block, such as less than half of W1 or less than one quarter of W1, for instance. In some embodiments, this may be advantageous for providing faster ignition of some of the fuel block while preserving the charcoal layer fuel for a longer combustion time. In some other embodiments, it may be advantageous to have the first distance D1 be the full width W1, or substantially the full width W1 (e.g., within 10% of W1) in order to provide higher-combustion material throughout the fuel block in order to provide faster ignition throughout the full width of the fuel block for faster overall ignition and combustion of the fuel block. In some embodiments, the height H1 of the internal ignition section 23202 may be less than the overall height H1 of the fuel block 2326. This may result in the charcoal layer surrounding some or all of the internal ignition section 23202.

In some embodiments, a portion of the internal ignition section 23202 may be external to the fuel block and form part of the external surface of the fuel block. This portion may be configured to be ignited by the grill's igniter. This ignition may be through direct contact with, and/or through close positioning near, the grill's igniter. In some such instances, this portion may serve as, or be, the ignition pad of the fuel block as described above, such as item 1204 in FIG. 10B; identifier 2304 is used in FIG. 23A to indicate that in some instances, this external portion may be the ignition pad. In some embodiments, this portion, e.g., the ignition pad, may have a circular, or substantially circular, cross-sectional shape (taken along the length D1 of the internal ignition section 23202). In some embodiments, this external surface of the internal ignition section 23202 may be flush with the side 23204 of the fuel block 2326 on which it is positioned while in some other embodiments it may extend past or be recessed from this side. These different configurations may provide various ignition benefits such as enabling better contact with the igniter of the grill, or causing combustion of the fuel block 2326.

Figure 23D:
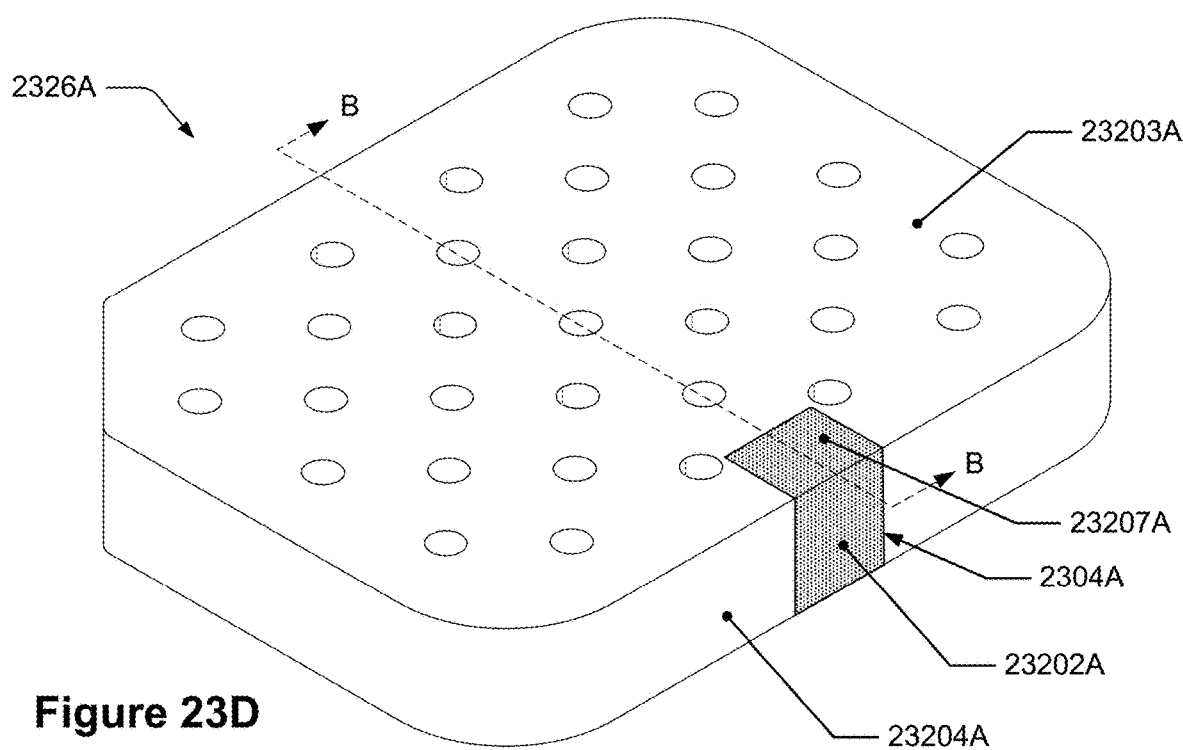
FIG. 23D depicts an off-angle view of another example fuel block.

As shown, in FIG. 23B, this internal ignition section 23202 has a cylindrical, or substantially cylindrical, shape. In some embodiments, the internal ignition section may have other geometric shapes, such as a cube, cuboid, cylinder, a right rectangular prism, a rectangular cuboid (e.g., in FIGS. 23D-23F), or a rectangular parallelepiped, for instance.

In some embodiments, such as those depicted in FIGS. 23A-23C, the internal geometry of the internal ignition section 23202 may be the same as the external portion. For instance, as shown in these figures, the cross-sectional area of the internal ignition section 23202 (taken along the length D1) that extends into the fuel block, is the same cross-sectional area as the ignition pad 2304. In some other embodiments, the internal geometry of the internal ignition section 23202 may be different than the external portion. For example, the cross-sectional area of the ignition pad 2304 (taken along the length D1) may have a circular shape that is larger than the cross-sectional circular shape of the internal ignition section 23202 that extends into the fuel block. This may result in the internal ignition section 23202 having a side "T" shape such that the cross-sectional side view of it in FIGS. 23B and 23C would be a sideways "T" shape. In another example, the cross-sectional area of the ignition pad 2304 may have a different shape, e.g., a cross-sectional circular shape, than the cross-sectional circular shape of the internal ignition section 23202 that extends into the fuel block, e.g., a cross-sectional rectangular shape.

In some instances, the height H1 of the internal ignition section 23202 may be constant, or substantially constant (e.g., within +/−10%), along its length D1 while in other instances it may vary in height. A variable height may be able to speed up or slow down the speed that the internal ignition section 23202 ignites the rest of the fuel block. For example, a tapered or stepped height decreasing in height along the length, with the largest height H1 at the surface 23204, may be advantageous to initially speed up the ignition of the fuel block and then slow the ignition rate to preserve some of the fuel block.

Figure 23E:
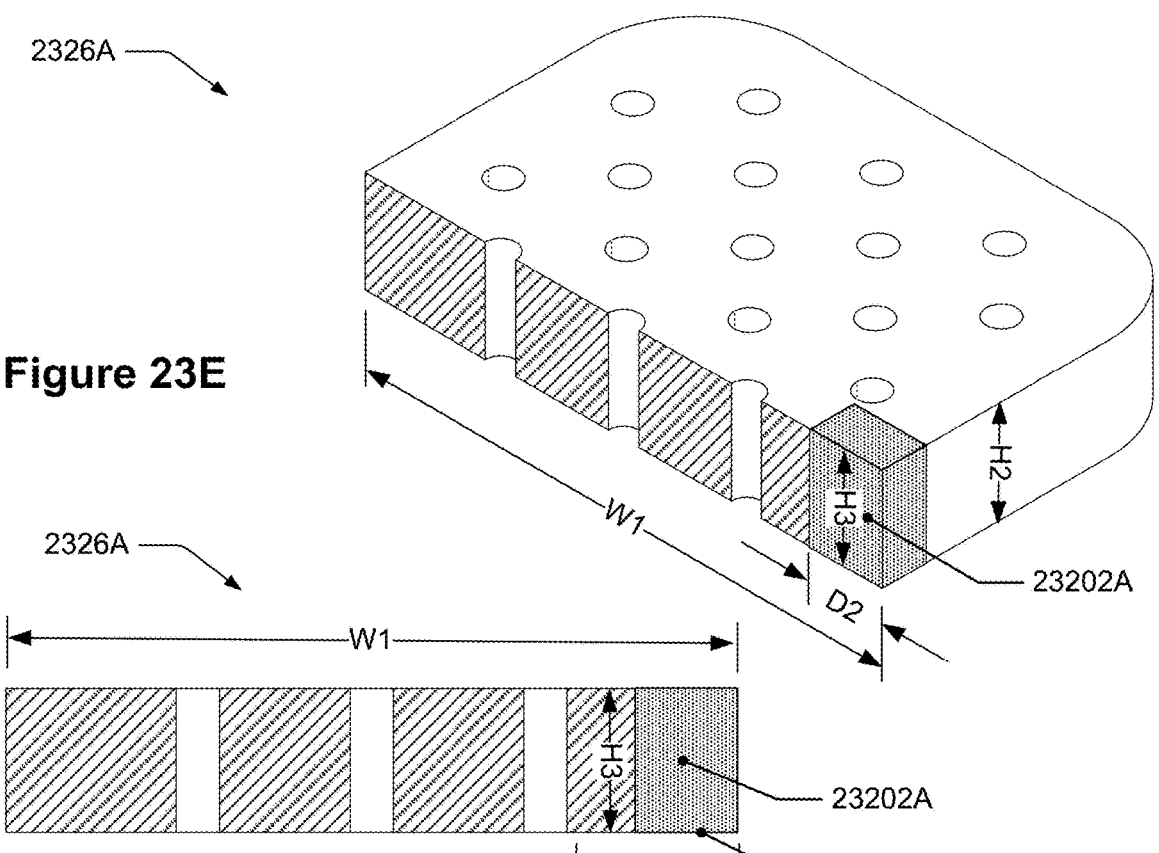
FIG. 23E depicts a cross-sectional off-angle view of the fuel block of FIG. 23D.
Figure 23F:
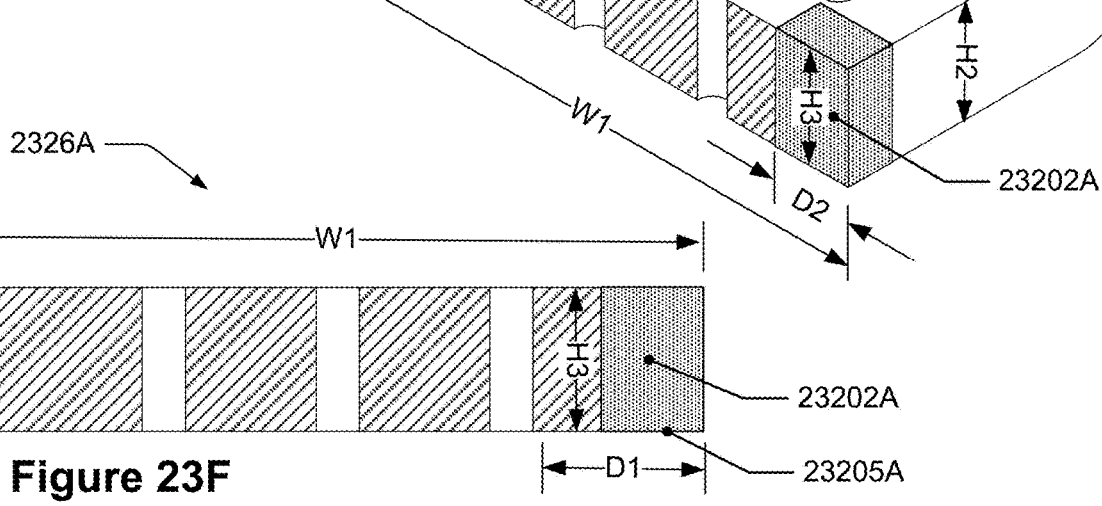
FIG. 23F depicts a cross-sectional side view of the fuel block of FIG. 23D.

In some embodiments, the ignition plug, or internal ignition section, may extend to and form parts of two or more surfaces of the fuel block, such as the top, bottom, and end of the fuel block. For instance, the internal ignition section may extend into the body of the fuel block and also form a part of the surface of the fuel block's top, bottom, and one side as illustrated in FIGS. 23D-23F. FIG. 23D depicts an off-angle view of another example fuel block, FIG. 23E depicts a cross-sectional off-angle view of the fuel block of FIG. 23D, and FIG. 23F depicts a cross-sectional side view of the fuel block of FIG. 23D. Here, the fuel block's 2326A internal ignition section 23202A extends to and forms a part of the side 23204A like in FIG. 23A, but also extends to the top surface 23203A of the fuel block 2326A and the bottom surface 23205A as seen in FIGS. 23E and 23F. In FIGS. 23A-23C, the internal ignition section 23202 does not fully extend to the top or bottom surfaces of the fuel block and has the charcoal layer surrounding the internal ignition section 23202 (identifier 23207 in FIG. 23C).

Referring back to FIGS. 23D-23F, the internal ignition section 23202A extends into the fuel block 2326A by a distance D2 (or length D2), which may be the same or different from the distance D1 in FIGS. 23A-23C. The internal ignition section 23202A also has a height H3 that is the same, or substantially the same (e.g., within +/−15%), as the height H2 of the fuel block 2326A. In some instances, the top 23207A of the internal ignition section 23202A may be co-planar, substantially coplanar (e.g., within +/−15%), parallel, or substantially parallel (e.g., within +/−15%) of the top surface 23203A of the fuel block 2326A. Similarly, in some instances, the bottom (not labeled) of the internal ignition section 23202A may be co-planar, substantially coplanar (e.g., within +/−15%), parallel, or substantially parallel (e.g., within +/−15%) of the bottom surface 23205A of the fuel block 2326A.

In some other embodiments, the top, bottom, and/or front of the internal ignition section may not be coplanar with the rest of the fuel block. These portions of the internal ignition section may extend past the other surfaces of the fuel block, such as the top of the internal ignition section extending past the fuel block top surface 23203A in FIG. 23D, for instance.

Additionally, in some instances, the external surface of the internal ignition section 23202A on the side 23204A of the fuel block 2326A in FIGS. 23D-23F may also serve as the ignition pad described herein. This ignition pad is labeled as 23204A in FIGS. 23D-23F.

In some embodiments, the cross-sectional shape of the internal ignition section 23202A (taken along its length D2) may vary. For example, as seen in FIGS. 23D-23F, the cross-sectional shape may be rectangular or square. In some other examples, it may be other shapes, such as a pentagon, hexagon, circular, trapezoidal, or a shape with linear and non-linear sides, such as obround, or a linear top and bottom opposite each other and curved sides.

Figure 23G:
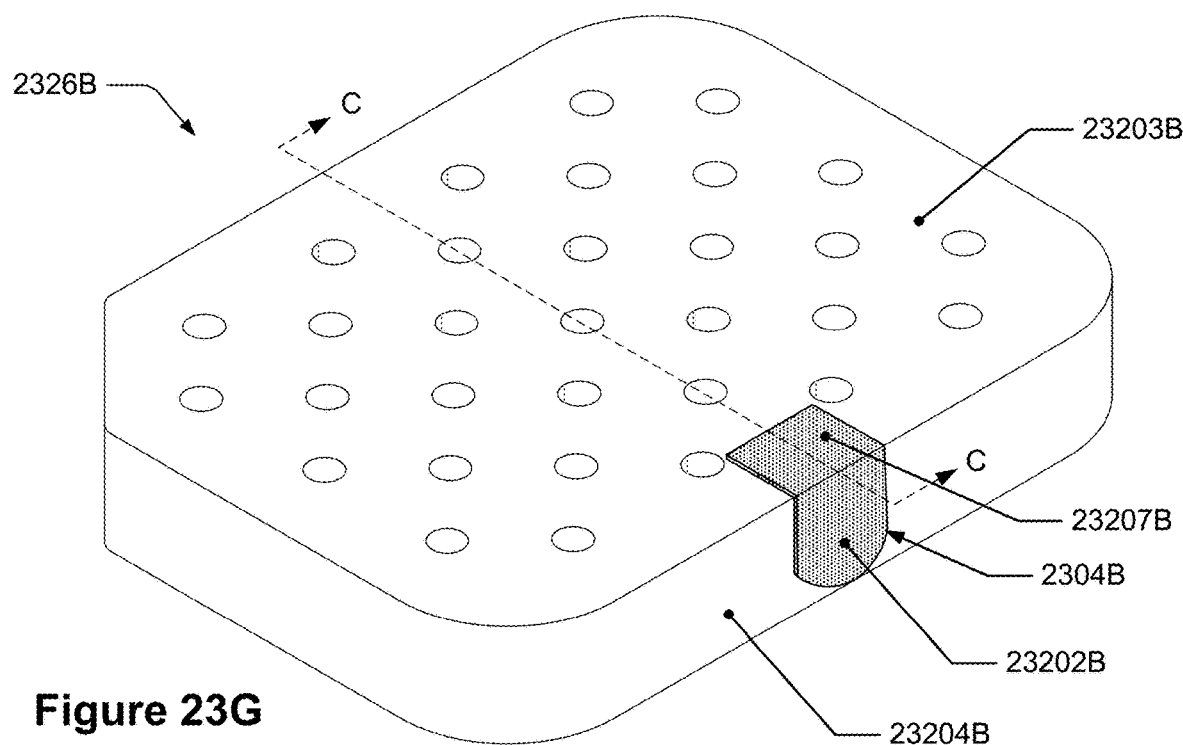
FIG. 23G depicts an off-angle view of another example fuel block.
Figure 23H:
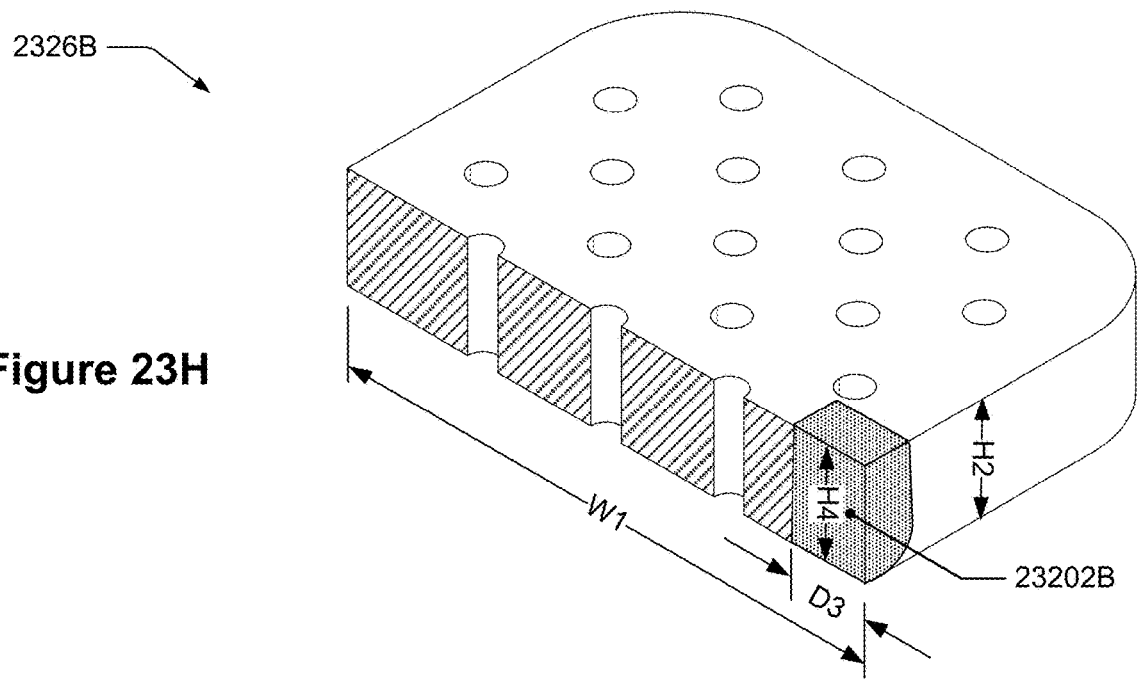
FIG. 23H depicts a cross-sectional off-angle view of the fuel block of FIG. 23G.

FIG. 23G depicts an off-angle view of another example fuel block and FIG. 23H depicts a cross-sectional off-angle view of the fuel block of FIG. 23G. Here, the internal ignition section 23202B of the fuel block 2326B has a shape with linear and curved features, including a curved bottom with linear sides and top. The cross-sectional shape of this internal ignition section 23202B along its length D3 may be considered a "D" shape on its side (e.g., a rectangle surmounted by a semi-circle). The front surface 2304B of the internal ignition section 23202B may be considered the ignition pad and in some instances may be coplanar with the side 23204B of the fuel block 2326B while in some other instances it may not be coplanar with the side 23204B of the fuel block 2326B, such as extending past the side 23204B or recessed from the side 23204B. Similarly, the top 23207B of the internal ignition section 23202B may be coplanar with the top 23203B of the fuel block 2326B while in some other instances it may not be coplanar with the top 23203B of the fuel block 2326B, such as extending past the top 23203B or recessed from the top 23203B. FIGS. 23G and 23H illustrate this internal ignition section 23202B as having a top 23207B and front 2304B that are not coplanar with, and extend past, the top 23203B and side 23204B, respectively, of the fuel block 2326B.

In some other embodiments, the top, bottom, and/or front of the internal ignition section may not be coplanar with the rest of the fuel block. These portions of the internal ignition section may extend past the other surfaces of the fuel block, such as the top of the internal ignition section extending past the fuel block top surface 23203A in FIG. 23D, for instance.

In some embodiments, the fuel block may not have a separate ignition layer as discussed above; in some alternate embodiments, the fuel block may have the internal ignition section and one or more ignition layers.

As stated above, the internal ignition section is configured to burn at a faster combustion rate than the charcoal layer. The internal ignition section may be made of one or more materials that are more combustible than the charcoal layer and that can be configured to ignite prior to the charcoal layer when the igniter in the charcoal grill system is activated. In some embodiments, the internal ignition section may be made with the same materials and in the same manners as the ignition layer described above. This may include, for example, the inclusion of carbonaceous material, such as charcoal powder and biomass fines such as sawdust, and one or more oxidants, such as bromine, bromates, chlorinated isocyanurates chlorates, chromates, dichromates, hydroperoxides, hypochlorites, inorganic peroxides, ketone peroxides, nitrates, nitric acid, nitrites, perborates, perchlorates, perchloric acid, periodates, permanganates, peroxides, peroxyacids, persulphates, alkali and alkaline nitrates, including sodium nitrate and potassium nitrate, and any combination or and mixtures of these items. In some embodiments, this may include a combination of charcoal powder and potassium nitrate.

In some embodiments, the internal ignition section may also include other materials, such as one or more of the binder materials provided above, such as sugars including, for instance, pectins, chitosan/chitin, agar, xanthan gum, guar gum, other gums. In some embodiments, plasticizers for binders and coatings may also be used in the internal ignition section and may include water, polyols, mono-, di- and oligosaccharides, and others, for example. In some embodiments, various alcohols may be added, such as denatured alcohol. In some embodiments, the internal ignition section may include charcoal powder, potassium nitrate ($KNO_3$), guar gum, and water.

In some embodiments, the internal ignition section may have, once ignited, a combustion front that moves across the surface of the internal ignition section at a rate of between about 0.05 cm/sec to 5 cm/sec, including 0.2 cm/sec to 2 cm/sec, for example.

The inclusion and configuration of the internal ignition section provides a reliable ignition mechanism of the fuel block. By extending into and through at least a part of the charcoal-containing layer of the fuel block, the internal ignition section is able to ignite some or all of the charcoal surrounding the internal ignition section which causes ignition of more charcoal area at a fast rate. For example, the internal ignition section 23202 in FIGS. 23A-23C may cause the charcoal surrounding it to ignite, which may ignite some or all of the charcoal in the shape of the charcoal surrounding the internal ignition section shape, which here is a cylinder, which may be 360°, or substantially 360°, around the internal ignition section for the first distance D1. This combustion may then spread evenly and faster outwards from this internal ignition section 23202.

In some embodiments, the internal ignition section may be configured in any of the manners, or have any of the features, described above with respect to the ignition layer. For example, the internal ignition section may, like the ignition layer, have a combustible carbonaceous material in an amount of about 65% to 85% by weight and an oxidant in an amount of about 15% to 35% by weight, which may include a composition of oxidant of about 20-30%, or about 25%. Additionally, for instance, in some embodiments, combustion catalysts may be added to the internal ignition section, like with the ignition layer, to improve production of specific flavor enhancing compounds, and/or to reduce production of particular compounds. Examples of catalysts include oxides, carbonates, and salts, including, for example, compounds having transition metals, alkali elements, and alkaline elements.

An ignition sequence of a fuel block having an internal ignition section may take various forms. In some instances, the igniter is turned on which ignites the internal ignition section of the fuel block. The material that is ignited in the internal ignition section may be, for instance, the carbonaceous material and the one or more oxidants. The internal ignition section may then ignite other aspects of the fuel block, such as the charcoal layer, or in some instances, oxidants or materials within the fuel block, like ethanol which may also ignite the charcoal layer or combustible carbonaceous material in the fuel block.

CONCLUSION

It is to be understood that the phrases "for each <item> of the one or more <items>," "each <item> of the one or more <items>," or the like, if used herein, are inclusive of both a single-item group and multiple-item groups, i.e., the phrase "for . . . each" is used in the sense that it is used in programming languages to refer to each item of whatever population of items is referenced. For example, if the population of items referenced is a single item, then "each" would refer to only that single item (despite the fact that dictionary definitions of "each" frequently define the term to refer to "every one of two or more things") and would not imply that there must be at least two of those items.

The use, if any, of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

Terms such as "about," "approximately." "substantially." "nominal," or the like, when used in reference to quantities or similar quantifiable properties, are to be understood to be inclusive of values within ±10% of the values or relationship specified (as well as inclusive of the actual values or relationship specified), unless otherwise indicated.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

It is to be further understood that the above disclosure, while focusing on a particular example implementation or implementations, is not limited to only the discussed example, but may also apply to similar variants and mechanisms as well, and such similar variants and mechanisms are also considered to be within the scope of this disclosure. For the avoidance of any doubt, it is also to be understood that the above disclosure is at least directed to the following numbered implementations, as well as to other implementations that are evident from the above disclosure.

Implementation 1: A grill including a housing at least partially defining a cooking chamber; a combustion chamber having a support surface configured to support a charcoal-containing fuel block, in which the combustion chamber is fluidically and thermally connected to the cooking chamber; an igniter configured to heat a charcoal-containing fuel block positioned on the support surface; a stoke chamber positioned under and fluidically connected to the combustion chamber; stoke ducting having a first end fluidically connected to the stoke chamber and a second end fluidically connected to a stoke fan; the stoke fan configured to flow air from outside the housing and into the stoke chamber through the stoke ducting; cooling ducting fluidically connecting the cooking chamber to a cooling fan; and the cooling fan configured to flow air from outside the housing and into the cooking chamber through the cooling ducting.

Implementation 2: The grill of implementation 1, further including cooling ports that fluidically connect the cooling ducting to the cooking chamber.

Implementation 3: The grill of implementation 2, in which the housing further includes a lid that includes vents, and the cooling ports and vents are positioned on opposite side of the housing from each other.

Implementation 4: The grill of implementation 2, further including cooking grates positioned within the cooking chamber, in which the cooling ports are positioned such that the cooling ports are vertically interposed between the cooking grates and the combustion chamber when viewed along a first horizontal axis.

Implementation 5: The grill of implementation 1, further including a heat spreader, in which the heat spreader includes a first angled surface offset from a second angled surface, both angled surfaces having one or more through-holes in a center region of each angled surface, is positioned within the housing, and between the cooking grates and the combustion chamber, and is configured to distribute heat generated by a fuel block in the combustion chamber.

Implementation 6: The grill of implementation 5, in which the heat spreader further includes first supports that span between the first and second angled surfaces, and second supports that extend from the second surface and are configured to interface with aligning features of the grill.

Implementation 7: The grill of implementation 6, further including a drip tray that includes the aligning surfaces.

Implementation 8: The grill of implementation 1, in which the stoke chamber further includes a top that includes a first plurality of through-holes that fluidically connect the stoke chamber to the combustion chamber.

Implementation 9: The grill of implementation 1, in which the support surface further includes a second plurality of through-holes that fluidically connect, at least in part, the stoke chamber to a charcoal-containing fuel block when the charcoal-containing fuel block is positioned on the support surface.

Implementation 10: The grill of implementation 9, in which the support surface is nonplanar.

Implementation 11: The grill of implementation 9, in which the combustion chamber further includes a plurality of support surfaces and a plurality of grooves located horizontally between, and vertically offset from, the plurality of support surfaces, and the plurality of support surfaces are configured to contact and support the charcoal-containing fuel block positioned within the combustion chamber.

Implementation 12: The grill of implementation 11, in which the plurality of support surfaces each have an arcuate cross-section along an axis.

Implementation 13: The grill of implementation 1, in which the support surface is a part of a fuel pan that is configured to be removable from the housing, and the charcoal-containing fuel block is configured to be inserted into the combustion chamber by inserting the charcoal-containing fuel block into the fuel pan.

Implementation 14: The grill of implementation 13, in which the fuel pan further includes aligning surfaces configured to align a charcoal-containing fuel block inserted into the combustion chamber.

Implementation 15: The grill of implementation 14, in which the aligning surfaces are further configured to create a gap between side walls of the fuel pan and sides of the charcoal-containing fuel block inserted into the fuel pan.

Implementation 16: The grill of implementation 13, in which the fuel pan includes cast iron and a porcelain enameled coating.

Implementation 17: The grill of implementation 13, in which the fuel pan further includes an aligning feature.

Implementation 18: The grill of implementation 13, in which the combustion chamber is configured with a thermal break between side walls of the fuel pan and side walls of the combustion chamber.

Implementation 19: The grill of implementation 1, in which the igniter is positioned inside the housing and configured to extend into the combustion chamber.

Implementation 20: The grill of implementation 1, in which the igniter is positioned inside the housing and configured to contact a charcoal-containing fuel block when the charcoal-containing fuel block is positioned within the combustion chamber on the support surface.

Implementation 21: The grill of implementation 1, in which the igniter is configured to translate along a horizontal axis and is spring-biased to move towards the combustion chamber.

Implementation 22: The grill of implementation 1, in which the igniter is configured to ignite a charcoal-containing fuel block when the charcoal-containing fuel block is positioned within the combustion chamber on the support surface.

Implementation 23: The grill of implementation 1, in which the igniter includes a heating element.

Implementation 24: The grill of implementation 1, in which the igniter includes silicon nitride.

Implementation 25: The grill of implementation 1, in which the igniter is configured to generate heat greater than 400° C.

Implementation 26: The grill of implementation 1, in which the housing further includes a drawer that is movable into and out of a kettle of the housing between a closed position and an open position, and the stoke chamber and the combustion chamber are a part of the drawer.

Implementation 27: The grill of implementation 26, in which the combustion chamber further includes a first side wall and a second side wall, the housing further includes a first seal surface and a second seal surface, and when the drawer is in the closed position, the first side wall is configured to be proximate to the first seal surface and the second side wall is configured to engage with and contact the second seal surface.

Implementation 28: The grill of implementation 1, further including a removable section within the housing, in which the removable section is configured to be removable from the housing without requiring removal of the combustion chamber, igniter, stoke chamber, stoke ducting, or cooling ducting, the stoke fan and the cooling fan are positioned within the removable section, and the removable section is removable from the exterior of the housing.

Implementation 29: The grill of implementation 1, further including a control dial configured to generate one or more signals, in which the control dial includes a rotatable ring and a rotatable dial.

Implementation 30: The grill of implementation 29, further including a controller having one or more processors and one or more non-transitory memory devices, and configured to receive signals from the control dial.

Implementation 31: The grill of implementation 29, in which the control dial further includes a magnet in the rotatable ring, two hall effect sensors, and a rotary encoder configured to detect rotation of the rotatable dial.

Implementation 32: The grill of implementation 29, in which the control dial further includes a plurality of LEDs configured to illuminate in a plurality of colors.

Implementation 33: The grill of implementation 1, further including a temperature sensor positioned in the cooking chamber, and a controller having one or more processors and one or more non-transitory memory devices, the one or more non-transitory memory devices storing instructions to cause, in response to receiving an ignite command, the igniter to generate heat and ignite a charcoal-containing fuel block positioned in the combustion chamber, and cause, in response to receiving an ignite command, the igniter to generate heat and ignite a charcoal-containing fuel block positioned in the combustion chamber, the stoke fan to run at a first speed.

Implementation 34: The grill of implementation 33, in which the one or more non-transitory memory devices further stores instructions to receive a set temperature for the cooking chamber, determine whether the temperature in the cooking chamber is within a first threshold from the set temperature, and adjust, in response to determining that the temperature in the cooking chamber is within a threshold of the set temperature, the stoke fan to a second speed different than the first speed.

Implementation 35: The grill of implementation 33, in which the one or more non-transitory memory devices further stores instructions to receive a set temperature for the cooking chamber, determine whether the temperature in the cooking chamber is within a first threshold from the set temperature, and cause, in response to determining that the temperature in the cooking chamber is within a threshold of the set temperature, the stoke fan to remain at the first speed.

Implementation 36: The grill of implementation 33, in which the one or more non-transitory memory devices further stores instructions to receive a set temperature for the cooking chamber, determine whether the temperature in the cooking chamber is within a first threshold from the set temperature, and adjust, in response to determining that the temperature in the cooking chamber is above the first threshold, the cooling fan to a third speed.

Implementation 37: The grill of implementation 36, in which the one or more non-transitory memory devices further stores instructions to cause, in response to determining that the temperature in the cooking chamber is above the first threshold, the stoke fan to be at a zero speed.

Implementation 38: The grill of implementation 36, in which the one or more non-transitory memory devices further stores instructions to cause, in response to determining that the temperature in the cooking chamber is above the first threshold, the stoke fan to be at an idle speed or a fourth speed.

Implementation 39: The grill of implementation 33, in which the one or more non-transitory memory devices further stores instructions to receive a set temperature for the cooking chamber, determine whether the temperature in the cooking chamber is within a first threshold from the set temperature, and adjust, in response to determining that the temperature in the cooking chamber is below the first threshold, the stoke fan to a fourth speed.

Implementation 40: The grill of implementation 39, in which the one or more non-transitory memory devices further stores instructions to cause, in response to determining that the temperature in the cooking chamber is above the first threshold, the cooling fan to be at a zero speed.

Implementation 41: The grill of implementation 39, in which the one or more non-transitory memory devices further stores instructions to cause, in response to determining that the temperature in the cooking chamber is above the first threshold, the cooling fan to be at an idle speed or a fourth speed.

Implementation 42: The grill of implementation 33, further including a second temperature sensor positioned within the combustion chamber, in which the one or more non-transitory memory devices further stores instructions to turn off the igniter, determine, based on data from the second temperature sensor, whether the charcoal-containing fuel block has successfully ignited, and turn on the igniter after determining, based on data from the second temperature sensor, that the charcoal-containing fuel block did not successfully ignite.

Implementation 43: A charcoal-containing fuel block including a charcoal layer, a flavor layer, and a shape, when viewed along a center axis extending through and perpendicular to the charcoal layer and the flavor layer, that includes an aligning cut spanning between first side and a second side that are adjacent to each other.

Implementation 44: The charcoal-containing fuel block of implementation 43, in which the shape is generally rectangular.

Implementation 45: The charcoal-containing fuel block of implementation 43, in which the aligning cut is a chamfer.

Implementation 46: The charcoal-containing fuel block of implementation 45, in which the chamfer is offset from the first side by a first angle and offset from the second side by a second angle that is the same as the first angle.

Implementation 47: The charcoal-containing fuel block of implementation 45, in which the chamfer is offset from the first side by a first angle and offset from the second side by a second angle that is different than the first angle.

Implementation 48: The charcoal-containing fuel block of implementation 43, in which the aligning cut has a curved surface.

Implementation 49: The charcoal-containing fuel block of implementation 43, in which the shape further includes three corners with a radius.

Implementation 50: The charcoal-containing fuel block of implementation 43, further including an ignition layer.

Implementation 51: The charcoal-containing fuel block of implementation 43, further including an ignition coating around the charcoal layer and the flavor layer.

Implementation 52: The charcoal-containing fuel block of implementation 43, further including a coating around the charcoal layer and the flavor layer, in which the coating includes a sodium nitrate or a potassium nitrate.

Implementation 53: The charcoal-containing fuel block of implementation 43, in which the charcoal-containing fuel block is for cooking.

Implementation 54: A charcoal-containing fuel block including a charcoal layer; and an internal ignition section that extends into the charcoal layer, is configured to have a higher combustion rate than the charcoal layer, and includes at least carbonaceous material and an oxidant.

Implementation 55: The charcoal-containing fuel block of implementation 54, in which the internal ignition section has a substantially circular cross-sectional area along its length.

Implementation 56: The charcoal-containing fuel block of implementation 54, in which the internal ignition section has a substantially rectangular cross-sectional area along its length.

Implementation 57: The charcoal-containing fuel block of implementation 54, in which the internal ignition section has a cross-sectional area along its length selected from a list consisting of rectangular, square, elliptical, obround, and having shaped corners, such as angled, chamfered, or rounded corners.

Implementation 58: The charcoal-containing fuel block of implementation 54, in which the internal ignition section extends through only a part of a width of the charcoal-containing fuel block.

Implementation 59: The charcoal-containing fuel block of implementation 54, in which the internal ignition section forms a part of the external surface of the charcoal-containing fuel block.

Implementation 60: The charcoal-containing fuel block of implementation 54, in which the charcoal layer is impregnated with a second oxidant/accelerant.

Implementation 61: The charcoal-containing fuel block of implementation 60, in which the second oxidant/accelerant includes an ethyl group.

Implementation 62: The charcoal-containing fuel block of implementation 60, in which the second oxidant/accelerant includes ethanol.

Implementation 63: The charcoal-containing fuel block of implementation 54, in which the carbonaceous material is charcoal powder and the oxidant is potassium nitrate.

Implementation 64: The charcoal-containing fuel block of implementation 54, in which the internal ignition section further includes a binder.

Implementation 65: The charcoal-containing fuel block of implementation 64, in which the internal ignition section further includes a plasticizer.

Implementation 66: The charcoal-containing fuel block of implementation 64, in which the binder includes guar gum.

Implementation 67: The charcoal-containing fuel block of implementation 54, further including a coating around the charcoal layer, in which the coating includes a sodium nitrate or a potassium nitrate.

Implementation 68: The charcoal-containing fuel block of implementation 54, in which the charcoal-containing fuel block is configured for use in cooking.

Implementation 69: A heat spreader for use in a grill, the heat spreader including a first surface having a center region with one or more through-holes that extend through the first surface, a first side region, and a second side region at a first obtuse angle from the first side region; and a second surface having a center region with one or more through-holes that extend through the second surface, a first side region, and a second side region at a second obtuse angle from the second side region, in which the second surface is offset from the first surface.

Implementation 70: The heat spreader of implementation 69, in which the first obtuse angle is substantially the same as the second obtuse angle.

Implementation 71: The heat spreader of implementation 69, in which the first side region and the second side region of the first surface each have a first width, and the first side region and the second side region of the second surface each have a second width larger than the first width.

Implementation 72: The heat spreader of implementation 69, in which the first surface has two or more through-holes, and the second surface has two or more through-holes.

Implementation 73: The heat spreader of implementation 69, in which the first side region of the first surface is offset from and substantially parallel to the first side region of the second surface, and the second side region of the first surface is offset from and substantially parallel to the second side region of the second surface.

Implementation 74: The heat spreader of implementation 73, in which the first side region of the first surface is offset from the first side region of the second surface by a first distance along a center axis of the first surface, and the second side region of the first surface is offset from the second side region of the second surface by the first distance along the center axis of the first surface.

Implementation 75: The heat spreader of implementation 69, further including a plurality of supports, in which one or more supports span between the second end of the first side region of the first surface and the first side region of the second surface, and one or more supports span between the second end of the second side region of the first surface and the second side region of the second surface.

Implementation 76: The heat spreader of implementation 75, in which the plurality of supports is a part of the first surface.

Implementation 77: The heat spreader of implementation 76, in which the plurality of supports is affixed to the second surface.

Implementation 78: The heat spreader of implementation 69, further including a plurality of structural supports, in which one or more structural supports span along at least a part of one or more of the second end, the first side, and the second side of the first side region of the first surface, one or more structural supports span along at least a part of one or more of the second end, the first side, and the second side of the second side region of the first surface, one or more structural supports span along at least a part of one or more of the second end, the first side, and the second side of the first side region of the second surface, and one or more structural supports span along at least a part of one or more of the second end, the first side, and the second side of the second side region of the second surface.

Implementation 79: The heat spreader of implementation 78, in which the structural supports that span along the first surface extend away from the first surface and are oriented at a non-parallel angle to the first surface, and the structural supports that span along the second surface extend away from the second surface and are oriented at a non-parallel angle to the second surface.

Implementation 80: A heat spreader for use in a grill, the heat spreader including a first surface having a center region with one or more through-holes that extend through the first surface; and a second surface having a center region with one or more through-holes that extend through the second surface, in which the second surface and the first surface are planar, and the second surface is offset from the first surface.

Implementation 81: A heat spreader for use in a grill, the heat spreader including a first surface having a center region with one or more through-holes that extend through the first surface, a first side region, and a second side region at a nonparallel angle from the first side region; and a second surface having a center region with one or more through-holes that extend through the second surface, in which the second surface is planar, and the second surface is offset from the first surface.

Implementation 82: The heat spreader of implementation 81, in which the nonparallel angle is an obtuse angle.

Implementation 83: The heat spreader of implementation 81, in which the nonparallel angle is a reflex angle.

Implementation 84: A heat spreader for use in a grill, the heat spreader including a first surface having a center region with one or more through-holes that extend through the first surface; and a second surface having a center region with one or more through-holes that extend through the second surface, a first side region, and a second side region at a nonparallel angle from the first side region, in which the first surface is planar, and the second surface is offset from the first surface.

Implementation 85: The heat spreader of implementation 84, in which the nonparallel angle is an obtuse angle.

Implementation 86: The heat spreader of implementation 84, in which the nonparallel angle is a reflex angle.

What is claimed is:

1. A charcoal-containing fuel block comprising:
    a charcoal layer,
    a flavor layer, and
    a shape, when viewed along a center axis extending through and perpendicular to the charcoal layer and the flavor layer, that includes an aligning cut spanning between first side and a second side that are adjacent to each other;
    wherein the aligning cut allows the fuel block to be placed in and aligned with a fuel pan having a corresponding aligning feature.

2. The charcoal-containing fuel block of claim 1, wherein the aligning cut is a chamfer.

3. The charcoal-containing fuel block of claim 1, further comprising an ignition coating applied to the fuel block around the charcoal layer and the flavor layer.

4. The charcoal-containing fuel block of claim 1, further comprising an internal ignition section that:
    extends into the charcoal layer,
    is configured to have a higher combustion rate than the charcoal layer, and
    comprises at least carbonaceous material and an oxidant.

* * * * *